United States Patent
Kim et al.

(10) Patent No.: US 10,365,524 B2
(45) Date of Patent: Jul. 30, 2019

(54) LIQUID CRYSTAL DISPLAY

(71) Applicant: Samsung Display Co., Ltd., Yongin-si (KR)

(72) Inventors: Sung-Hoon Kim, Seoul (KR); Joo Seok Yeom, Seoul (KR); Kyu Wan Ryu, Seoul (KR); Jeong Soo Choi, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/805,033

(22) Filed: Nov. 6, 2017

(65) Prior Publication Data

US 2018/0059495 A1   Mar. 1, 2018

Related U.S. Application Data

(62) Division of application No. 13/558,156, filed on Jul. 25, 2012, now Pat. No. 9,835,915.

(30) Foreign Application Priority Data

Sep. 23, 2011   (KR) ............... 10-20111-0096523

(51) Int. Cl.
*G02F 1/1343* (2006.01)
*G02F 1/1362* (2006.01)

(52) U.S. Cl.
CPC .. *G02F 1/136227* (2013.01); *G02F 1/136209* (2013.01); *G02F 2001/134372* (2013.01); *G02F 2001/136222* (2013.01); *G02F 2201/40* (2013.01); *G02F 2201/52* (2013.01)

(58) Field of Classification Search
CPC ......... G02F 1/136227; G02F 1/136209; G02F 2001/134372; G02F 2001/136222; G02F 2201/40; G02F 2201/52
USPC ....................................... 349/141
See application file for complete search history.

(56) References Cited

U.S. PATENT DOCUMENTS

| | | | |
|---|---|---|---|
| 7,663,724 B2 | 2/2010 | Lim et al. | |
| 8,294,863 B2 * | 10/2012 | Ninomiya | G02F 1/136227 349/138 |
| 2002/0159016 A1 | 10/2002 | Nishida et al. | |
| 2004/0105051 A1 | 6/2004 | Chuang et al. | |

(Continued)

FOREIGN PATENT DOCUMENTS

| CN | 1696769 | 11/2005 |
|---|---|---|
| CN | 101093329 | 12/2007 |

(Continued)

OTHER PUBLICATIONS

European Patent Office, Extended European Search Report for Application No. 12185681.9-2205, dated Jan. 7, 2013.

(Continued)

*Primary Examiner* — Charles S Chang
(74) *Attorney, Agent, or Firm* — H.C. Park & Associates, PLC

(57) ABSTRACT

A liquid crystal display in which the common voltage line is disposed directly on or directly under the common electrode directly contacts the common electrode such that a signal delay of the common voltage line may be reduced and simultaneously a reduction in the aperture ratio of the liquid crystal display may be prevented.

19 Claims, 51 Drawing Sheets

(56) References Cited

U.S. PATENT DOCUMENTS

| | | | |
|---|---|---|---|
| 2005/0185107 A1* | 8/2005 | Ban | G02F 1/136209 349/42 |
| 2006/0001803 A1 | 1/2006 | Park | |
| 2006/0285046 A1 | 12/2006 | Yang et al. | |
| 2008/0186440 A1 | 8/2008 | Lim et al. | |
| 2008/0204648 A1 | 8/2008 | Tanaka et al. | |
| 2009/0323005 A1 | 12/2009 | Ota | |
| 2010/0123866 A1 | 5/2010 | Chang et al. | |
| 2010/0245733 A1 | 9/2010 | Ono | |
| 2011/0001910 A1 | 1/2011 | Fujiyoshi et al. | |
| 2011/0037931 A1 | 2/2011 | Im et al. | |
| 2011/0050551 A1* | 3/2011 | Ota | G02F 1/134363 345/87 |
| 2012/0112200 A1 | 5/2012 | Nagano | |
| 2012/0154730 A1 | 6/2012 | Sakurai et al. | |

FOREIGN PATENT DOCUMENTS

| | | |
|---|---|---|
| CN | 101165576 | 4/2008 |
| CN | 101248388 | 8/2008 |
| CN | 101419368 | 4/2009 |
| CN | 101424804 | 5/2009 |
| CN | 101526704 | 9/2009 |
| CN | 101738799 | 6/2010 |
| CN | 1020234338 | 4/2011 |
| EP | 1793266 | 6/2007 |
| JP | 2001255519 | 9/2001 |
| JP | 2002277899 | 9/2002 |
| JP | 2002323706 | 11/2002 |
| JP | 2007128112 | 5/2007 |
| JP | 2008191669 | 8/2008 |
| JP | 2008209686 A | 9/2008 |
| JP | 2008310210 | 12/2008 |
| JP | 2010008758 | 1/2010 |
| JP | 2010160254 | 7/2010 |
| JP | 2010231035 A | 10/2010 |
| KR | 1020060104709 | 10/2006 |
| KR | 1020070002779 | 1/2007 |
| KR | 1020110054727 | 5/2011 |

OTHER PUBLICATIONS

Notice of Allowance dated Oct. 23, 2017, issued in U.S. Appl. No. 13/558,156.

Non Final Office Action dated Feb. 23, 2017, issued in U.S. Appl. No. 13/558,156.

Final Office Action dated Nov. 30, 2016, issued in U.S. Appl. No. 13/558,156.

Non Final Office Action dated Jun. 2, 2016, issued in U.S. Appl. No. 13/558,156.

Final Office Action dated Jan. 29, 2016, issued in U.S. Appl. No. 13/558,156.

Non Final Office Action dated Jul. 10, 2015, issued in U.S. Appl. No. 13/558,156.

* cited by examiner

LIQUID CRYSTAL DISPLAY

CROSS-REFERENCE TO RELATED APPLICATION

This application is a Divisional of U.S. patent application Ser. No. 13/588,156, filed on Jul. 25, 2012, and claims priority from and the benefit of Korean Patent Application No. 10-2011-0096523, filed on Sep. 23, 2011, which is hereby incorporated herein by reference for all purposes as if fully set forth herein.

BACKGROUND

Field

Exemplary embodiments of the present invention relate to a liquid crystal display.

Discussion of the Background

A liquid crystal display is one type of a flat panel display that is most widely used at present, and includes two display panels on which field generating electrodes, such as a pixel electrode and a common electrode, are formed, and a liquid crystal layer that is interposed therebetween. The liquid crystal display displays an image by applying a voltage to the field generating electrodes to generate an electric field on the liquid crystal layer, thereby determining the direction of liquid crystal molecules of the liquid crystal layer, and controlling the polarization of incident light. The transmittance of the liquid crystal display may increase when the liquid crystal molecules are precisely controlled.

Meanwhile, in the liquid crystal display, the pixel electrode and the common electrode generating the electric field in the liquid crystal layer may be provided on one display panel where the switching element is formed. In the case of the liquid crystal display of this form, a contact hole is formed to connect a common voltage line transmitting a common voltage and the common electrode. This arrangement, however, results in a decrease in the aperture ratio of the liquid crystal display.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention may prevent a decreased aperture ratio of a liquid crystal display and may reduce signal delay of a common voltage line in a display having field generating electrodes disposed on the same substrate.

Additional features of the invention will be set forth in the description which follows, and in part will be apparent from the description, or may be learned by practice of the invention.

An exemplary embodiment of the present invention discloses a liquid crystal display which includes: a first substrate; a plurality of gate lines and a plurality of data lines disposed on the first substrate; a plurality of thin film transistors respectively connected to the plurality of gate lines and the plurality of data lines; a plurality of color filters disposed on the plurality of thin film transistors; a plurality of pixel electrodes and common electrodes disposed on the plurality of color filters and overlapping each other via a first insulating layer; and a common voltage line directly contacting the common electrode.

An exemplary embodiment of the present invention also discloses a liquid crystal display which includes: a first substrate; a plurality of gate lines and a plurality of data lines disposed on the first substrate; a plurality of thin film transistor respectively connected to the plurality of gate lines and the plurality of data lines; a plurality of color filters disposed on the plurality of thin film transistors; a common electrode disposed on the plurality of color filters; a common voltage line directly contacting the common electrode; a first insulating layer disposed on the common electrode; and a plurality of pixel electrodes disposed on the first insulating layer, wherein the common electrode and the plurality of pixel electrodes overlap each other, and at least one of the common electrode and the plurality of pixel electrodes includes a branch electrode.

An exemplary embodiment of the present invention also discloses a liquid crystal display which includes: a first substrate; a plurality of gate lines and a plurality of data lines disposed on the first substrate; a plurality of thin film transistors respectively connected to the plurality of gate lines and the plurality of data lines; a plurality of color filters disposed on the plurality of thin film transistors; a plurality of pixel electrodes disposed on the plurality of color filters; a first insulating layer disposed on the pixel electrodes; a common electrode disposed on the first insulating layer; and a common voltage line directly contacting the common electrode, wherein the common electrode and the plurality of pixel electrodes overlap each other, and at least one of the common electrode and the plurality of pixel electrodes includes a branch electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE EXEMPLARY EMBODIMENTS

Figure 1:
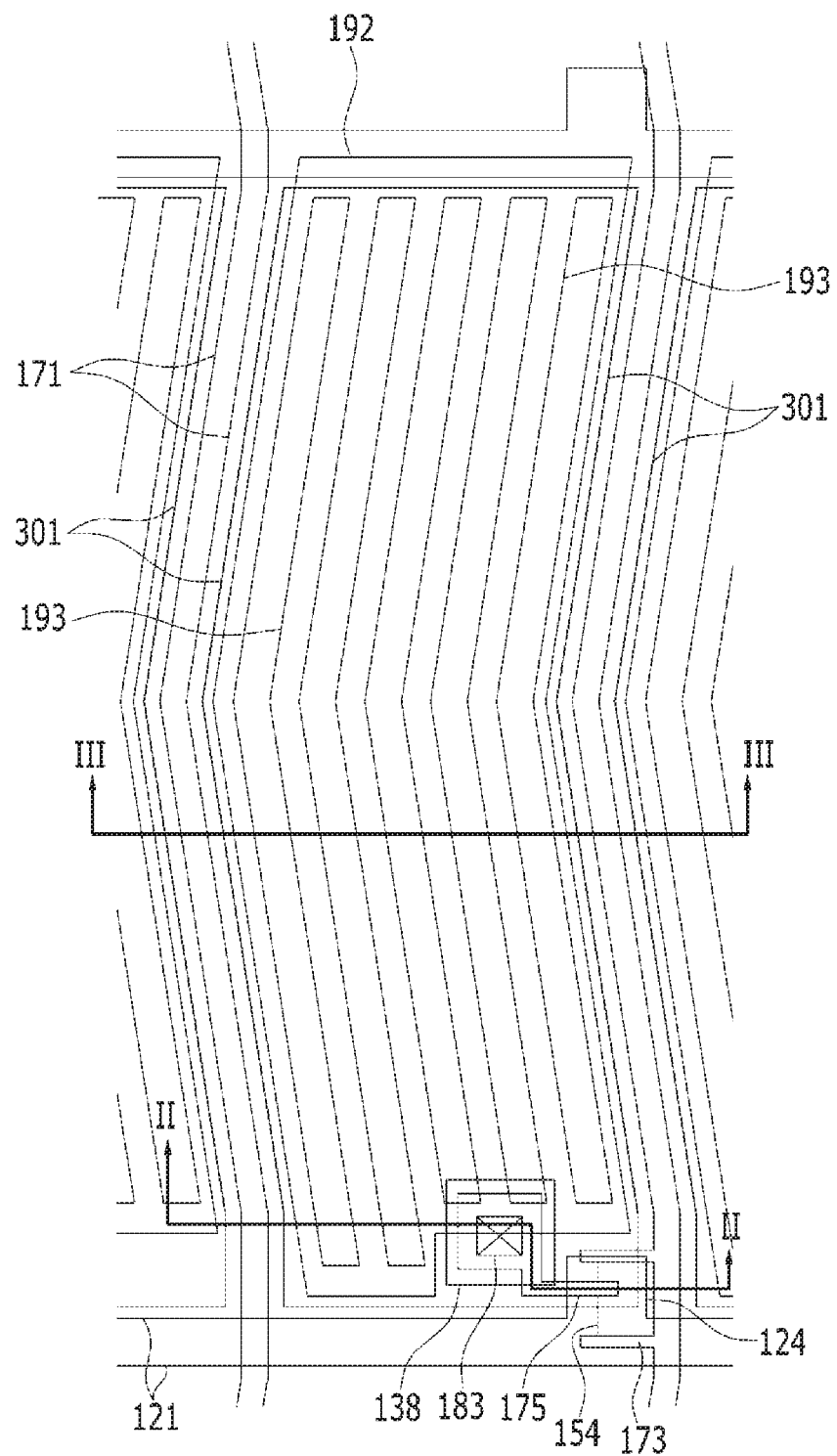
FIG. 1 is a layout view of a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region, or substrate is referred to as being "on" or "connected to" another element, it can be directly on or directly connected to the other element, or intervening elements may also be present. In contrast, when an element is referred to as being "directly on" or "directly connected to" another element, there are no intervening elements present. It will be understood that for purposes of this disclosure, "at least one of X, Y, and Z" can be construed as X only, Y only, Z only, or any combination of two or more items X, Y, and Z (e.g., XYZ, XYY, YZ, ZZ).

Figure 2:
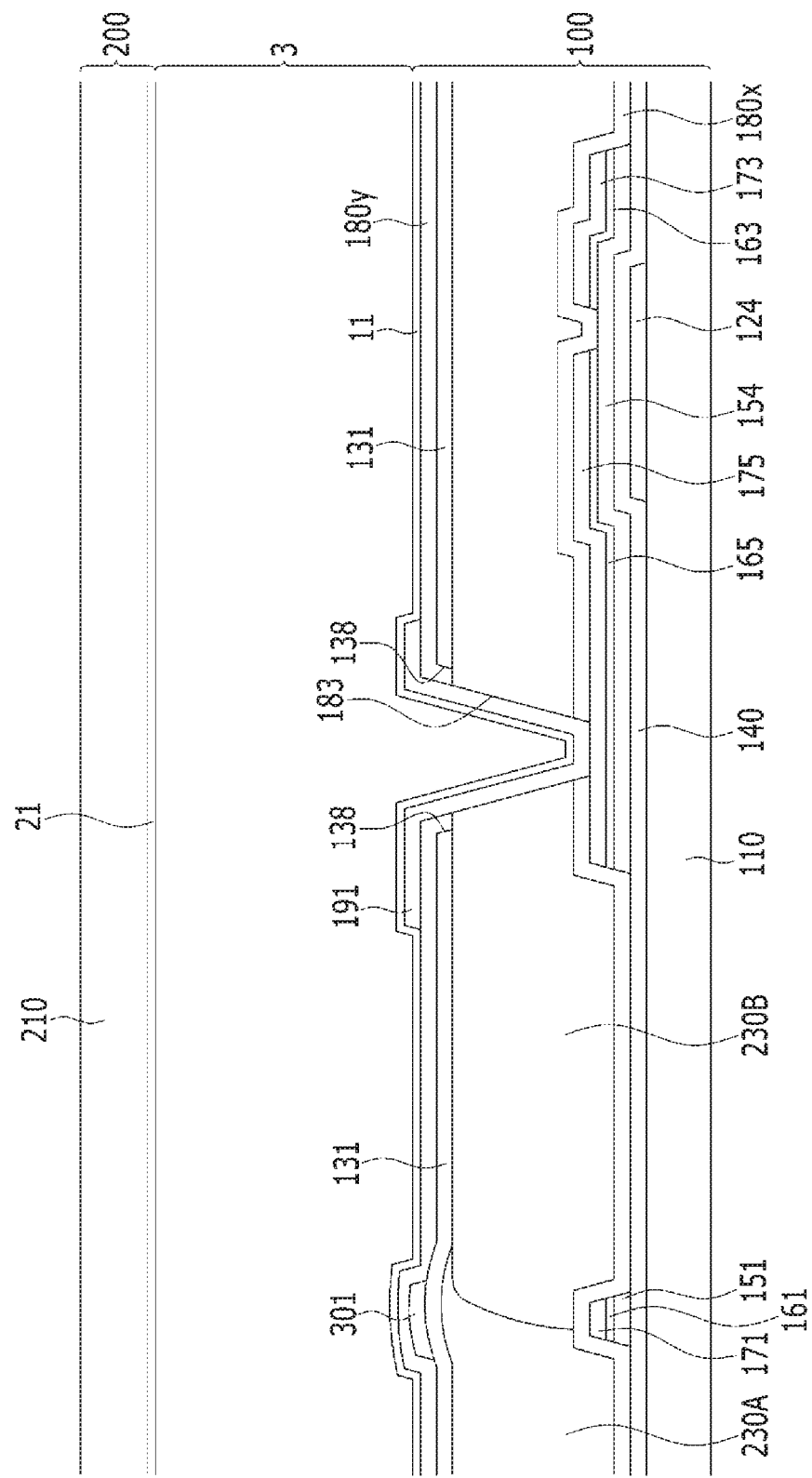
FIG. 2 and FIG. 3A are cross-sectional views of the liquid crystal display according to an exemplary embodiment of the present invention taken along the lines II-II and III-III of FIG. 1.
Figure 3A:
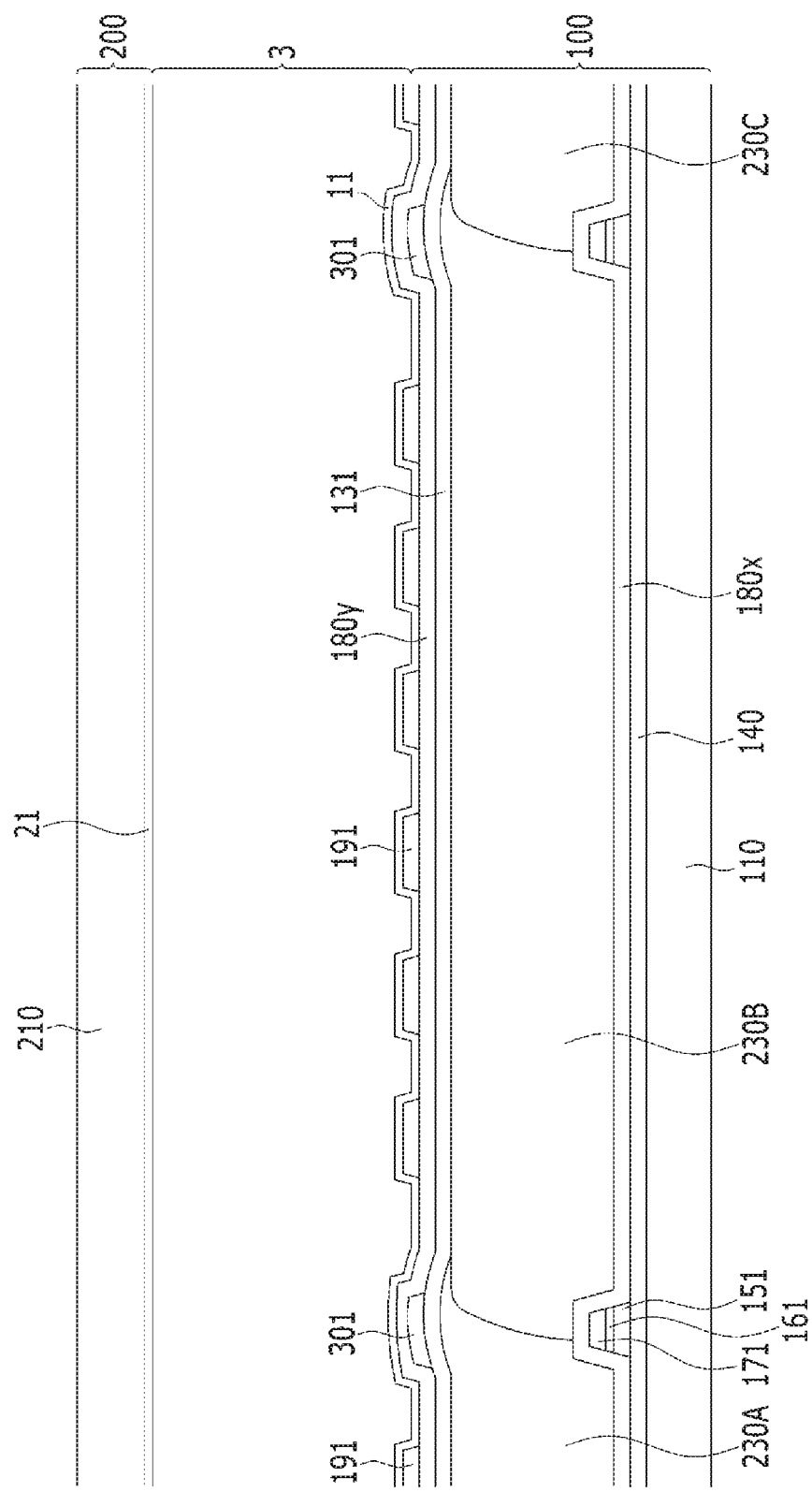
Figure 3B:
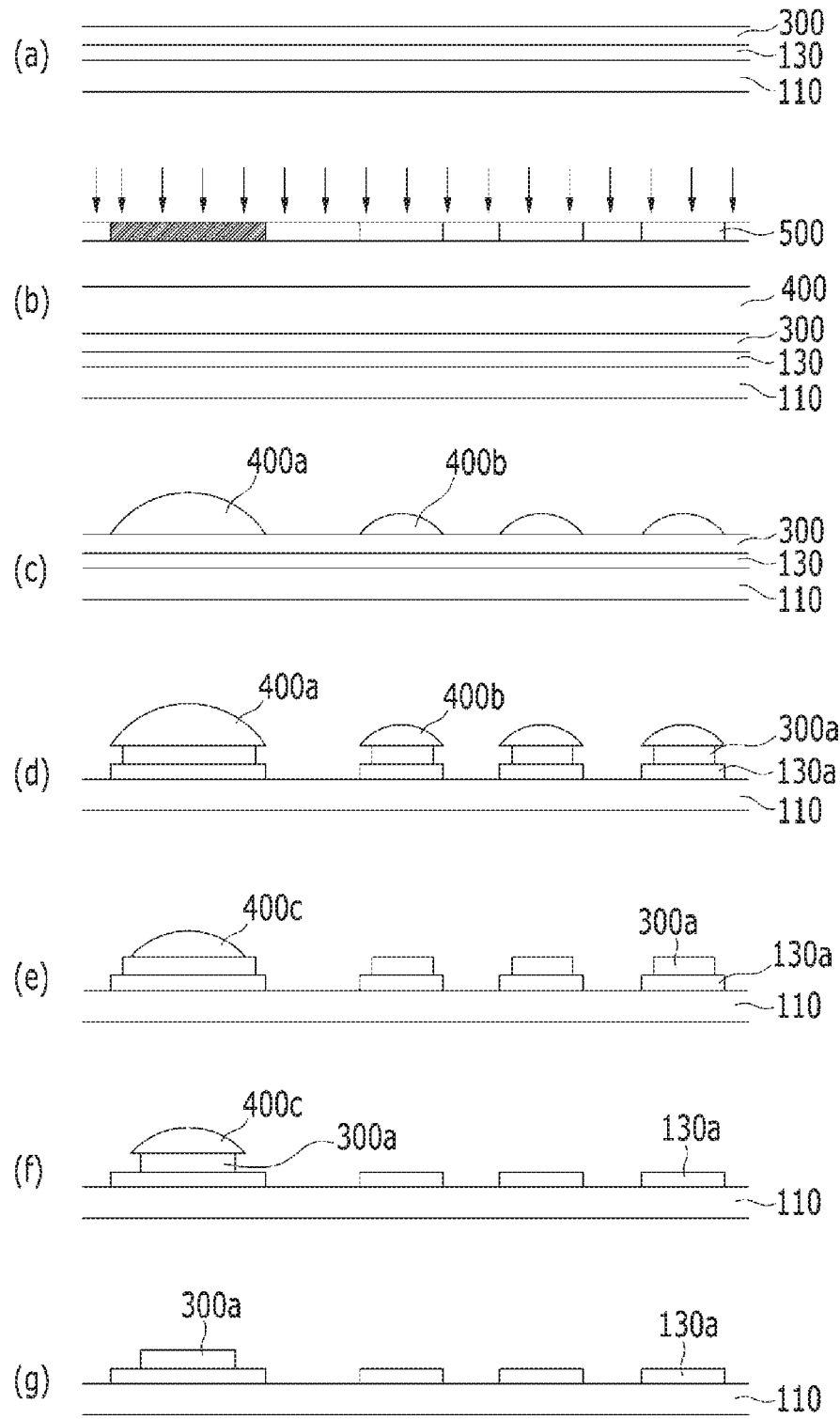
FIG. 3B is a cross-sectional view showing a portion of a manufacturing method of the liquid crystal display shown in FIG. 3A.

A liquid crystal display according to an exemplary embodiment of the present invention will be described with reference to FIG. 1, FIG. 2, FIG. 3A, and FIG. 3B. FIG. 1 is a layout view of a liquid crystal display according to an exemplary embodiment of the present invention, FIG. 2 and FIG. 3A are cross-sectional views of the liquid crystal display according to an exemplary embodiment of the present invention taken along the lines II-II and III-III of FIG. 1, and FIG. 3B is a cross-sectional view showing a portion of a manufacturing method of the liquid crystal display shown in FIG. 3A.

A liquid crystal display according to an exemplary embodiment of the present invention includes a lower panel 100 and an upper panel 200, and a liquid crystal layer 3 interposed between the two display panels 100 and 200.

First, the lower panel 100 will be described.

A plurality of gate lines 121 are formed on an insulation substrate 110.

The gate line 121 transmits gate signals and extends in a transverse direction. Each gate line 121 includes a plurality of gate electrodes 124.

A gate insulating layer 140 is formed on the gate line 121. The gate insulating layer 140 may be made of an inorganic insulator such as silicon nitride (SiNx) or silicon oxide (SiOx).

A plurality of semiconductors 151 are formed on the gate insulating layer 140. The semiconductor 151 includes a protrusion 154 extending toward the gate electrode 124. However, in a case of the liquid crystal display according to another exemplary embodiment of the present invention, the semiconductor 151 may be only disposed on the gate electrode 124.

A plurality of ohmic contacts 161, 163, and 165 are formed on the semiconductor 151. The ohmic contacts 163 and 165 face each other with respect to the gate electrode 124 and form a pair, and are disposed on the semiconductor 154. The ohmic contacts 161, 163, and 165 may be made of a material such as n+ hydrogenated amorphous silicon in which an n-type impurity such as phosphorus is doped at a high concentration, or of silicide. However, in the case of the liquid crystal display according to another exemplary embodiment of the present invention, the ohmic contacts 161, 163, and 165 may be omitted.

A data conductor including a plurality of data lines 171 and a plurality of drain electrodes 175 is formed on the ohmic contacts 161, 163, and 165.

The data lines 171 transmit a data signal and mainly extend in the longitudinal direction, thereby intersecting the gate lines 121. Each data line 171 includes a plurality of source electrodes 173 that are extended toward the gate electrode 124. The data line 171 is periodically bent and forms an oblique angle with respect to the extending direction of the gate line 121. The oblique angel between the data line 171 and the extending direction of the gate line 121 may be 45 degrees or more. However, in the case of a liquid crystal display according to another exemplary embodiment of the present invention, the data line 171 may be extended in a straight line.

The drain electrode 175 includes one end of a bar type and the other end having a wide area that faces the source electrode 173 with respect to the gate electrode 124.

The gate electrode 124, the source electrode 173, and the drain electrode 175 form a thin film transistor (TFT) as a switching element along with the semiconductor protrusion 154. The semiconductor stripe 151 may have almost the same plane shape as the data line 171, the drain electrode 175, and the underlying ohmic contacts 161 and 165 except for the semiconductor protrusion 154 of the thin film transistor.

A first passivation layer 180x is positioned on the data conductor 171 and 175 and the exposed semiconductor protrusion 154, and the first passivation layer 180x may be made of an organic insulating material or an inorganic insulating material.

A plurality of color filters 230A, 230B, and 230C are formed on the first passivation layer 180x. Each of the color filters 230A, 230B, and 230C may uniquely display one of primary colors, for example, three primary colors of red, green, and blue, or yellow, cyan, and magenta. Although not shown, the color filters may further include a color filter displaying a mixture of the primary colors or white, as well as the primary colors. The color filters 230A, 230B, and 230C may be made of an organic material. Each of the color filters 230A, 230B, and 230C may be extended in the direction of the data line 171, and two neighboring color filters 230A and 230B, or 230B and 230C, may overlap on the boundary of the data line 171.

A plurality of common electrodes 131 are formed on the color filters 230A, 230B, and 230C. The common electrodes 131 may be made of a transparent conductive material such as ITO or IZO. The common electrode 131 having a plane shape may be formed with one plate on the whole surface of the substrate 110, and may have an opening 138 disposed at a region corresponding to the circumference of the drain electrode 175.

A common voltage line 301 is disposed on the common electrode 131, thereby directly contacting the common electrode 131. The common voltage line 301 includes a first portion parallel to the gate line 121 and a second portion parallel to the data line 171, and the first portion and the second portion are connected to each other. However, in the case of a liquid crystal display according to another exemplary embodiment of the present invention, at least one of the first portion and the second portion may be omitted.

The common voltage line 301 may be made of a metal that is opaque and has conductivity, which is different from the construction of the common electrode 131. Also, the second portion of the common voltage line 301 disposed on the data line 171 may have a width that is equal to or greater than the data line 171, thereby preventing light leakage between two pixels neighboring with respect to the data line 171. Accordingly, a light blocking member between two pixels neighboring with respect to the data line 171 may be omitted.

The common voltage line 301 may be made of a conductive material. For example, the common voltage line 301 may be made of a conductive organic material having high electrical conductivity. In this case, reflection of light may be prevented, and the aperture ratio of the liquid crystal display may be increased.

The common electrode 131 and the common voltage line 301 may be simultaneously formed through one photolithography process using one mask. This will be described in detail with reference to FIG. 3B. As shown in (a) of FIG. 3B, the first conductive layer 130 forming the common electrode 131 and the second conductive layer 300 that is opaque and forms the common voltage line 301 are sequentially deposited on the substrate 110. As shown in (b), a photosensitive film 400 is deposited and exposed by using a photomask 500 including a translucent area, a light transmitting area, and a light blocking area, and as shown in (c), a first photosensitive film pattern (400a and 400b) has different thicknesses according to position. As shown in (d), a second conductive layer 300 and a first conductive layer 130 are simultaneously etched or sequentially etched by using the first photosensitive film pattern (400a and 400b) as an etching mask to form a second conductive layer pattern 300a and a first conductive layer pattern 130a, and as shown in (e), the height of the first photosensitive film pattern (400a and 400b) is decreased through ashing, and thereby the thickness of the thick photosensitive film pattern 400a is decreased and simultaneously the thin photosensitive film pattern 400b is removed to form a second photosensitive film pattern 400c. As shown in (f), by using the second photosensitive film pattern 400c as the etching mask, the second conductive layer pattern 300a is etched via a method of etching the second conductive layer 300, and as shown in (g), a common electrode portion 130a and a common voltage line portion 300a may be formed by one photolithography process. There are many methods of forming the difference in thicknesses according to the location of the photosensitive film. One example of the methods includes forming a photomask with a translucent area, a light transmitting area, and a light blocking area. The translucent area is provided with a slit pattern or a lattice pattern, or as a thin film having medium transmittance or thickness. In the case of utilizing the slit pattern, it is preferable that the slit width or the space between the slits is smaller than the resolution of exposure equipment used in the photolithography process. Another example of the methods includes using a reflowable photosensitive film. That is, the method forms a thin portion by making a photosensitive film flow into a region where the photosensitive film is not present after forming the reflowable photosensitive film with a general exposure mask having only a light transmitting area and a light blocking area. Since this reduces the number of photolithography processes, the manufacturing method is simplified. Although FIG. 3B shows gaps between portions of the common electrode portion 130a, as shown in FIG. 3A, the common electrode 131 may have a plane shape formed with one plate on the whole surface of the substrate 110.

A second passivation layer 180y is disposed on the common electrode 131 and the common voltage line 301. The second passivation layer 180y may be made of an organic insulating material or an inorganic insulating material.

A pixel electrode 191 is formed on the second passivation layer 180y. The pixel electrode 191 includes a plurality of branch electrodes 193 almost parallel to each other and separated from each other and lower and upper transverse portions 192 connecting upper and lower ends of the branch electrode 193. The branch electrodes 193 of the pixel electrode 191 may be bent according to the data lines 171. However, in the case of a liquid crystal display according to another exemplary embodiment of the present invention, the data line 171 and the branch electrode 193 of the pixel electrode 191 may be extended in one straight line. The pixel electrode 191 may be made of the transparent conductive material such as ITO or IZO.

The first passivation layer 180x, the color filter 230B, and the second passivation layer 180y have a plurality of contact holes 183 exposing the drain electrode 175, and the pixel electrode 191 is electrically connected to the drain electrode 175 through the contact hole 183, thereby receiving a data voltage.

The contact hole 183 is formed at a position corresponding to the opening 138 of the common electrode 131.

The pixel electrode 191 applied with the data voltage and the common electrode 131 applied with the common voltage generate an electric field to the liquid crystal layer 3.

The branch electrode 193 of the pixel electrode 191 overlaps the common electrode 131 having the plane shape.

In the case of a liquid crystal display according to the present exemplary embodiment, the common electrode 131 covers a plurality of data lines 171 at one time and overlaps the data line 171. Accordingly, crosstalk is reduced between the data line 171 and the pixel electrode 191 and light leakage caused by a parasitic capacitance between the data line 171 and the neighboring pixel electrode 191 may be reduced.

A first alignment layer 11 is coated on an inner surface of the lower panel 100.

Next, the upper panel 200 will be described.

A second alignment layer 21 is coated on an insulation substrate 210.

The first alignment layer 11 and the second alignment layer 21 may be horizontal alignment layers.

The liquid crystal layer 3 interposed between the lower panel 100 and the upper panel 200 includes liquid crystal molecules (not shown), wherein the liquid crystal molecules may be aligned so that a major axis thereof is formed to be horizontal with respect to the surfaces of the two display panels 100 and 200 in the state where an electric field is not present.

The liquid crystal layer 3 may have positive dielectric anisotropy or negative dielectric anisotropy. The liquid crystal molecules of the liquid crystal layer 3 may be aligned to have a pretilt in a predetermined direction, and the pretilt direction of the liquid crystal molecule may be changed according to the dielectric anisotropy of the liquid crystal layer 3.

A backlight unit (not shown) generating and providing light to the two display panels 100 and 200 may be provided outside the substrate 110 of the lower panel 100.

The pixel electrode 191 having the data voltage applied thereto generates an electric field in the liquid crystal layer 3 together with the common electrode 131 having a common voltage applied thereto, thereby determining the direction of the liquid crystal molecules of the liquid crystal layer 3 and displaying a corresponding image.

The lower panel 100 of the liquid crystal display according to an exemplary embodiment of the present invention includes the color filters 230A, 230B, and 230C disposed between the data line 171 and the field generating electrodes 131 and 191. In general, to reduce the parasitic capacitance between the data line 171 and the field generating electrodes 131 and 191, a thick insulating layer having a low dielectric ratio is formed between the data line 171 and the field generating electrodes 131 and 191. However, the liquid crystal display according to the present exemplary embodiment includes the color filters 230A, 230B, and 230C functioning as the insulating layer between the data line 171 and the field generating electrodes 131 and 191, and thereby an additional thick insulating layer is not formed. Accordingly, transmittance is greater than the case in which the thick insulating layer is formed in the lower panel 100 and the color filter is formed in the upper panel 200.

When forming the color filter in the upper panel 100, to prevent a color display error caused by misalignment between the pixel electrode of the lower panel 100 and the color filter of the upper panel 200, a light blocking member having a large width should be formed between the color filters. However, when disposing the color filter in the lower panel 100, the alignment error of the color filter is not considered such that the width of the light blocking member may be reduced. However, the width of the light blocking member is wider than the line width of the lower panel 100 such that the aperture ratio is decreased when forming the light blocking member in the upper panel 200.

The liquid crystal display according to an exemplary embodiment of the present invention includes the common voltage line 301 directly disposed on the common electrode 131 and extending according to at least one of the gate line 121 and the data line 171. In contrast to the common electrode 131, the common voltage line 301 may be made of a metal that is opaque and has high conductivity, and in this case, the common voltage line 301 may have a function of preventing light leakage between two neighboring pixels. Accordingly, the light blocking member may be omitted.

As above described above, the liquid crystal display according to an exemplary embodiment of the present invention does not consider the alignment error between the lower panel 100 and the upper panel 200, and the light blocking member may be omitted such that the aperture ratio is increased.

Also, because the common voltage line 301 directly disposed on the common electrode 131 and extending to at least one of the gate line 121 and the data line 171 is included, the signal delay of the common voltage applied to the common electrode 131 is simultaneously prevented, a contact hole connecting the common electrode 131 and the common voltage line 301 is not necessary, and the opaque common voltage line 301 overlaps the signal lines 121 and 171, thereby increasing the aperture ratio of the liquid crystal display. As described above, the liquid crystal display according to an exemplary embodiment of the present invention includes the common voltage line 301 disposed directly on the common electrode 131 such that the signal delay of the common voltage is prevented, and simultaneously the aperture ratio of the liquid crystal display may be increased. Also, the light blocking member may be omitted, and the manufacturing cost may be reduced.

Also, the common voltage line 301 may be formed of a conductive material. For example, the common voltage line 301 may be made of a conductive organic material having high electrical conductivity, and in this case, reflection of the light may be prevented.

Also, the liquid crystal display according to the present exemplary embodiment includes the common electrode 131 covering the data line 171 such that the crosstalk between the data line 171 and the pixel electrode 191 is reduced by the common electrode 131, and the light leakage by the parasitic capacitance between the data line 171 and the neighboring pixel electrode 191 may be reduced.

Figure 4:
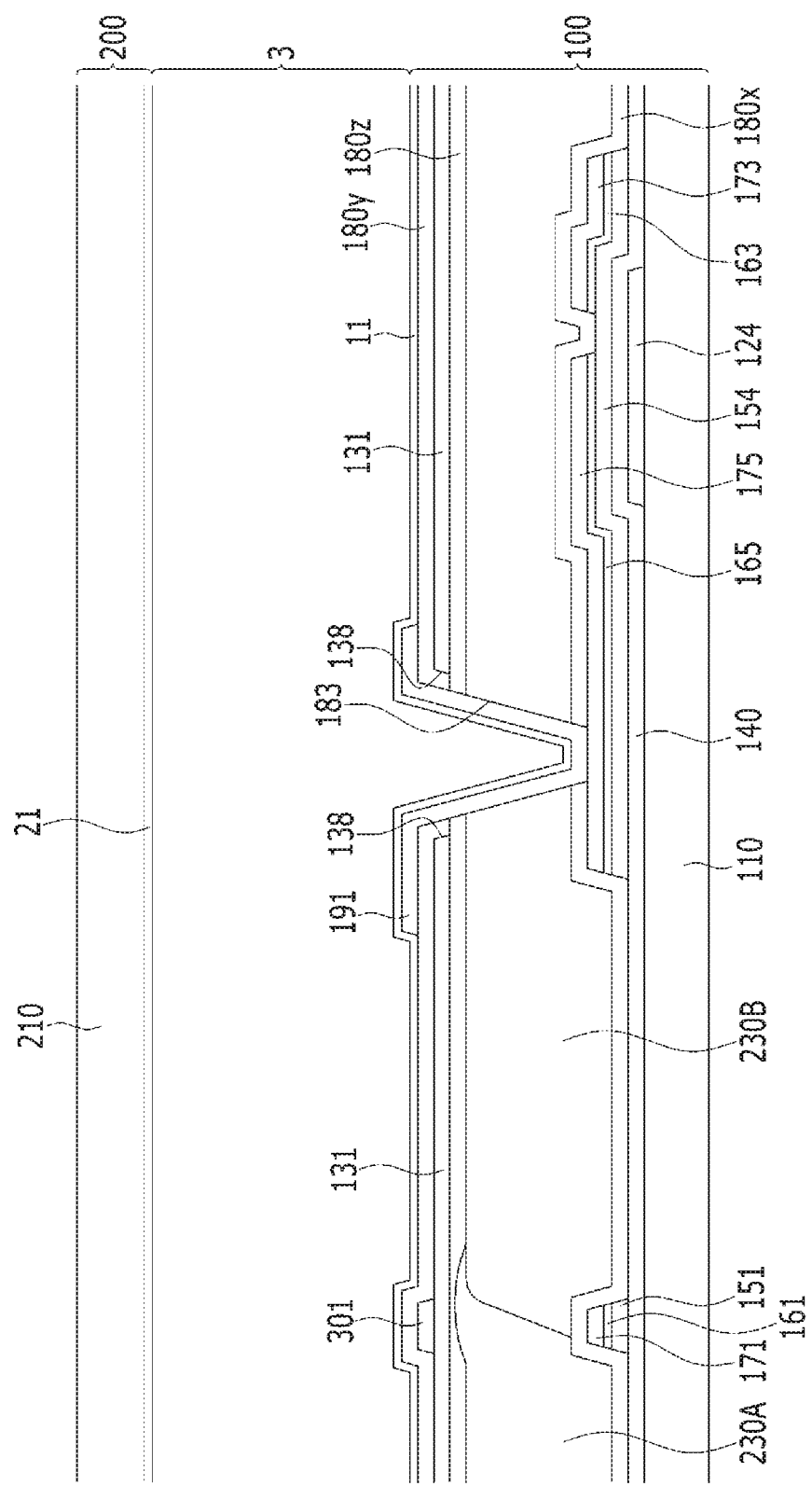
FIG. 4 and FIG. 5 are cross-sectional views of the liquid crystal display according to another exemplary embodiment of the present invention taken along the lines II-II and III-III of FIG. 1.
Figure 5:
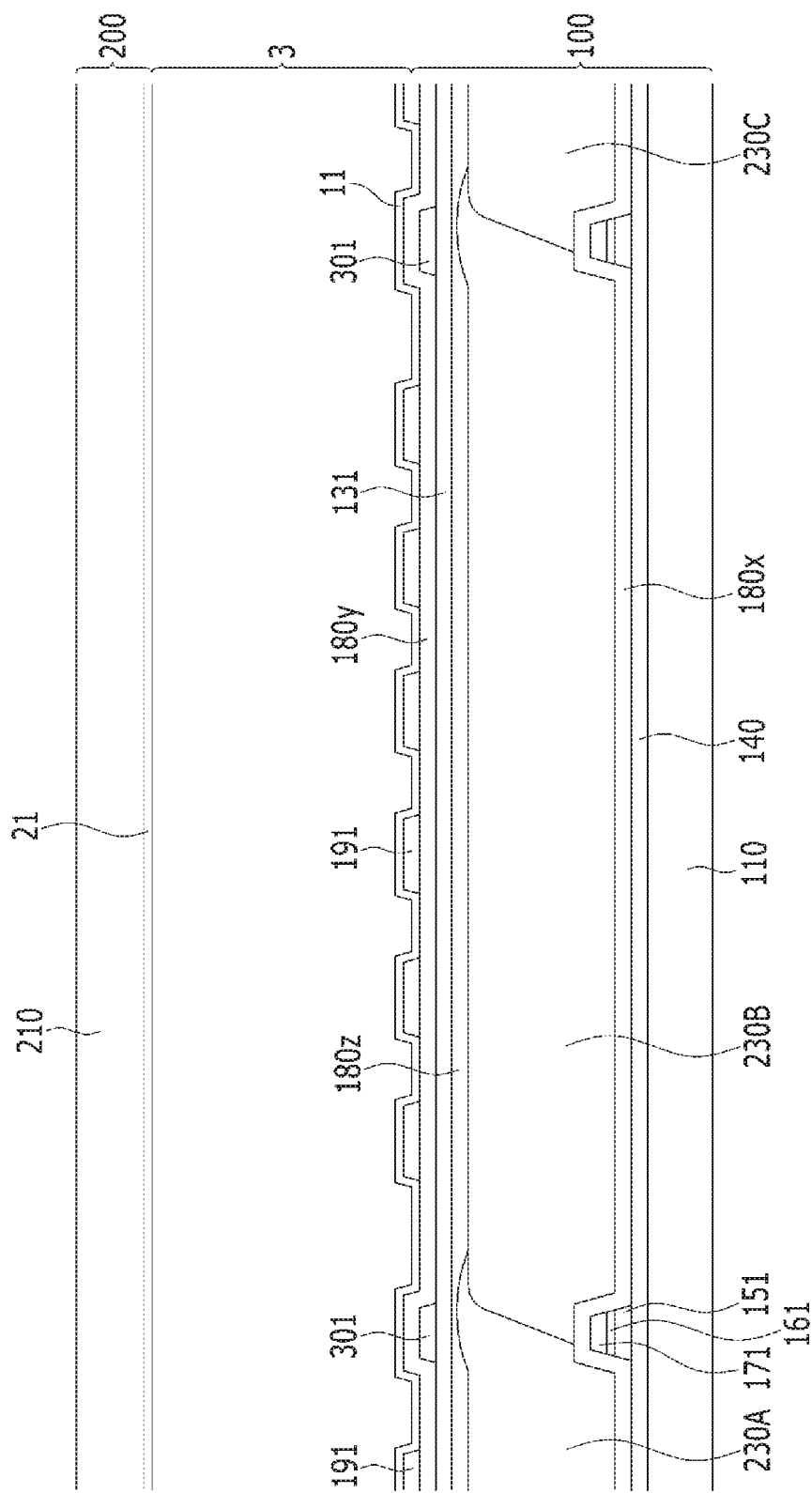

Next, the liquid crystal display according to another exemplary embodiment of the present invention will be described with reference to FIG. 4 and FIG. 5, as well as FIG. 1. FIG. 4 and FIG. 5 are cross-sectional views of the liquid crystal display according to another exemplary embodiment of the present invention taken along the lines II-II and III-III of FIG. 1.

The liquid crystal display according to the exemplary embodiment shown in FIG. 1, FIG. 4, and FIG. 5 is almost the same as the liquid crystal display according to the exemplary embodiment shown in FIG. 1, FIG. 2, and FIG. 3A. Accordingly, the description of similar portions is omitted.

In contrast to the liquid crystal display according to the exemplary embodiment shown in FIG. 1, FIG. 2, and FIG. 3A, the liquid crystal display according to the present exemplary embodiment further includes a third passivation layer 180z between the color filters 230A, 230B, and 230C and the common electrode 131. The third passivation layer 180z is disposed between the data line 171 and the common voltage line 301 such that the parasitic capacitance is decreased between the data line 171 and the common voltage line 301, thereby reducing the signal delay of the data line 171. The third passivation layer 180z may be made of an organic material and may have a flat surface. The third passivation layer 180z reduces a step formed by the overlapping of the color filters 230A, 230B, and 230C disposed in the neighboring pixels, and thereby the alignment layer 11 may be uniformly rubbed. However, the third passivation layer 180z may be an inorganic insulating layer and may prevent a component of the color filter from being exposed, and at this time, the third passivation layer 180z is formed at a lower temperature than the gate insulating layer 140 such that deformation and color change of the color filters 230A, 230B, and 230C may be prevented. Also, the third passivation layer 180z may reduce the transmittance loss resulting from the refractive index difference between the underlying color filter and the organic insulator.

All characteristics of the liquid crystal display according to the exemplary embodiment shown in FIG. 1, FIG. 2, and FIG. 3A may be applied to the liquid crystal display of the present exemplary embodiment. Also, the characteristics and the effects of the several constituent elements according to the above-described exemplary embodiment may be applied to the present exemplary embodiment having the same constituent elements.

Figure 6:
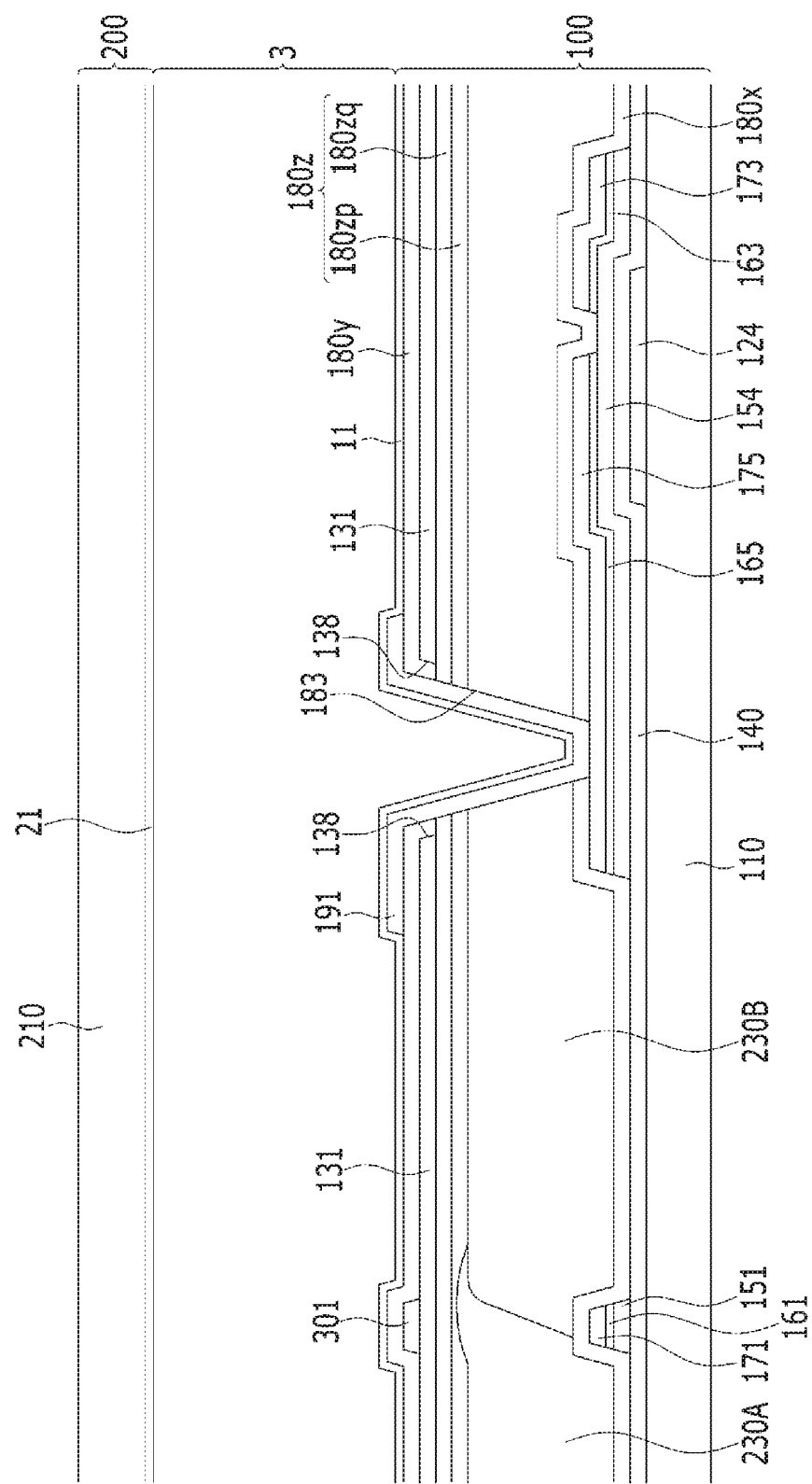
FIG. 6 and FIG. 7 are cross-sectional views of the liquid crystal display according to another exemplary embodiment of the present invention taken along the lines II-II and III-III of FIG. 1.
Figure 7:
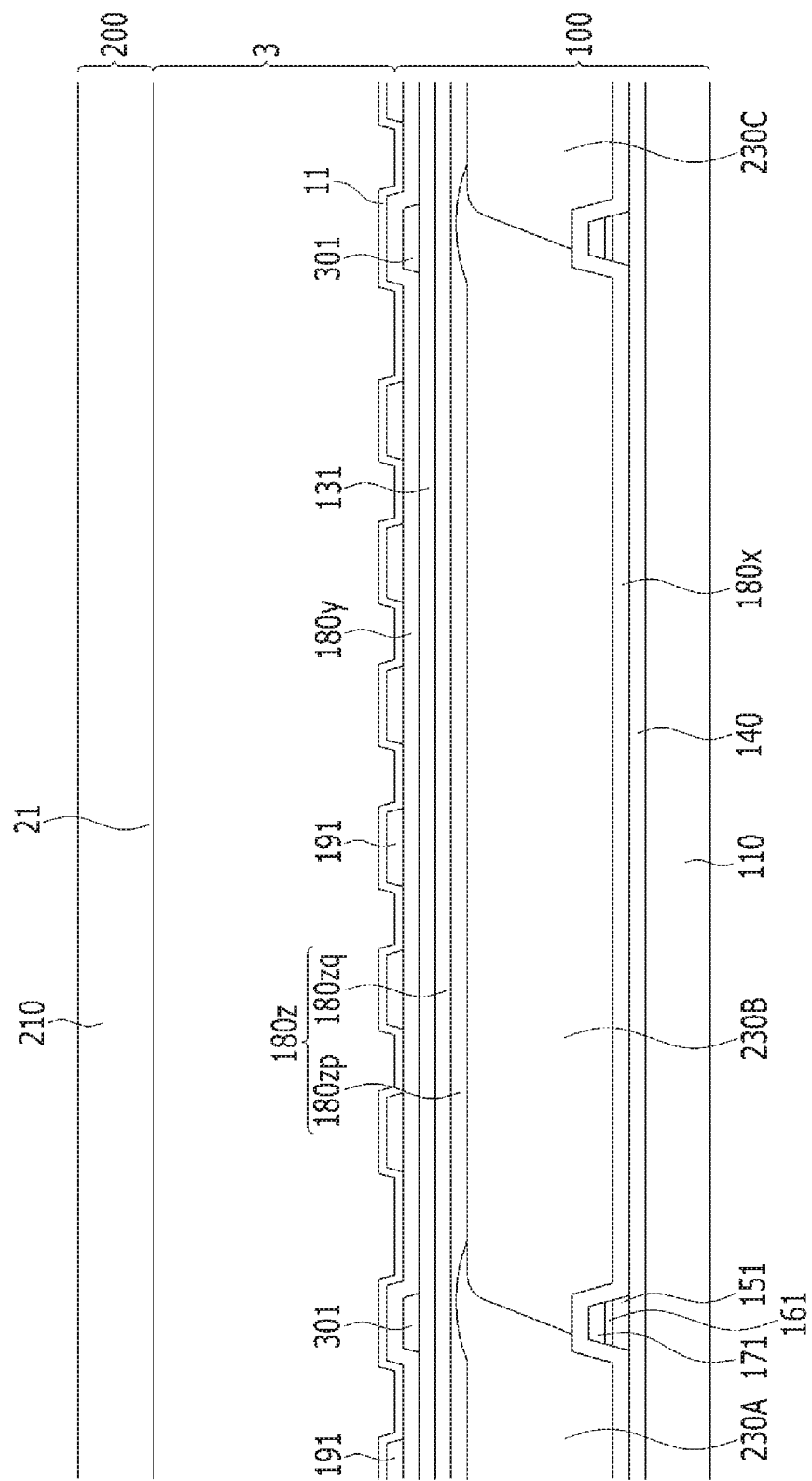

Next, the liquid crystal display according to another exemplary embodiment of the present invention will be described with reference to FIG. 6 and FIG. 7 as well as FIG. 1. FIG. 6 and FIG. 7 are cross-sectional views of the liquid crystal display according to another exemplary embodiment of the present invention taken along the lines II-II and III-III of FIG. 1.

The liquid crystal display according to the exemplary embodiment shown in FIG. 1, FIG. 6, and FIG. 7 is similar to the liquid crystal display according to the exemplary embodiment shown in FIG. 1, FIG. 2, and FIG. 3A. Accordingly, the description of similar portions is omitted.

In contrast to the liquid crystal display according to the exemplary embodiment shown in FIG. 1, FIG. 2, and FIG. 3A, the liquid crystal display according to the present exemplary embodiment further includes the third passivation layer 180z between the color filters 230A, 230B, and 230C and the common electrode 131, and the third passivation layer 180z includes a lower layer 180zp and an upper layer 180zq. The lower layer 180zp of the third passivation layer 180z may be made of an inorganic insulating layer, and prevents the component of the color filter from being exposed to the outside. The upper layer 180zq of the third passivation layer 180z may be made of an organic material and may have a flat surface. The lower layer 180zp of the third passivation layer 180z is formed at a lower temperature than the gate insulating layer 140 such that deformation and color change of the color filters 230A, 230B, and 230C may be prevented, and may reduce the transmittance loss resulting from the refractive index difference between the underlying color filter and the organic insulator. The upper layer 180zq of the third passivation layer 180z may function as an organic insulator, and may reduce the step formed by the overlapping of the color filters 230A, 230B, and 230C disposed in the neighboring pixels, and thereby the alignment layer 11 may be uniformly rubbed. The third passivation layer 180z is disposed between the data line 171 and the common voltage line 301 such that the parasitic capacitance is decreased between the data line 171 and the common voltage line 301, thereby reducing the signal delay of the data line 171.

In the liquid crystal display according to the present exemplary embodiment, the lower layer 180zp of the third passivation layer 180z is the inorganic insulating layer and the upper layer 180zq is the organic insulator. However, in a liquid crystal display according to another exemplary embodiment of the present invention, the lower layer 180zp of the third passivation layer 180z may be the organic insulator and the upper layer 180zq may be the inorganic insulating layer.

All characteristics of the liquid crystal display according to the exemplary embodiment shown in FIG. 1, FIG. 2, and FIG. 3A may be applied to the liquid crystal display according to the present exemplary embodiment. Also, the characteristics and the effects of the several constituent elements according to the above-described exemplary embodiment may be applied to the present exemplary embodiment having the same constituent elements.

Figure 8:
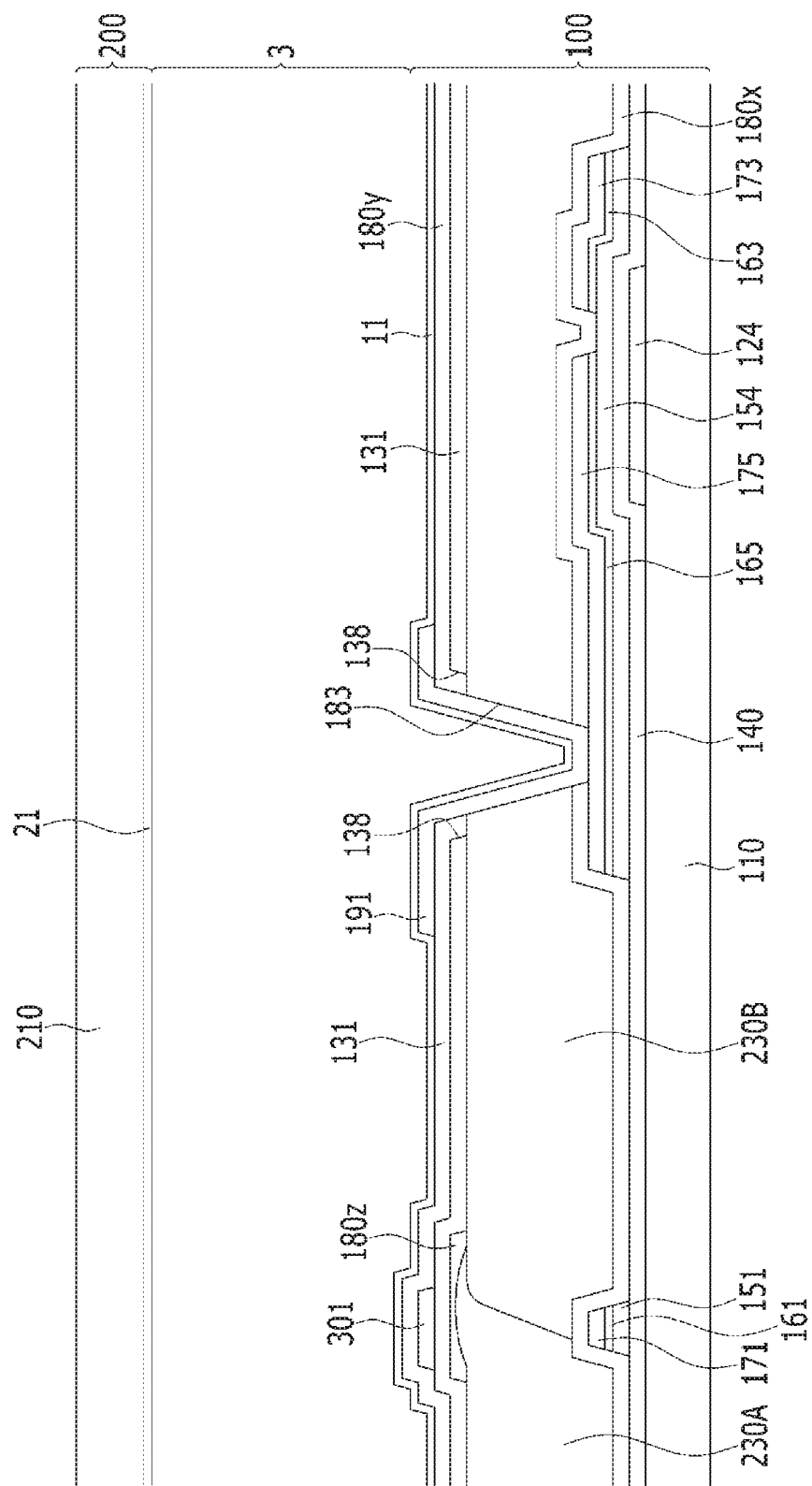
FIG. 8 and FIG. 9 are cross-sectional views of the liquid crystal display according to another exemplary embodiment of the present invention taken along the lines II-II and III-III of FIG. 1.
Figure 9:
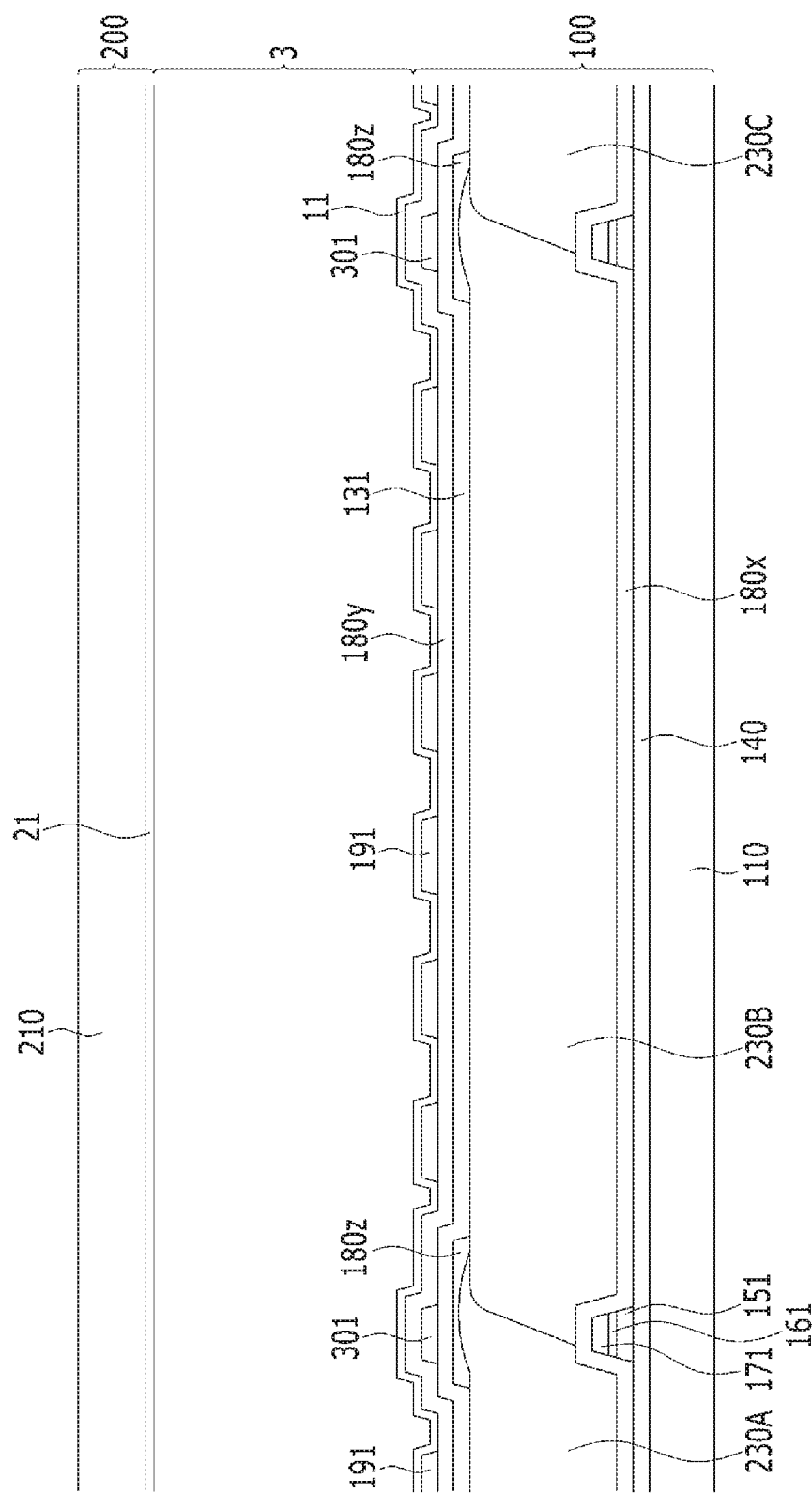

Next, the liquid crystal display according to another exemplary embodiment of the present invention will be described with reference to FIG. 8 and FIG. 9 as well as FIG. 1. FIG. 8 and FIG. 9 are cross-sectional views of the liquid crystal display according to another exemplary embodiment of the present invention taken along the lines II-II and III-III of FIG. 1.

The liquid crystal display according to the exemplary embodiment shown in FIG. 1, FIG. 8, and FIG. 9 is similar to the liquid crystal display according to the exemplary embodiment shown in FIG. 1, FIG. 2, and FIG. 3A. Accordingly, the description of similar portions is omitted.

In contrast to the liquid crystal display according to the exemplary embodiment shown in FIG. 1, FIG. 2, and FIG. 3A, the liquid crystal display according to the present exemplary embodiment further includes the third passivation layer 180z between the color filters 230A, 230B, and 230C and the common electrode 131, and the third passivation layer 180z is only disposed in a portion corresponding to a portion where the common voltage line 301 is disposed. The third passivation layer 180z may be made of the organic material or the inorganic material and may have a flat surface. In this way, the third passivation layer 180z is disposed in the portion corresponding to the portion where the common voltage line 301 is disposed such that the third passivation layer 180z is not formed in the display area (e.g., the area where the pixel electrode 191 is formed) displaying the image, and absorption of the light of the backlight by the third passivation layer 180z including the organic material may therefore be reduced and the reduction of transmittance may be prevented. The third passivation layer 180z is disposed between the data line 171 and the common voltage line 301 such that the parasitic capacitance is decreased between the data line 171 and the common voltage line 301, thereby reducing the signal delay of the data line 171.

All characteristics of the liquid crystal display according to the exemplary embodiment shown in FIG. 1, FIG. 2, and FIG. 3A may be applied to the liquid crystal display according to the present exemplary embodiment. Also, the characteristics and the effects of the several constituent elements according to the above-described exemplary embodiment may be applied to the present exemplary embodiment having the same constituent elements.

Figure 10:
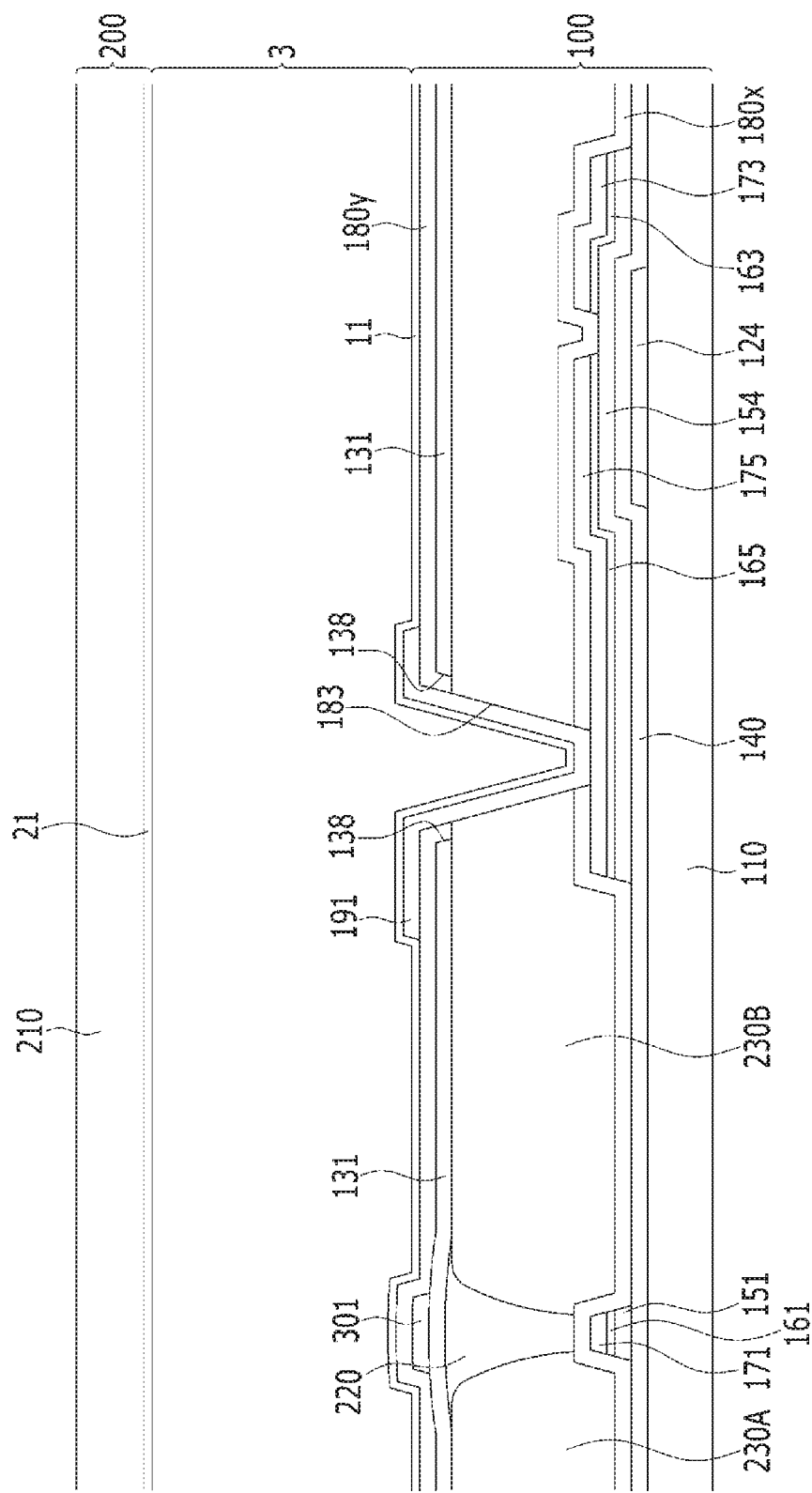
FIG. 10 and FIG. 11 are cross-sectional views of the liquid crystal display according to another exemplary embodiment of the present invention taken along the lines II-II and III-III of FIG. 1.
Figure 11:
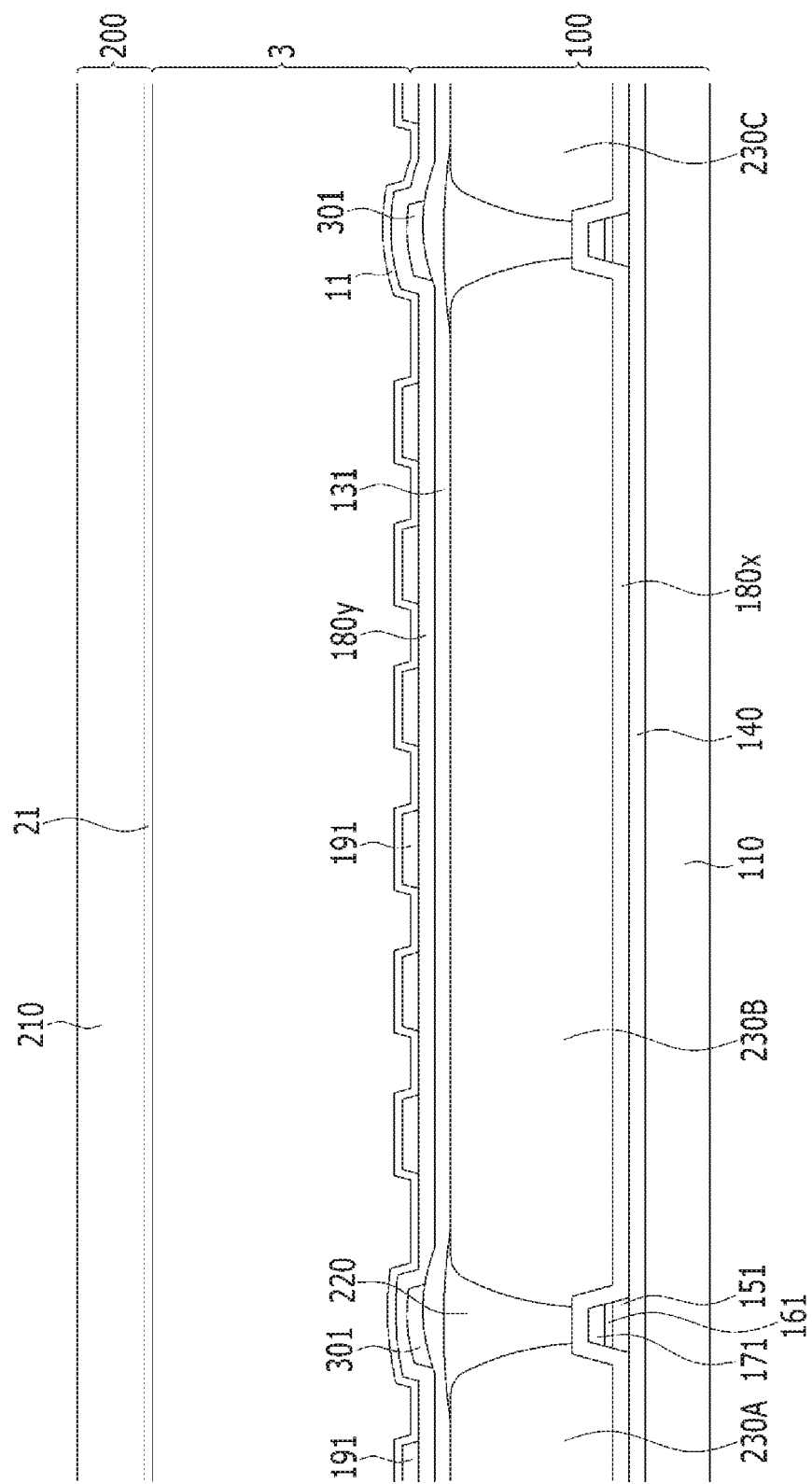

Next, the liquid crystal display according to another exemplary embodiment of the present invention will be described with reference to FIG. 10 and FIG. 11 as well as FIG. 1. FIG. 10 and FIG. 11 are cross-sectional views of the liquid crystal display according to another exemplary embodiment of the present invention taken along the lines II-II and III-III of FIG. 1.

The liquid crystal display according to the exemplary embodiment shown in FIG. 1, FIG. 10, and FIG. 11 is similar to the liquid crystal display according to the exemplary embodiment shown in FIG. 1, FIG. 2, and FIG. 3A. Accordingly, the description of similar portions is omitted.

In contrast to the liquid crystal display according to the exemplary embodiment shown in FIG. 1, FIG. 2, and FIG. 3A, in the liquid crystal display according to the present exemplary embodiment, the color filters 230A, 230B, and 203C of two neighboring pixels with respect to the data line 171 do not overlap, and a light blocking member 220 is disposed between two neighboring color filters 230A, 230B, and 203C. Also, the width of the second portion of the common voltage line 301 disposed at the position corresponding to the data line 171 may be almost equal to that of the data line 171.

All characteristics of the liquid crystal display according to the exemplary embodiment shown in FIG. 1, FIG. 2, and FIG. 3A may be applied to the liquid crystal display according to the present exemplary embodiment. Also, the characteristics and the effects of the several constituent elements according to the above-described exemplary embodiment may be applied to the present exemplary embodiment having the same constituent elements.

Figure 12:
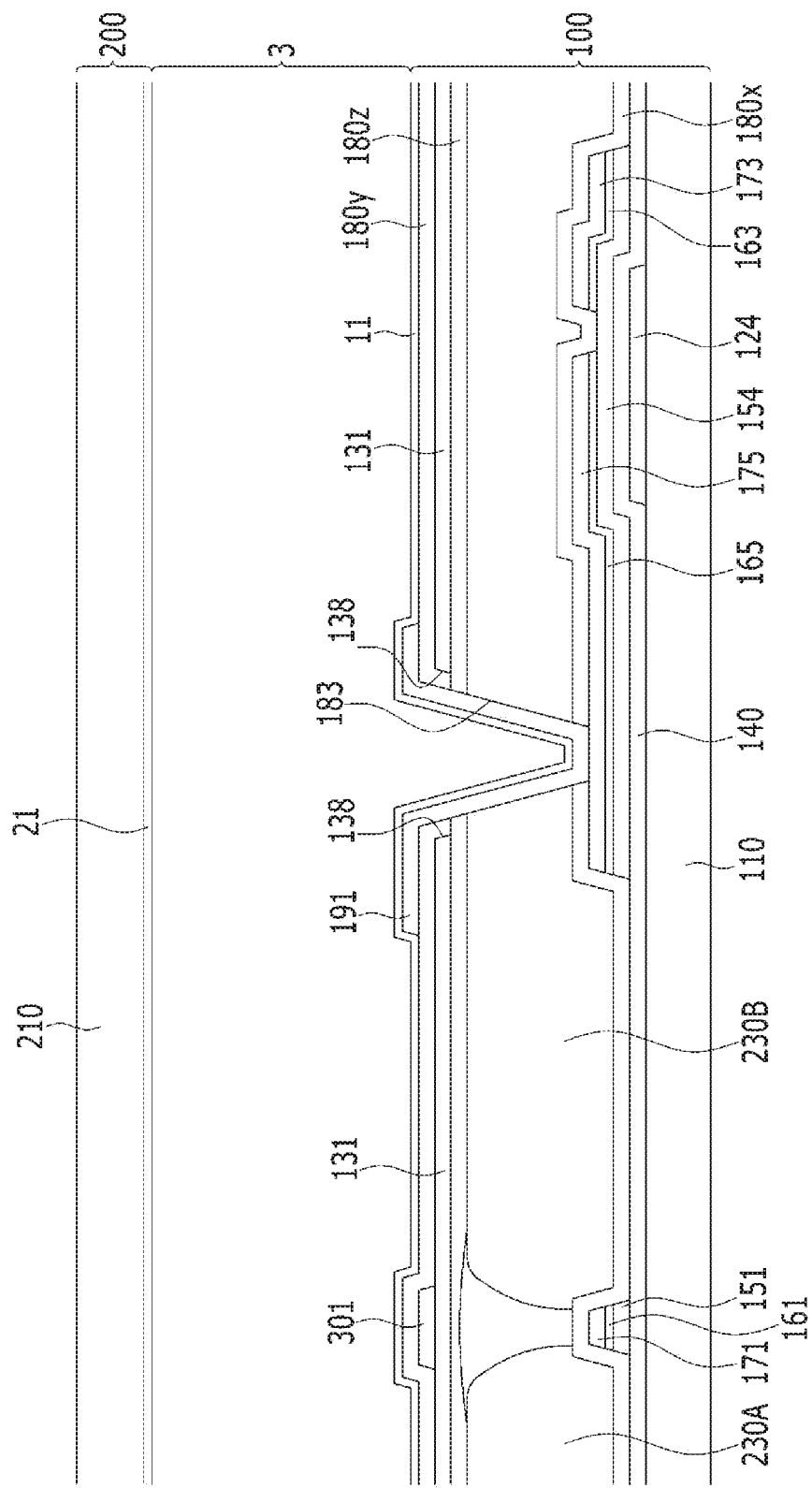
FIG. 12 and FIG. 13 are cross-sectional views of the liquid crystal display according to another exemplary embodiment of the present invention taken along the lines II-II and III-III of FIG. 1.
Figure 13:
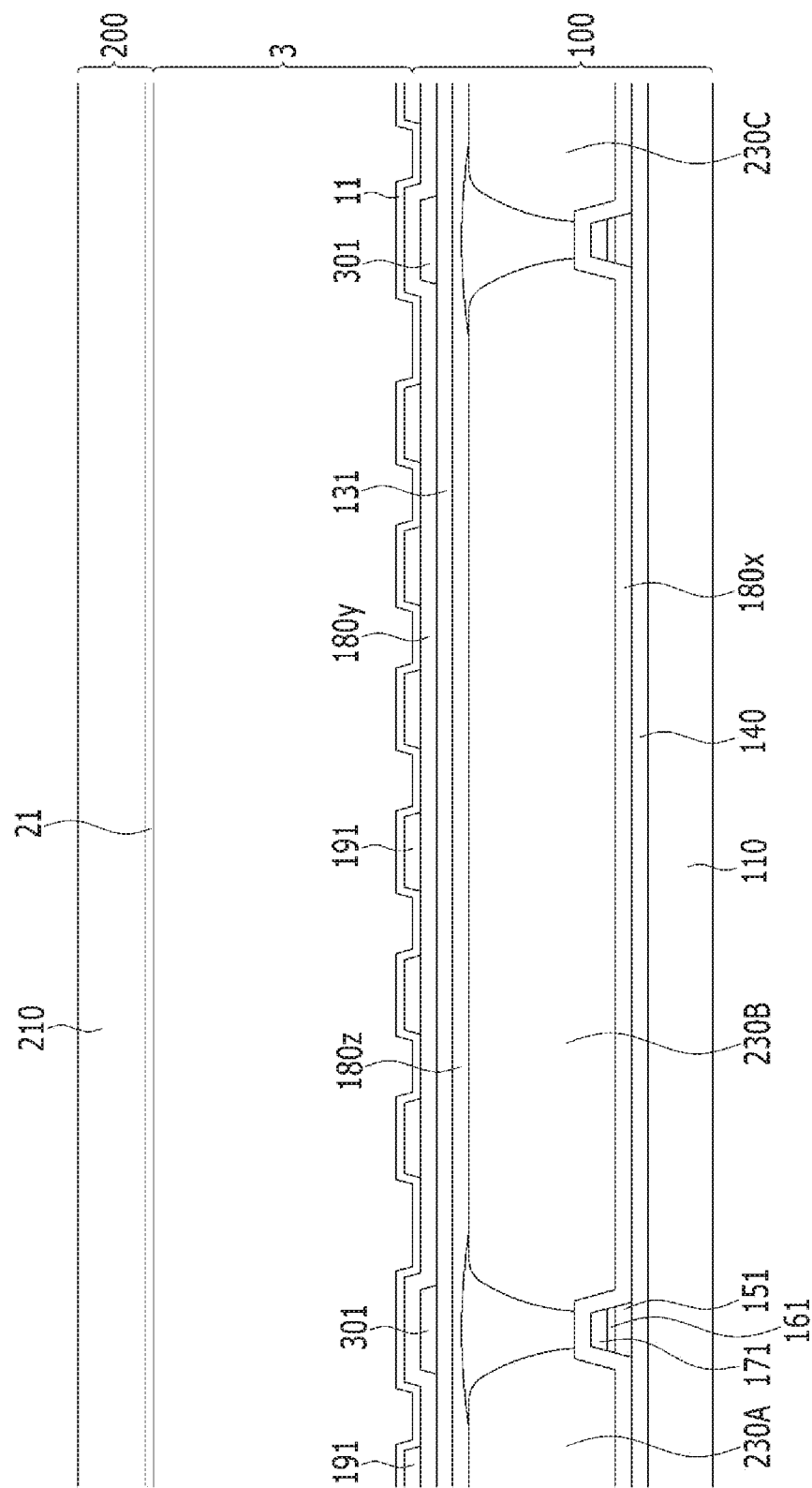

Next, the liquid crystal display according to another exemplary embodiment of the present invention will be described with reference to FIG. 12 and FIG. 13 as well as FIG. 1. FIG. 12 and FIG. 13 are cross-sectional views of the liquid crystal display according to another exemplary embodiment of the present invention taken along the lines II-II and III-III of FIG. 1.

The liquid crystal display according to the exemplary embodiment shown in FIG. 1, FIG. 12, and FIG. 13 is similar to the liquid crystal display according to the exemplary embodiment shown in FIG. 1, FIG. 2, and FIG. 3A. Accordingly, the description of similar portions is omitted.

In contrast to the liquid crystal display according to the exemplary embodiment shown in FIG. 1, FIG. 2, and FIG. 3A, in the liquid crystal display according to the present exemplary embodiment, the color filters 230A, 230B, and 203C of two pixels neighboring with respect to the data line 171 do not overlap, and the light blocking member 220 is disposed between two neighboring color filters 230A, 230B, and 203C. Also, the width of the second portion of the common voltage line 171 disposed at the position corresponding to the data line 171 may be almost equal to that of the data line 171. Also, the liquid crystal display according to the present exemplary embodiment further includes the third passivation layer 180z between the color filters 230A, 230B, and 203C and the light blocking member 220, and the common electrode 131. The third passivation layer 180z may be made of the organic material and may have a flat surface. The third passivation layer 180z is disposed between the data line 171 and the common voltage line 301 such that the parasitic capacitance is decreased between the data line 171 and the common voltage line 301, thereby reducing the signal delay of the data line 171. The third passivation layer 180z reduces a step-formed by the overlapping of the color filters 230A, 230B, and 230C disposed in the neighboring pixels, and thereby the alignment layer 11 may be uniformly rubbed. However, the third passivation layer 180z may be an inorganic insulating layer and may prevent the component of the color filter from being exposed, and at this time, the third passivation layer 180z is formed at a lower temperature than the gate insulating layer 140 such that the deformation and the color change of the color filters 230A, 230B, and 230C may be prevented. Also, the third passivation layer 180z may reduce the transmittance loss according to the refractive index difference between the underlying color filter and the organic insulator.

All characteristics of the liquid crystal display according to the exemplary embodiment shown in FIG. 1, FIG. 2, and FIG. 3A may be applied to the liquid crystal display according to the present exemplary embodiment. Also, the characteristics and the effects of the several constituent elements according to the above-described exemplary embodiment may be applied to the present exemplary embodiment having the same constituent elements.

Figure 14:
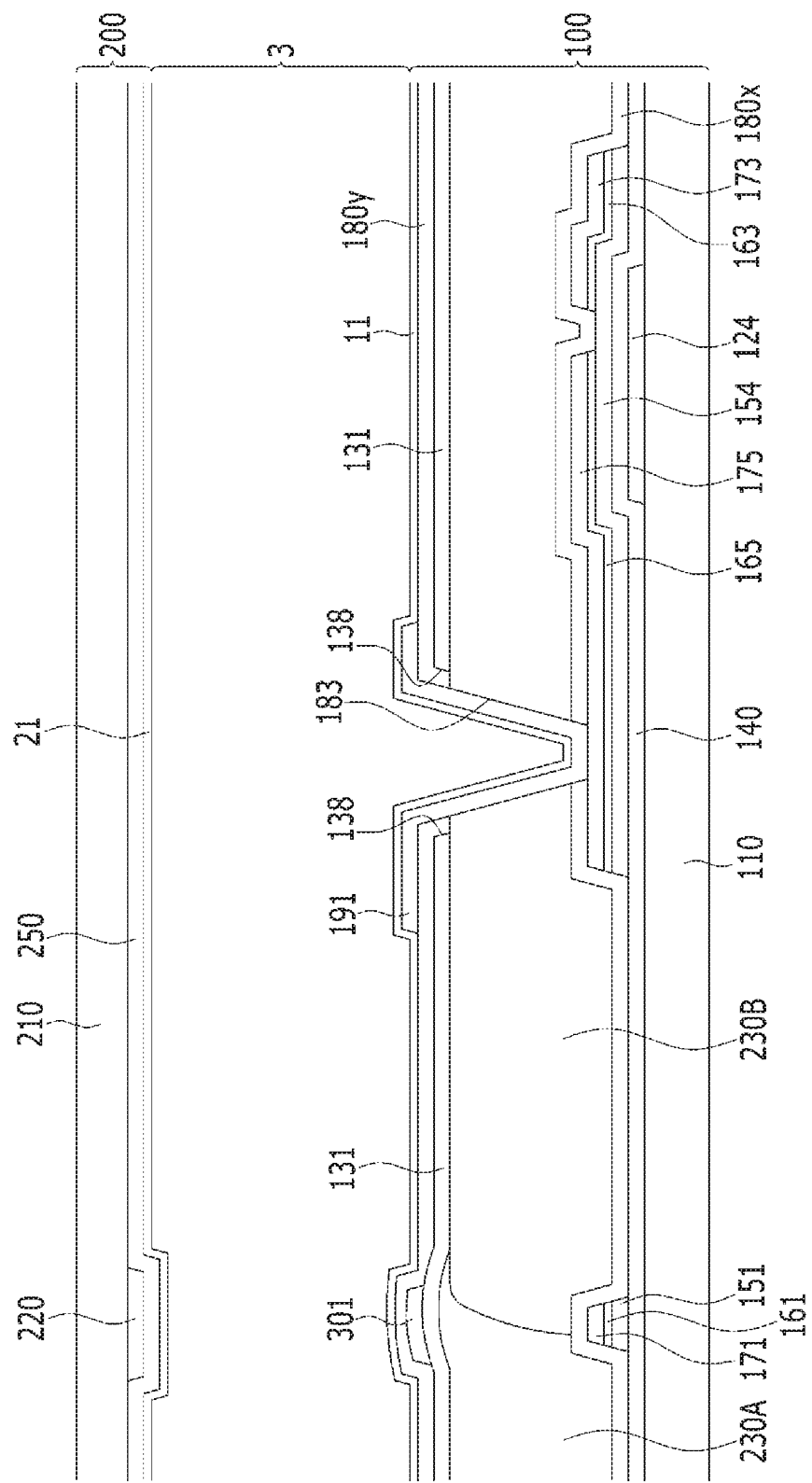
FIG. 14 and FIG. 15 are cross-sectional views of the liquid crystal display according to another exemplary embodiment of the present invention taken along the lines II-II and III-III of FIG. 1.
Figure 15:
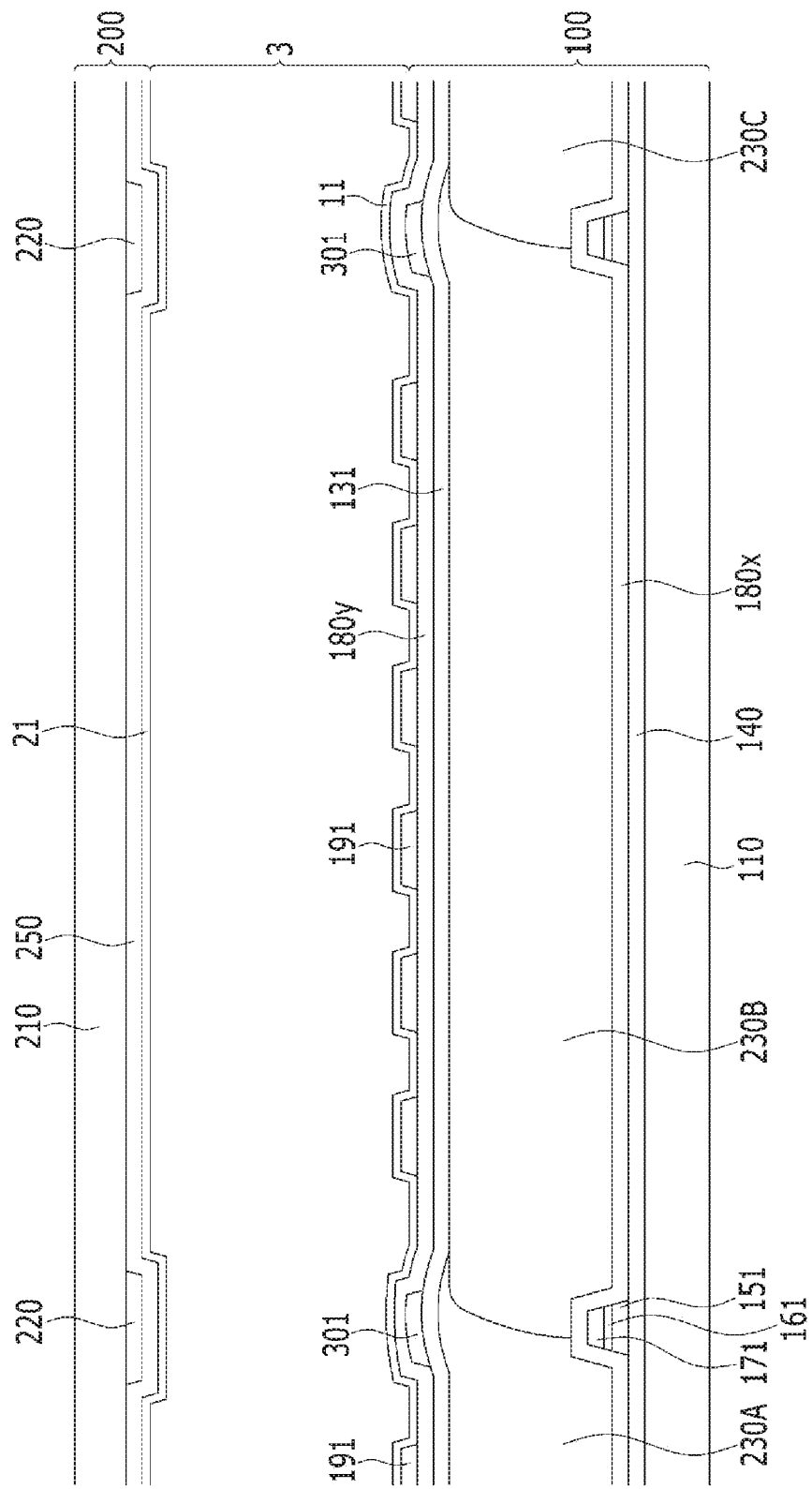

Next, the liquid crystal display according to another exemplary embodiment of the present invention will be described with reference to FIG. 14 and FIG. 15 as well as FIG. 1. FIG. 14 and FIG. 15 are cross-sectional views of the liquid crystal display according to another exemplary embodiment of the present invention taken along the lines II-II and III-III of FIG. 1.

The liquid crystal display according to the exemplary embodiment shown in FIG. 1, FIG. 14, and FIG. 15 is similar to the liquid crystal display according to the exemplary embodiment shown in FIG. 1, FIG. 2, and FIG. 3A. Accordingly, the description of similar portions is omitted.

In contrast to the liquid crystal display according to the exemplary embodiment shown in FIG. 1, FIG. 2, and FIG. 3A, the liquid crystal display according to the present exemplary embodiment further includes the light blocking member 220 disposed in the upper panel 200. The light blocking member 220 may prevent light from passing through the side of the common voltage line 301.

When the light blocking member 220 does not exist, outer light may be reflected from the common voltage line 301, and to prevent the reflected light, the width of the light blocking member 220 should be greater than the width of the common voltage line 301. At this time, when assembling the upper panel 200 and the lower panel 100, when considering a misalignment, the width of the light blocking member should be greater than the width of the common voltage line 301. For example, when a range of the misalignment is about −2 μm to +2 μm, the width of the light blocking member 220 should be greater than the width of the common voltage line 301 by about 4 μm. However, when assembling the upper panel 200 and the lower panel 100, when the degree of misalignment is changed, the difference between the width of the light blocking member 220 and the width of the common voltage line 301 is also changed.

In detail, in the liquid crystal display according to the present exemplary embodiment, the width of the light blocking member 220 is greater than the width of the data line 171, and the width of the data line 171 may be equal to or greater than the width of the common voltage line 301.

In the case of the liquid crystal display according to an exemplary embodiment of the present invention, a color filter 230 is formed in the lower panel 100 such that the error range of the misalignment may be reduced compared with the case where the color filter 230 is disposed in the upper panel 200. According to the present exemplary embodiment, the line width of the light blocking member 220 of the liquid crystal display may be narrow compared with the case where the color filter 230 is disposed in the upper panel 200. In the case of the liquid crystal display according to the present exemplary embodiment, the common voltage line 301 disposed in the lower panel 100 functions as the light blocking member such that the width of the light blocking member 220 may be reduced as compared with the case where the common voltage line 301 does not exist.

In the case of the liquid crystal display according to another exemplary embodiment of the present invention, the common voltage line 301 may be formed of a conductive material. For example, the common voltage line 301 may be made of a conductive organic material having high electrical conductivity, and in this case, the reflection of the light may be prevented such that the light reflected into the side of the common voltage line 301 may be prevented without the light blocking member 220 of the upper panel 200. Accordingly, the aperture ratio of the liquid crystal display may be further improved.

All characteristics of the liquid crystal display according to the exemplary embodiment shown in FIG. 1, FIG. 2, and FIG. 3A may be applied to the liquid crystal display according to the present exemplary embodiment. Also, the characteristics and the effects of the several constituent elements according to the above-described exemplary embodiment may be applied to the present exemplary embodiment having the same constituent elements.

Figure 16:
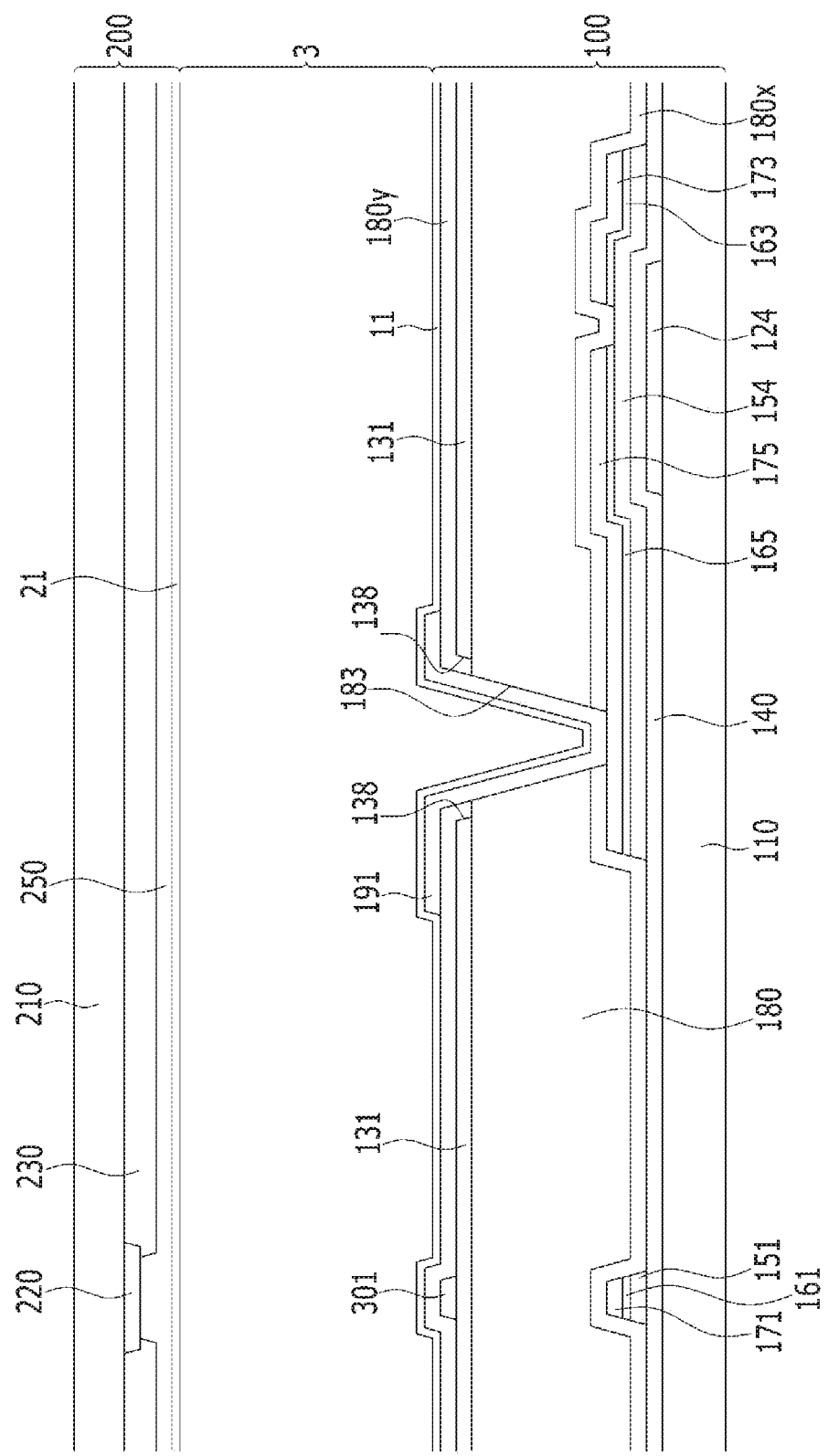
FIG. 16 and FIG. 17 are cross-sectional views of the liquid crystal display according to another exemplary embodiment of the present invention taken along the lines II-II and III-III of FIG. 1.
Figure 17:
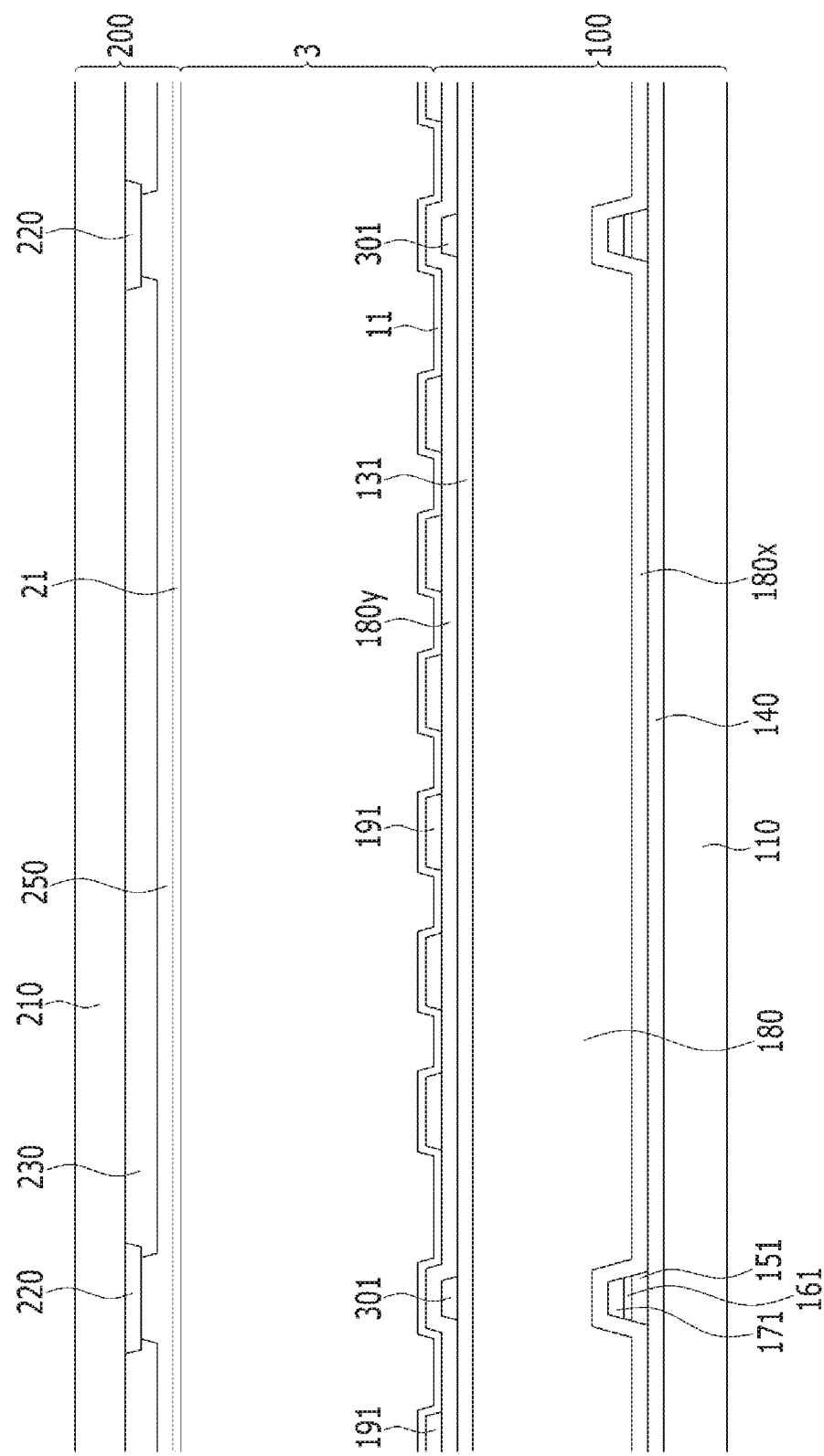

Next, the liquid crystal display according to another exemplary embodiment of the present invention will be described with reference to FIG. 16 and FIG. 17 as well as FIG. 1. FIG. 16 and FIG. 17 are cross-sectional views of the liquid crystal display according to another exemplary embodiment of the present invention taken along the lines II-II and III-III of FIG. 1.

The liquid crystal display according to the exemplary embodiment shown in FIG. 1, FIG. 16, and FIG. 17 is almost the same as the liquid crystal display according to the exemplary embodiment shown in FIG. 1, FIG. 2, and FIG. 3A. Accordingly, the description of similar portions is omitted.

In contrast to the liquid crystal display according to the exemplary embodiment shown in FIG. 1, FIG. 2, and FIG. 3A, the liquid crystal display according to the present exemplary embodiment includes the color filter 230 disposed in the upper panel 200, and the color filter is not disposed in the lower panel 100. In detail, the upper panel 200 includes the insulation substrate 210, and the light blocking member 220 and the color filter 230 formed on the insulation substrate 210. An overcoat 250 may be further formed on the light blocking member 220 and the color filter 230.

In the case of the lower panel 100, an organic layer 180 is disposed between the first passivation layer 180x and the common electrode 131. The surface of the organic layer 180 is flat. At this time, the first passivation layer 180x may be omitted.

The light blocking member 220 may prevent the light from passing through the side of the common voltage line 301.

When the light blocking member 220 does not exist, outer light may be reflected from the common voltage line 301, and to prevent the reflected light, the width of the light blocking member 220 should be greater than the width of the common voltage line 301. At this time, when assembling the upper panel 200 and the lower panel 100, when considering a misalignment, the width should be greater than the width of the common voltage line 301, and for example, when a range of the misalignment is about −2 μm to +2 μm, the width of the light blocking member 220 should be greater than the width of the common voltage line 301 by about 4 μm. However, when assembling the upper panel 200 and the lower panel 100, when the degree of misalignment is changed, the difference between the width of the light blocking member 220 and the width of the common voltage line 301 is also changed.

In the liquid crystal display according to the present exemplary embodiment, the width of the light blocking member 220 is greater than the width of the data line 171, and the width of the data line 171 may be equal to or greater than the width of the common voltage line 301.

All characteristics of the liquid crystal display according to the exemplary embodiment shown in FIG. 1, FIG. 2, and FIG. 3A may be applied to the liquid crystal display according to the present exemplary embodiment. Also, the characteristics and the effects of the several constituent elements according to the above-described exemplary embodiment may be applied to the present exemplary embodiment having the same constituent elements.

Figure 18:
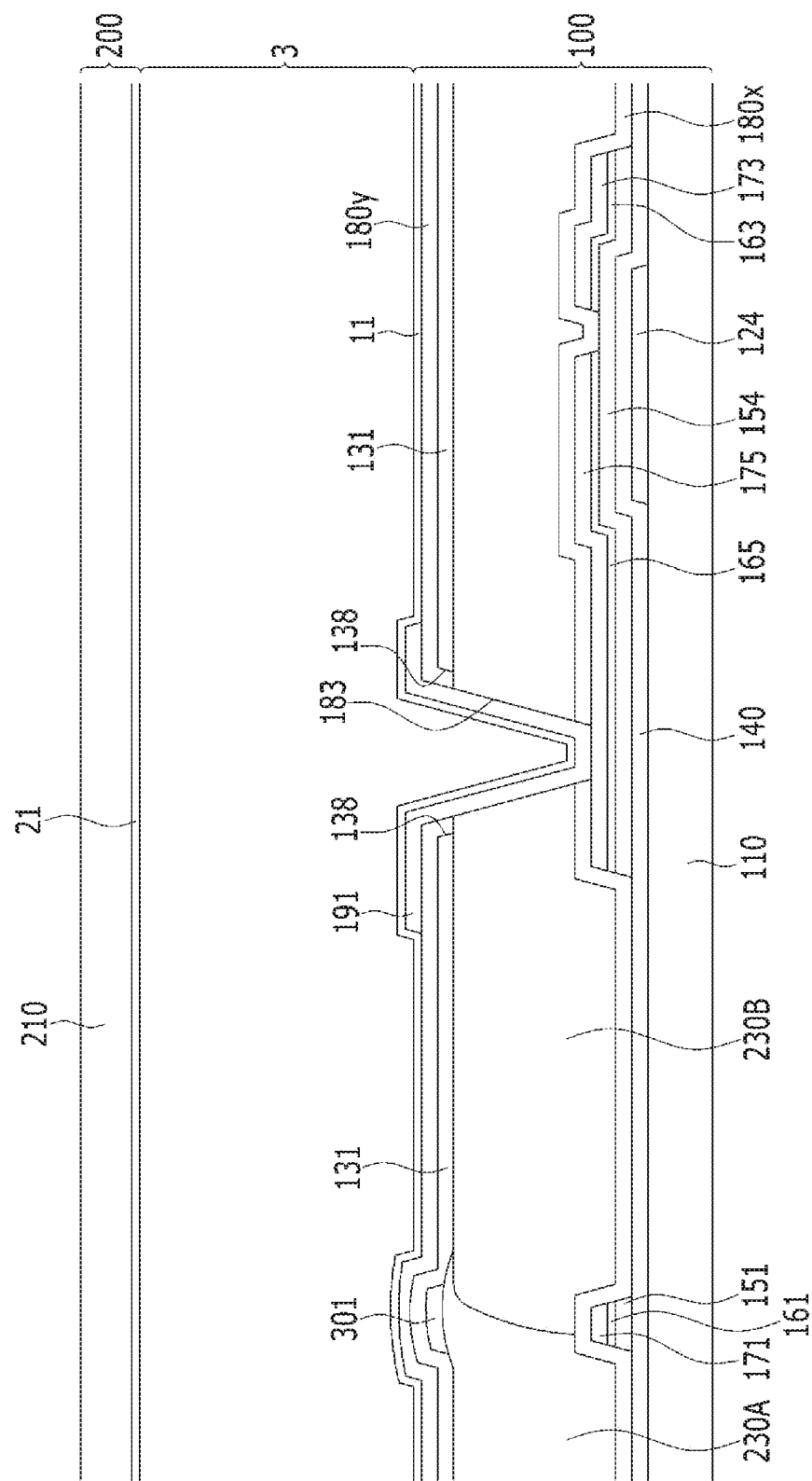
FIG. 18 and FIG. 19 are cross-sectional views of the liquid crystal display according to another exemplary embodiment of the present invention taken along the lines II-II and III-III of FIG. 1.
Figure 19:
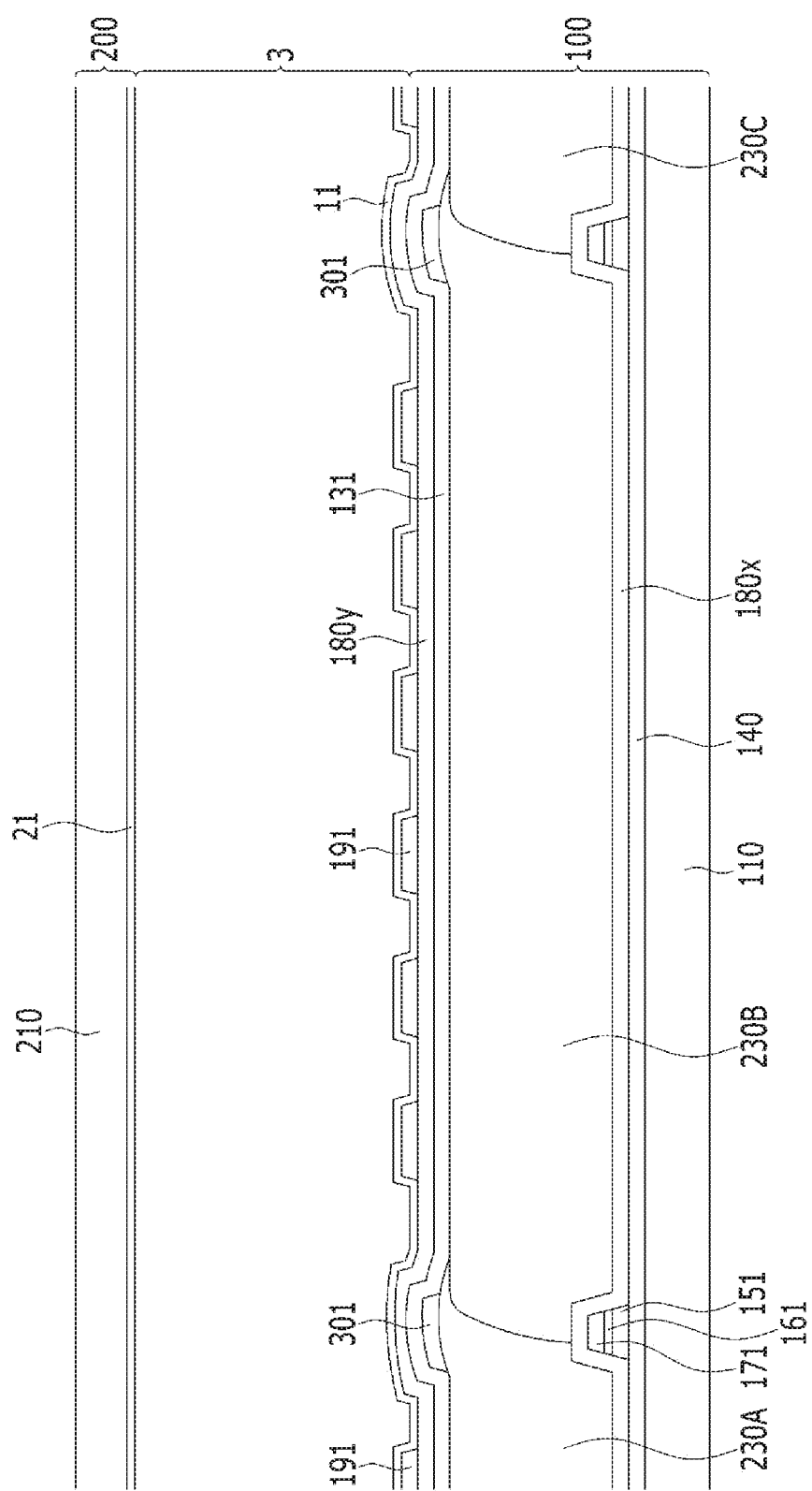

Next, a liquid crystal display according to another exemplary embodiment of the present invention will be described with reference to FIG. 18 and FIG. 19. FIG. 18 and FIG. 19 are cross-sectional views of the liquid crystal display according to another exemplary embodiment of the present invention taken along the lines II-II and III-III of FIG. 1.

The liquid crystal display according to the exemplary embodiment shown in FIG. 1, FIG. 19, and FIG. 19 is almost the same as the liquid crystal display according to the exemplary embodiment shown in FIG. 1, FIG. 2, and FIG. 3A. Accordingly, the description of similar portions is omitted.

In contrast to the liquid crystal display according to the exemplary embodiment shown in FIG. 1, FIG. 2, and FIG. 3A, in the liquid crystal display according to the present exemplary embodiment, the common voltage line 301 is disposed under the common electrode 131 and directly contacts the common electrode 131.

In the liquid crystal displays according to the exemplary embodiments described with reference to FIG. 1 to FIG. 17, the common voltage line 301 is disposed above the common electrode 131.

All characteristics of the liquid crystal display according to the exemplary embodiment shown in FIG. 1, FIG. 2, and FIG. 3A may be applied to the liquid crystal display according to the present exemplary embodiment. Also, the characteristics and the effects of the several constituent elements according to the above-described exemplary embodiment may be applied to the present exemplary embodiment having the same constituent elements.

Figure 20:
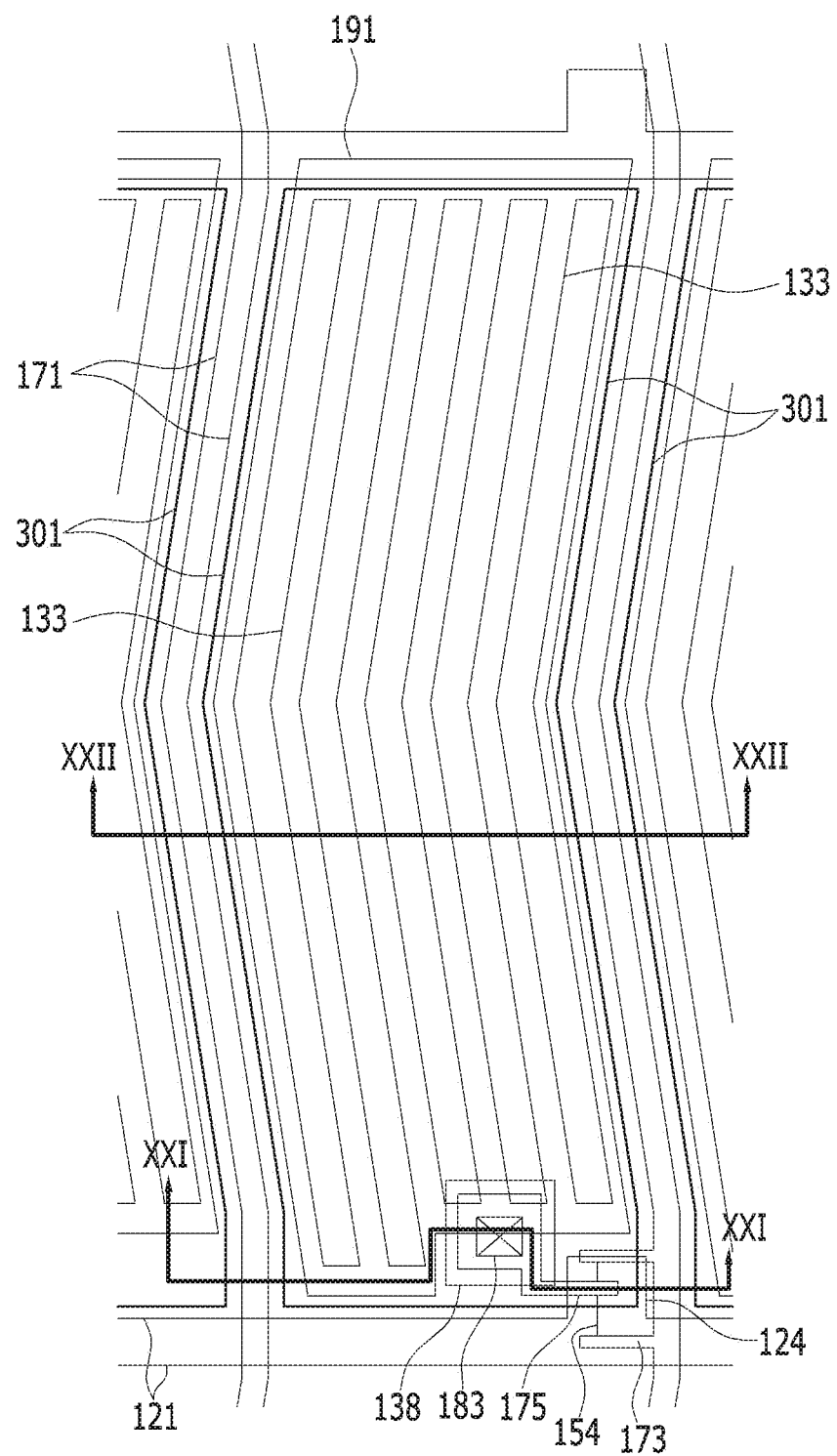
FIG. 20 is a layout view of a liquid crystal display according to another exemplary embodiment of the present invention.
Figure 21:
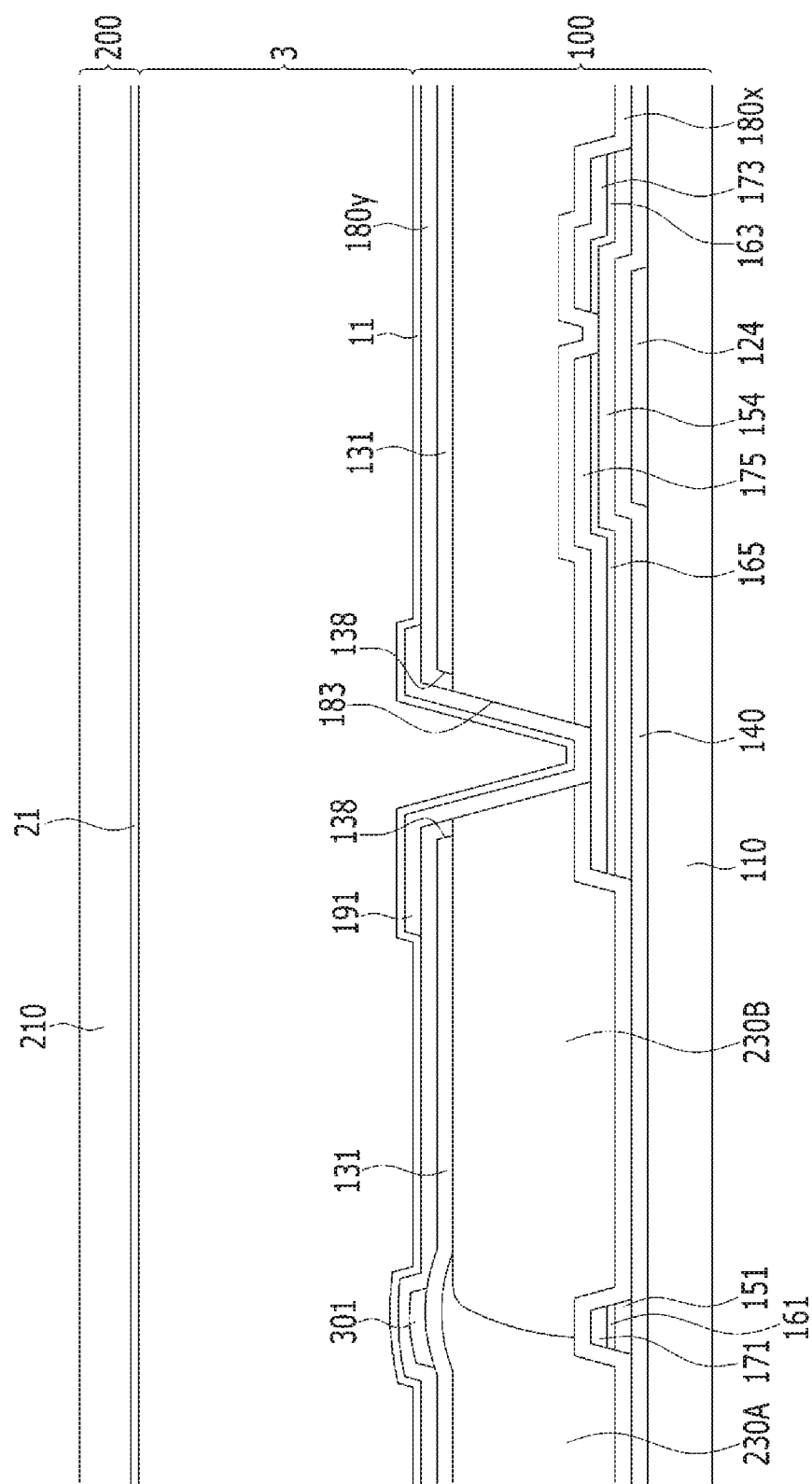
FIG. 21 and FIG. 22 are cross-sectional views of the liquid crystal display taken along the lines XXI-XXI and XXII-XXII of FIG. 20.
Figure 22:
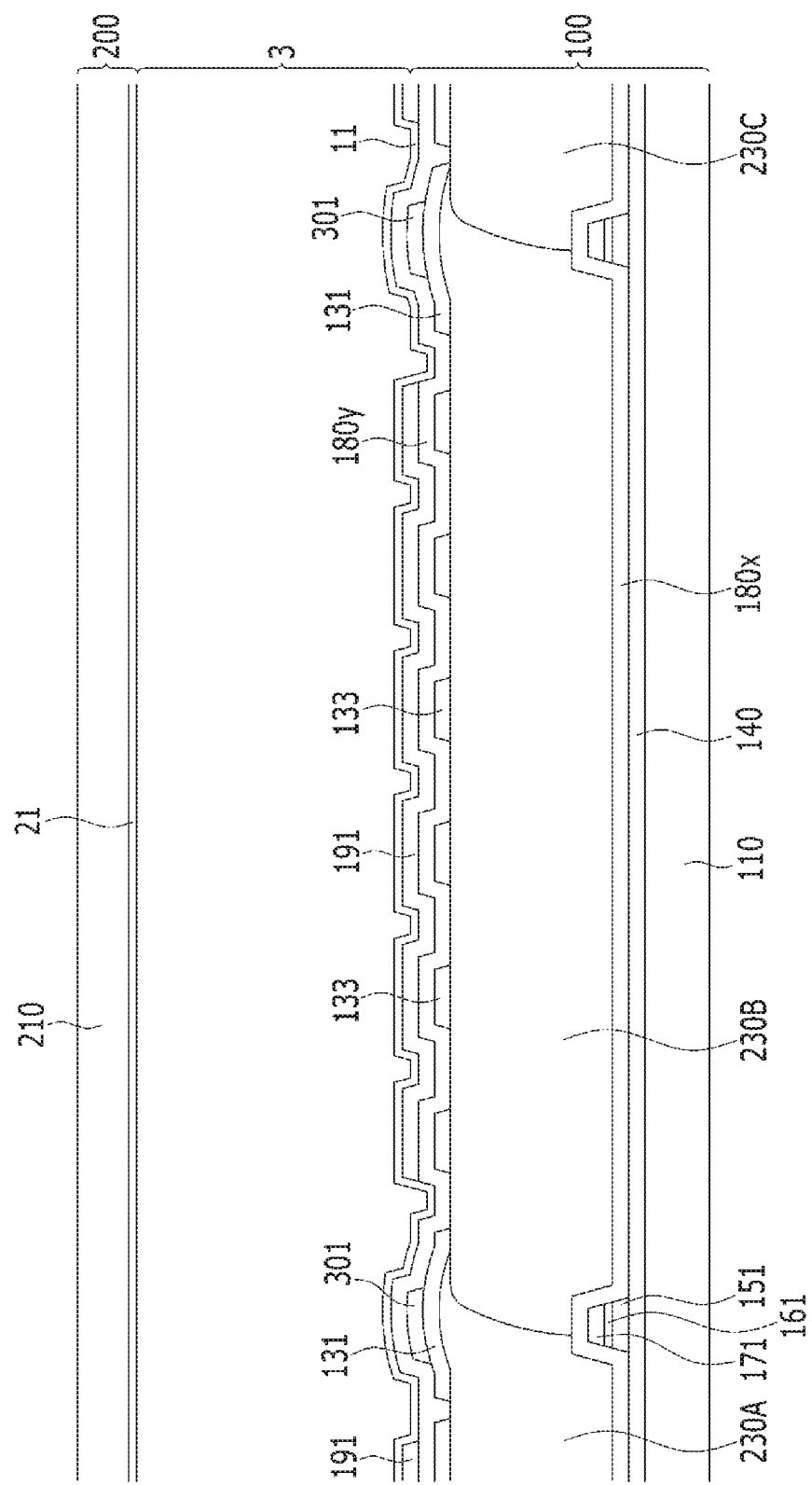

Next, a liquid crystal display according to another exemplary embodiment of the present invention will be described with reference to FIG. 20, FIG. 21, and FIG. 22. FIG. 20 is a layout view of a liquid crystal display according to another exemplary embodiment of the present invention, and FIG. 21 and FIG. 22 are cross-sectional views of the liquid crystal display taken along the lines XXI-XXI and XXII-XXII of FIG. 20.

The liquid crystal display according to the present exemplary embodiment includes a lower panel 100 and an upper panel 200 facing each other, and a liquid crystal layer 3 interposed between two display panels 100 and 200.

First, the lower panel 100 will be described. A plurality of gate lines 121, including a plurality of gate electrodes 124, are formed on an insulation substrate 110, and a gate insulating layer 140 is formed on the gate line 121. A plurality of semiconductors 151 including a plurality of protrusions 154 are formed on the gate insulating layer 140, and a plurality of ohmic contacts 161, 163, and 165 are formed on the semiconductor 151 and 154. A data conductor including a plurality of data lines 171 and a plurality of drain electrodes 175 is formed on the ohmic contacts 161, 163, and 165. The data line 171 is periodically bent and forms an oblique angle with respect to the extending direction of the gate line 121. The oblique angle between the data line 171 and the extending direction of the gate line 121 may be 45 degrees or more. However, in the case of a liquid crystal display according to another exemplary embodiment of the present invention, the data line 171 may be extended in a straight line.

A first passivation layer 180x is positioned on the data conductors 171 and 175 and the exposed semiconductor protrusion 154, and the first passivation layer 180x may be made of an organic insulating material or an inorganic insulating material.

A plurality of color filters 230A, 230B, and 230C are formed on the first passivation layer 180x. Each of the color filters 230A, 230B, and 230C may uniquely display one of primary colors, for example, three primary colors of red, green, and blue, or yellow, cyan, and magenta. Although not shown, the color filters may further include a color filter displaying a mixture of the primary colors or white, as well as the primary color. The color filters 230A, 230B, and 230C are made of an organic material. Each of the color filters 230A, 230B, and 230C may be extended to the data line 171, and two neighboring color filters 230A and 230B, or 230B and 230C, may overlap on the boundary of the data line 171.

A plurality of common electrodes 131 are formed on the color filters 230A, 230B, and 230C. The common electrodes 131 may be made of a transparent conductive material such as ITO or IZO. The common electrode 131 may have an opening 138 disposed on a region corresponding to the main edge of the drain electrode 175. The common electrodes 131 disposed in neighboring pixels are connected to each other. Each common electrode 131 includes a plurality of branch electrodes 133 disposed in each pixel area. The branch electrodes 133 are substantially parallel to each other and may be bent according to the data line 171. However, in the case of a liquid crystal display according to another exemplary embodiment of the present invention, the data line 171 and the branch electrode 133 of the common electrode 131 may be extended in one straight line.

A common voltage line 301 is disposed on the common electrode 131 and directly contacts the common electrode 131. The common voltage line 301 includes a first portion parallel to the gate line 121 and a second portion parallel to the data line 171, and the first portion and the second portion are connected to each other. However, in the case of a liquid crystal display according to another exemplary embodiment of the present invention, at least one of the first portion and the second portion may be omitted.

The common voltage line 301 may be made of a metal that is opaque and has conductivity, in contrast to the common electrode 131. Also, the second portion of the common voltage line 301 disposed on the data line 171 may have a width that is equal to or greater than that of the data line 171, thereby preventing light leakage between two neighboring pixels with respect to the data line 171. Accordingly, a light blocking member between two neighboring pixels with respect to the data line 171 may be omitted.

The common electrode 131 and the common voltage line 301 may be simultaneously formed through one photolithography process using one mask. In detail, after the first conductive layer 130 forming the common electrode 131 and the second conductive layer 300 that is opaque and forming the common voltage line 301 are sequentially deposited, the first photosensitive film pattern has different thicknesses according to positions. Next, after the second conductive layer and the first conductive layer are simultaneously etched by using the first photosensitive film pattern as an etching mask, the height of the first photosensitive film pattern is decreased and simultaneously the thin photosensitive film pattern is removed to form the second photosensitive film pattern. The second conductive layer is etched by using the second photosensitive film pattern as the etching mask such that the common electrode 131 and the common voltage line 301 may be formed through one photolithography process.

A second passivation layer 180y is disposed on the common electrode 131 and the common voltage line 301. The second passivation layer 180y may be made of organic insulating material or inorganic insulating material.

A pixel electrode 191 is formed on the second passivation layer 180y. The pixel electrode 191 may have a plane shape filling most of the region enclosed by the gate line 121 and the data line 171. The entire shape of the pixel electrode 191 may be a polygon having edges substantially parallel to the gate line 121 and the data line 171. The pixel electrode 191 may be made of a transparent conductive material such as ITO or IZO.

The first passivation layer 180x, the color filter 230B, and the second passivation layer 180y have a plurality of contact holes 183 exposing the drain electrode 175, and the pixel electrode 191 is electrically connected to the drain electrode 175 through the contact hole 183, thereby receiving a data voltage.

The contact hole 183 is formed at a position corresponding to the opening 138 of the common electrode 131.

The data voltage applied to the pixel electrode 191 and the common voltage applied to the common electrode 131 generates an electric field to the liquid crystal layer 3.

The branch electrode 133 of the common electrode 131 overlaps the pixel electrode 191.

In the case of the liquid crystal display according to the present exemplary embodiment, the common electrode 131 covers a plurality of data lines 171 at one time and overlaps the data line 171. Accordingly, crosstalk is reduced between the data line 171 and the pixel electrode 191 and light leakage by a parasitic capacitance between the data line 171 and the neighboring pixel electrode 191 may be reduced.

A first alignment layer 11 is coated on an inner surface of the lower panel 100.

Next, the upper panel 200 will be described.

A second alignment layer 21 is coated on an insulation substrate 210.

The first alignment layer 11 and the second alignment layer 21 may be horizontal alignment layers.

The liquid crystal layer 3 interposed between the lower panel 100 and the upper panel 200 includes liquid crystal molecules, wherein the liquid crystal molecules may be aligned so that a major axis thereof is formed to be horizontal with respect to the surfaces of the two display panels 100 and 200 in the state where an electric field is not present.

A backlight unit (not shown) generating and providing light to the two display panels 100 and 200 may be provided outside the substrate 110 of the lower panel 100.

The data voltage applied to the pixel electrode 191 generates an electric field in the liquid crystal layer 3 together with the common voltage applied to the electrode 131, thereby determining the direction of the liquid crystal molecules of the liquid crystal layer 3 and displaying a corresponding image.

The liquid crystal display according to the present exemplary embodiment includes the common voltage line 301 disposed directly on the common electrode 131 and extending according to the gate line 121 or the data line 171. Accordingly, the signal delay of the common voltage applied to the common electrode 131 is simultaneously prevented, the contact hole to connect the common electrode 131 and the common voltage line 301 is not needed, and the common voltage line 301 overlaps the opaque signal lines 121 and 171 such that the aperture ratio of the liquid crystal display is increased.

Also, the liquid crystal display according to the present exemplary embodiment includes the common electrode 131 covering the data line 171 such that the crosstalk between the data line 171 and the pixel electrode 191 may be reduced by the common electrode 131 and the light leakage by the parasitic capacitance between the data line 171 and the neighboring pixel electrode 191 may be reduced. Also, the liquid crystal display according to the present exemplary embodiment includes the common voltage line 301 having the width that is equal to or greater than the data line 171 such that the light leakage between two neighboring pixels with respect to the data line 171 may be prevented, and the additional light blocking member may be omitted, and thereby the aperture ratio of the liquid crystal display may be increased and the manufacturing cost may be reduced.

All characteristics of the liquid crystal display according to the exemplary embodiment shown in FIG. 1, FIG. 2, and FIG. 3A may be applied to the liquid crystal display according to the present exemplary embodiment. Also, the characteristics and the effects of the several constituent elements according to the above-described exemplary embodiment may be applied to the present exemplary embodiment having the same constituent elements.

Figure 23:
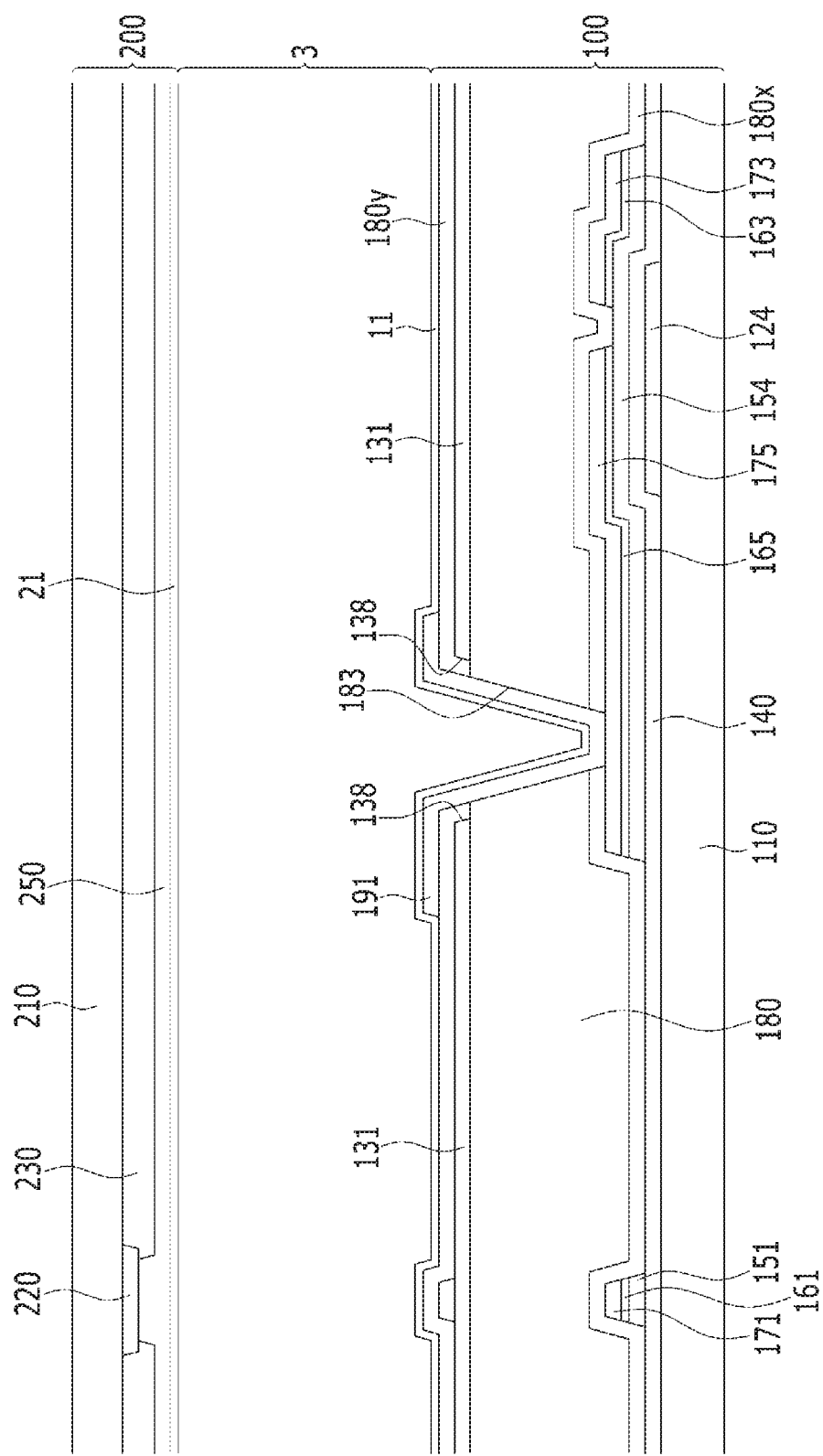
FIG. 23 and FIG. 24 are cross-sectional views of the liquid crystal display according to another exemplary embodiment of the present invention taken along the lines XXI-XXI and XXII-XXII of FIG. 20.
Figure 24:
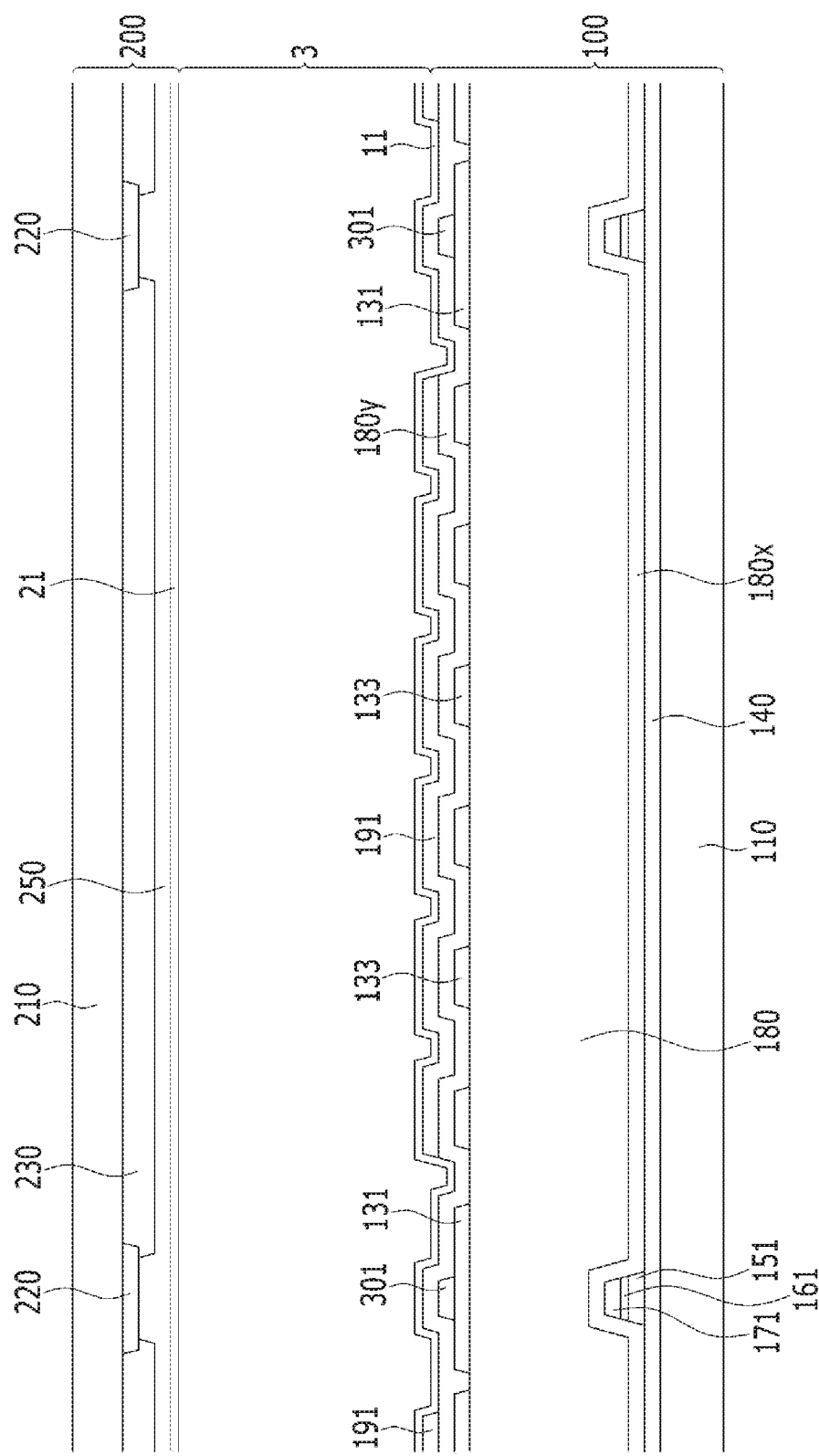

Next, a liquid crystal display according to another exemplary embodiment of the present invention will be described with reference to FIG. 23 and FIG. 24 as well as FIG. 20. FIG. 23 and FIG. 24 are cross-sectional views of the liquid crystal display according to another exemplary embodiment of the present invention taken along the lines XXI-XXI and XXII-XXII of FIG. 20.

The liquid crystal display according to the exemplary embodiment shown in FIG. 20, FIG. 23, and FIG. 24 is almost the same as the liquid crystal display according to the exemplary embodiment shown in FIG. 20, FIG. 21, and FIG. 22. Accordingly, the description of similar portions is omitted.

In contrast to the liquid crystal display according to the exemplary embodiment shown in FIG. 20, FIG. 21, and FIG. 22, in the liquid crystal display according to the present exemplary embodiment, a color filter 230 is disposed in the upper panel 200. In detail, the upper panel 200 includes an insulation substrate 210, and a light blocking member 220 and a color filter 230 formed on the insulation substrate 210. An overcoat 250 may be further formed on the light blocking member 220 and the color filter 230.

In the case of the lower panel 100, an organic layer 180 is disposed between the first passivation layer 180x and the common electrode 131. The surface of the organic layer 180 is flat. The first passivation layer 180x may be omitted.

When the light blocking member 220 does not exist, outer light may be reflected from the common voltage line 301, and to prevent the reflected light, the width of the light blocking member 220 should be greater than the width of the common voltage line 301. At this time, when assembling the upper panel 200 and the lower panel 100, when considering a misalignment, the width of the light blocking member 220 should be greater than the width of the common voltage line 301. For example, when a range of the misalignment is about −2 μm to +2 μm, the width of the light blocking member 220 should be greater than the width of the common voltage line 301 by about 4 μm. However, when assembling the upper panel 200 and the lower panel 100, when the degree of misalignment is changed, the difference between the width of the light blocking member 220 and the width of the common voltage line 301 is also changed.

In the liquid crystal display according to the present exemplary embodiment, the width of the light blocking member 220 is greater than the width of the data line 171 and the width of the data line 171 may be equal to or wider than the width of the common voltage line 301.

All characteristics of the liquid crystal display according to the exemplary embodiment shown in FIG. 1, FIG. 2, and FIG. 3A and the liquid crystal display according to the exemplary embodiment shown in FIG. 20, FIG. 21, and FIG. 22 may be applied to the liquid crystal display according to the present exemplary embodiment. Also, the characteristics and the effects of the several constituent elements according to the above-described exemplary embodiment may be applied to the present exemplary embodiment having the same constituent elements.

Figure 25:
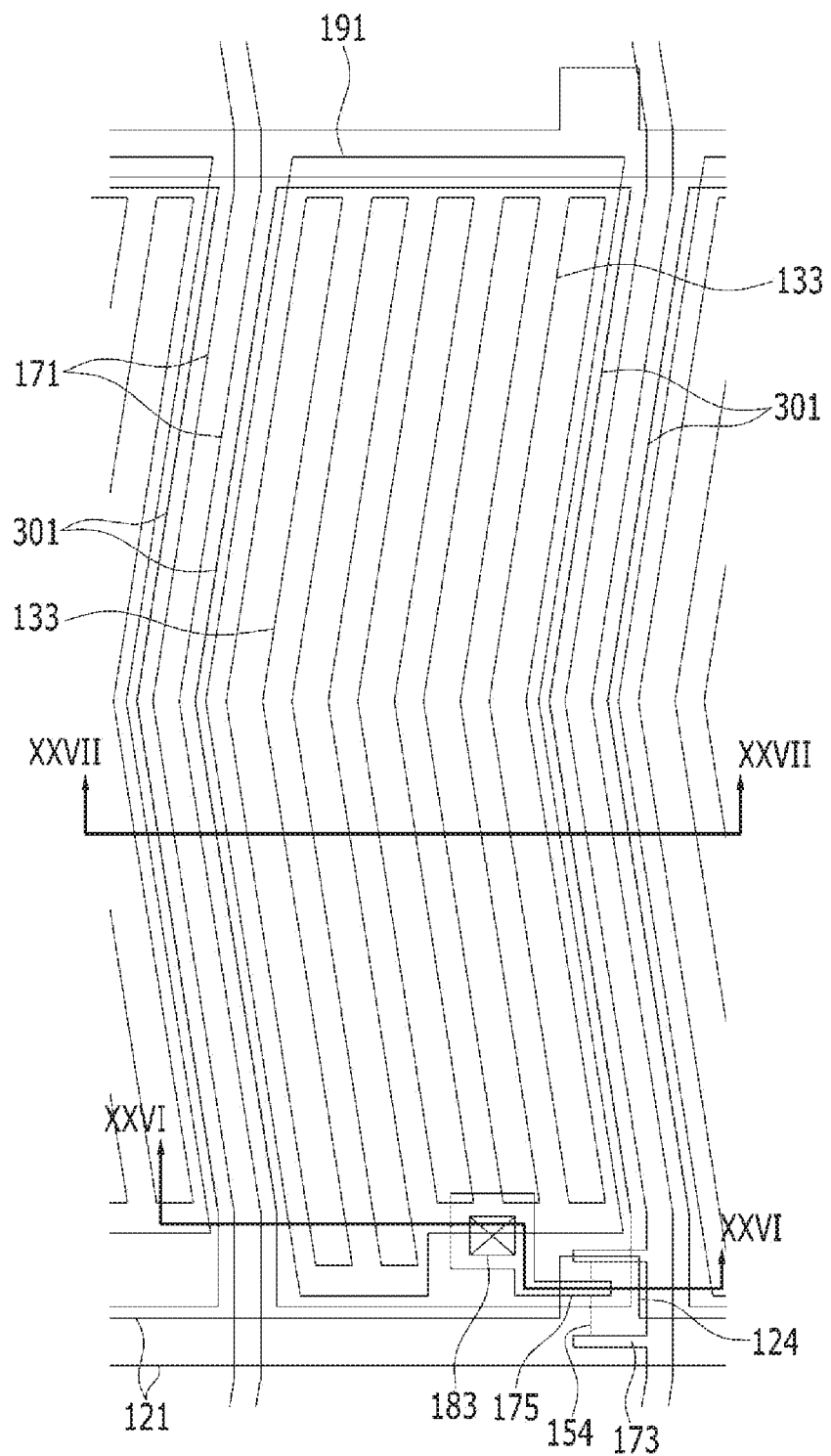
FIG. 25 is a layout view of a liquid crystal display according to another exemplary embodiment of the present invention.
Figure 26:
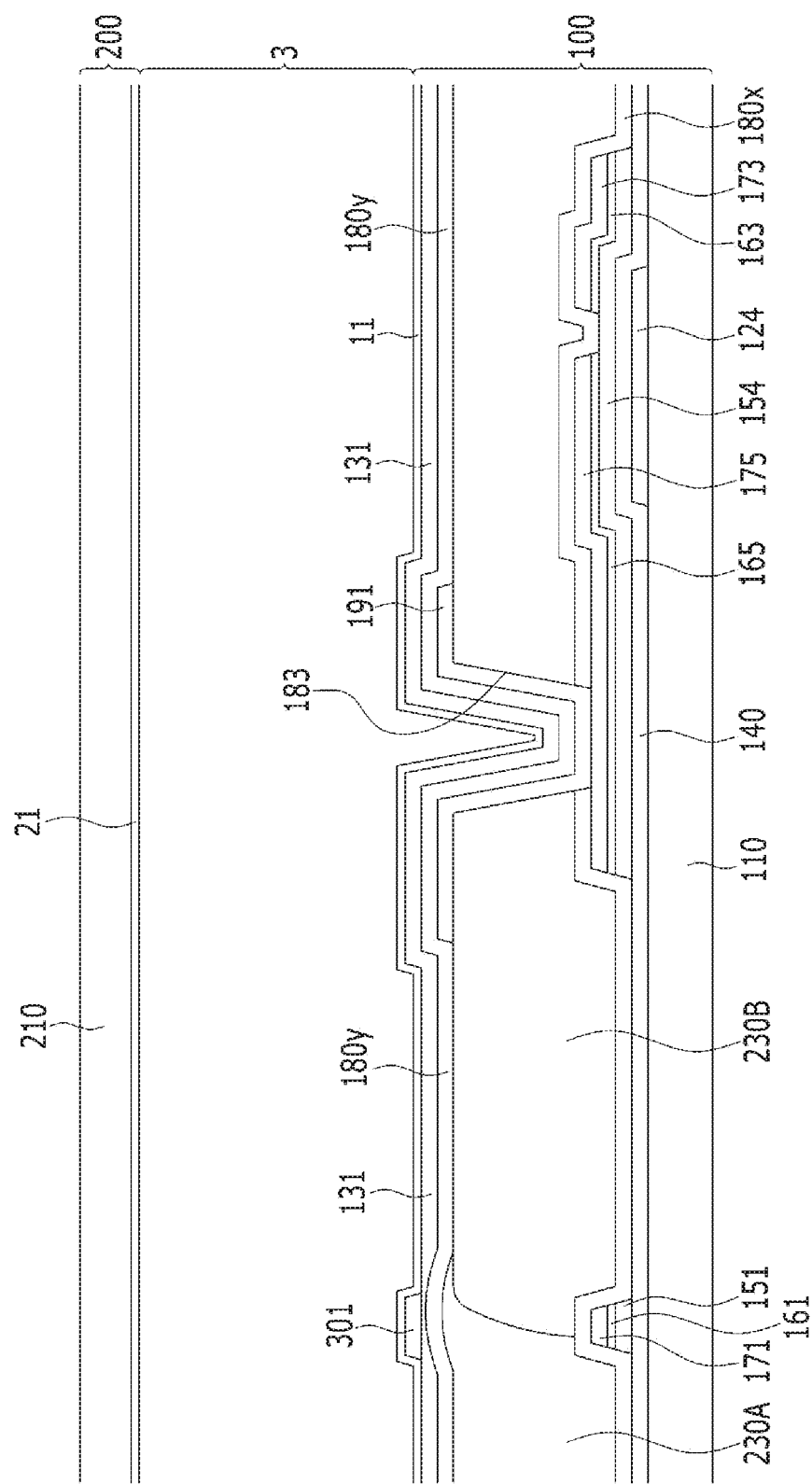
FIG. 26 and FIG. 27 are cross-sectional views of the liquid crystal display taken along the lines XXVI-XXVI and XXVII-XXVII of FIG. 25.
Figure 27:
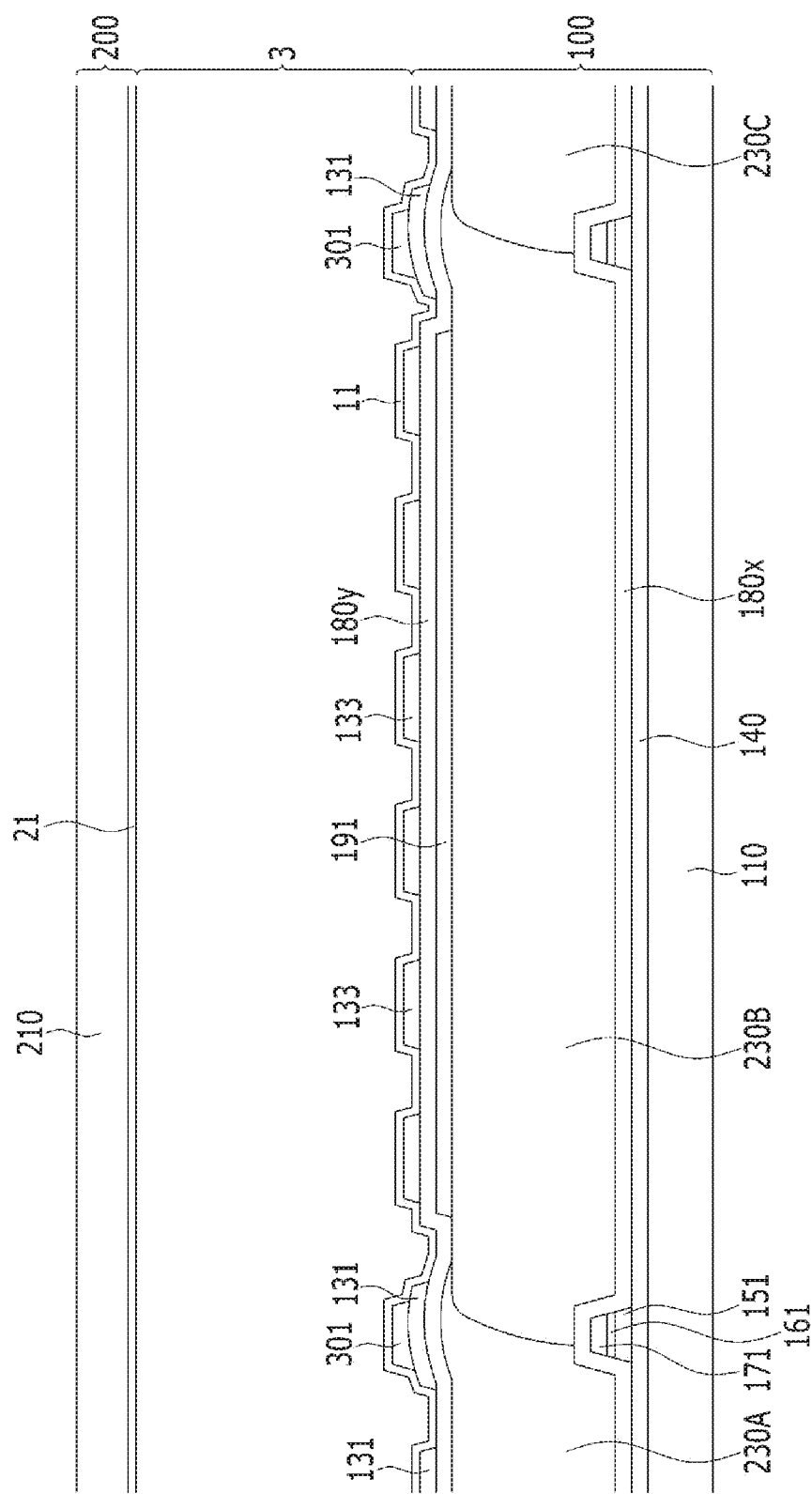

Next, a liquid crystal display according to another exemplary embodiment of the present invention will be described with reference to FIG. 25, FIG. 26, and FIG. 27. FIG. 25 is a layout view of a liquid crystal display according to another exemplary embodiment of the present invention, and FIG. 26 and FIG. 27 are cross-sectional views of the liquid crystal display taken along the lines XXVI-XXVI and XXVII-XXVII of FIG. 25.

The liquid crystal display according to the present exemplary embodiment includes a lower panel 100 and an upper panel 200 facing each other, and a liquid crystal layer 3 interposed between the two display panels 100 and 200.

First, the lower panel 100 will be described. A plurality of gate lines 121, including a plurality of gate electrodes 124, are formed on an insulation substrate 110, and a gate insulating layer 140 is formed on the gate line 121. A plurality of semiconductors 151 including a plurality of protrusions 154 are formed on the gate insulating layer 140, and a plurality of ohmic contacts 161, 163, and 165 are formed on the semiconductors 151 and 154. A data conductor including a plurality of data lines 171 and a plurality of drain electrodes 175 is formed on the ohmic contacts 161, 163, and 165. The data line 171 is periodically bent and forms an oblique angle by the extending direction of the gate line 121. The oblique angle between the data line 171 and the extending direction of the gate line 121 may be 45 degrees or more. However, in the case of the liquid crystal display according to another exemplary embodiment of the present invention, the data line 171 may be extended in a straight line.

The first passivation layer 180x is positioned on the data conductors 171 and 175 and the exposed semiconductor protrusion 154, and the first passivation layer 180x may be made of the organic insulating material or the inorganic insulating material.

A plurality of color filters 230A, 230B, and 230C are formed on the first passivation layer 180x. Each of the color filters 230A, 230B, and 230C may uniquely display one of primary colors, for example, three primary colors of red, green, and blue or yellow, cyan, and magenta. Although not shown, the color filters may further include a color filter displaying a mixture of the primary colors or white, as well as the primary color. The color filters 230A, 230B, and 230C are made of the organic material. Each of the color filters 230A, 230B, and 230C may be extended to the data line 171, and two neighboring color filters 230A and 230B, or 230B and 230C, may overlap on the boundary of the data line 171.

A plurality of pixel electrodes 191 are formed on the color filters 230A, 230B, and 230C. The pixel electrode 191 may have a plane shape filling most of the region enclosed by the gate line 121 and the data line 171. The entire shape of the pixel electrode 191 may be a polygon having edges substantially parallel to the gate line 121 and the data line 171. The pixel electrode 191 may be made of the transparent conductive material such as ITO or IZO.

The first passivation layer 180x and the color filter 230B have a plurality of contact holes 183 exposing the drain electrode 175, and the pixel electrode 191 is electrically connected to the drain electrode 175 through the contact hole 183, thereby receiving a data voltage.

The second passivation layer 180y is formed on the color filters 230A, 230B, and 230C and the pixel electrode 191. The second passivation layer 180y may include the organic insulator or the inorganic insulator.

A common electrode 131 is formed on the second passivation layer 180y. The common electrode 131 may be made of the transparent conductive material such as ITO or IZO. The common electrodes 131 disposed in neighboring pixels are connected to each other. The common electrode 131 includes a plurality of branch electrodes 133 disposed in each pixel area. The branch electrodes 133 are substantially parallel to each other and may be bent according to the data line 171. However, in the case of a liquid crystal display according to another exemplary embodiment of the present invention, the data line 171 and the branch electrode 133 of the common electrode 131 may be extended in one straight line.

The branch electrode 133 of the common electrode 131 overlaps the pixel electrode 191.

The common voltage line 301 is disposed on the common electrode 131 and directly contacts the common electrode 131. The common voltage line 301 includes a first portion parallel to the gate line 121 and a second portion parallel to the data line 171, and the first portion and the second portion are connected to each other. However, in the case of a liquid crystal display according to another exemplary embodiment of the present invention, at least one of the first portion and the second portion may be omitted.

The common voltage line 301 may be made of a metal that is opaque and has conductivity, in contrast to the common electrode 131. Also, the second portion of the common voltage line 301 disposed on the data line 171 may have a width that is equal to or greater than the data line 171, thereby preventing light leakage between two pixels neighboring with respect to the data line 171. Accordingly, a light blocking member between two neighboring pixels with respect to the data line 171 may be omitted.

The common electrode 131 and the common voltage line 301 may be simultaneously formed through one photolithography process using one mask. In detail, after the first conductive layer 130 forming the common electrode 131 and the second conductive layer 300 that is opaque and forming the common voltage line 301 are sequentially deposited on the substrate 110, the first photosensitive film pattern having different thicknesses according to positions is formed. Next, after the second conductive layer 300 and the first conductive layer 130 are simultaneously etched by using the first photosensitive film pattern as an etching mask, the height of the first photosensitive film pattern is decreased and simultaneously the thin photosensitive film pattern is removed to form the second photosensitive film pattern. The second conductive layer 300 is etched by using the second photosensitive film pattern as the etching mask such that the common electrode 131 and the common voltage line 301 may be formed through one photolithography process.

The data voltage applied to the pixel electrode 191 and the common voltage applied to the common electrode 131 generates an electric field to the liquid crystal layer 3.

In the case of the liquid crystal display according to the present exemplary embodiment, the common electrode 131 covers a plurality of data lines 171 at one time and overlaps the data line 171. Accordingly, crosstalk is reduced between the data line 171 and the pixel electrode 191 and light leakage by a parasitic capacitance between the data line 171 and the neighboring pixel electrode 191 may be reduced.

The first alignment layer 11 is coated on an inner surface of the lower panel 100.

Next, the upper panel 200 will be described.

The second alignment layer 21 is coated on an insulation substrate 210.

The first alignment layer 11 and the second alignment layer 21 may be horizontal alignment layers.

The liquid crystal layer 3 interposed between the lower panel 100 and the upper panel 200 includes liquid crystal molecules, wherein the liquid crystal molecules may be aligned so that a major axis thereof is formed to be horizontal with respect to the surfaces of the two display panels 100 and 200 in the state where an electric field is not present.

A backlight unit (not shown) generating and providing light to the two display panels 100 and 200 may be provided outside the substrate 110 of the lower panel 100.

The data voltage applied to the pixel electrode 191 generates an electric field in the liquid crystal layer 3 together with the common voltage applied to the common electrode 131, thereby determining the direction of the liquid crystal molecules of the liquid crystal layer 3 and displaying a corresponding image.

The liquid crystal display according to the present exemplary embodiment includes the common voltage line 301 disposed directly on the common electrode 131 and extending according to the gate line 121 or the data line 171. Accordingly, the signal delay of the common voltage applied to the common electrode 131 is simultaneously prevented, the contact hole to connect the common electrode 131 and the common voltage line 301 is not needed, and the common voltage line 301 overlaps the opaque signal lines 121 and 171 such that the aperture ratio of the liquid crystal display is increased.

Also, the liquid crystal display according to the present exemplary embodiment includes the common electrode 131 covering the data line 171 such that the crosstalk between the data line 171 and the pixel electrode 191 may be reduced by the common electrode 131 and the light leakage caused by the parasitic capacitance between the data line 171 and the neighboring pixel electrode 191 may be reduced. Also, the liquid crystal display according to the present exemplary embodiment includes the common voltage line 301 having a width that is greater than the data line 171 such that the light leakage between two neighboring pixels with respect to the data line 171 may be prevented, and the additional light blocking member may be omitted. Thereby, the aperture ratio of the liquid crystal display may be increased and the manufacturing cost may be reduced.

Figure 28:
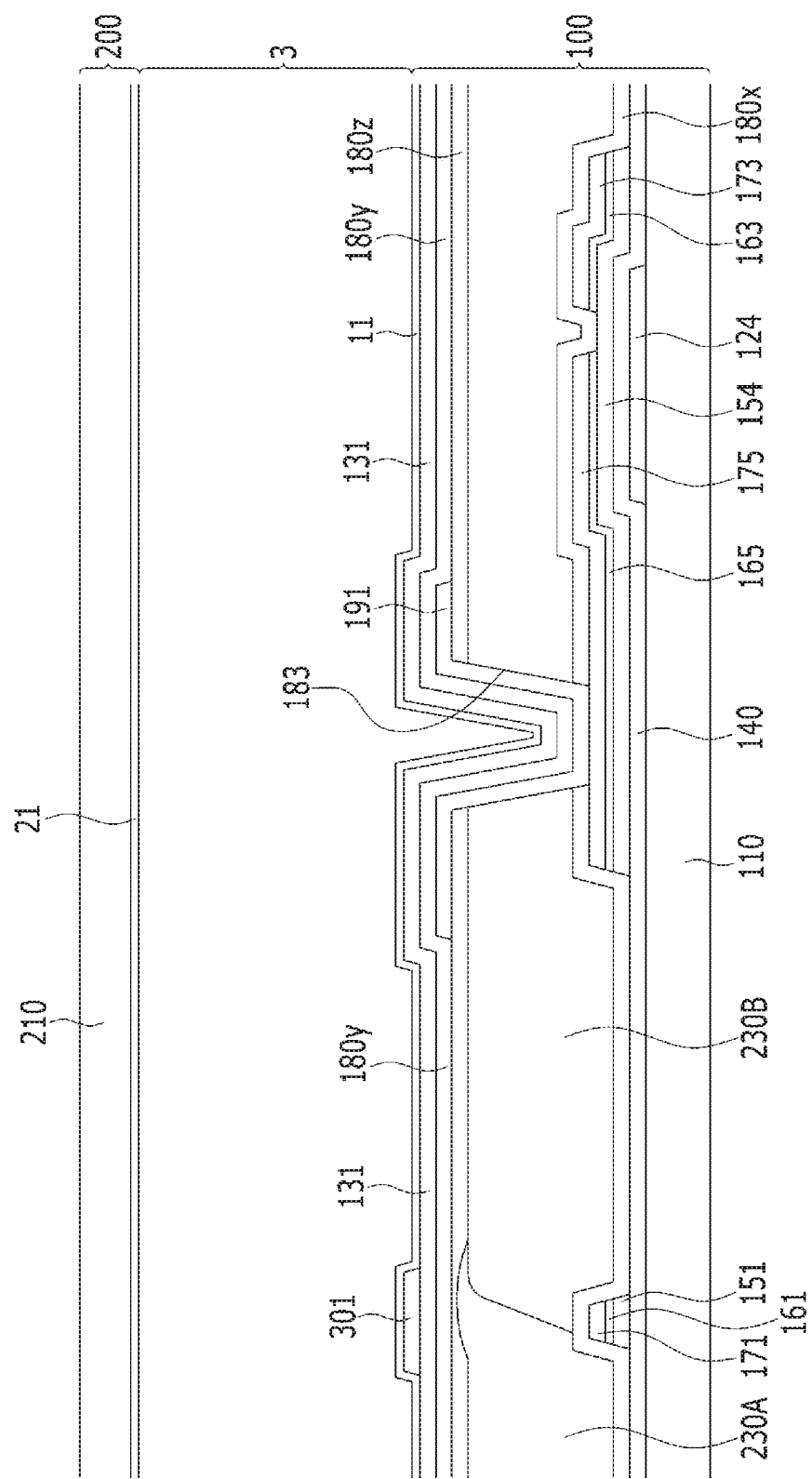
FIG. 28 and FIG. 29 are cross-sectional views of the liquid crystal display according to another exemplary embodiment of the present invention taken along the lines XXVI-XXVI and XXVII-XXVII of FIG. 25.
Figure 29:
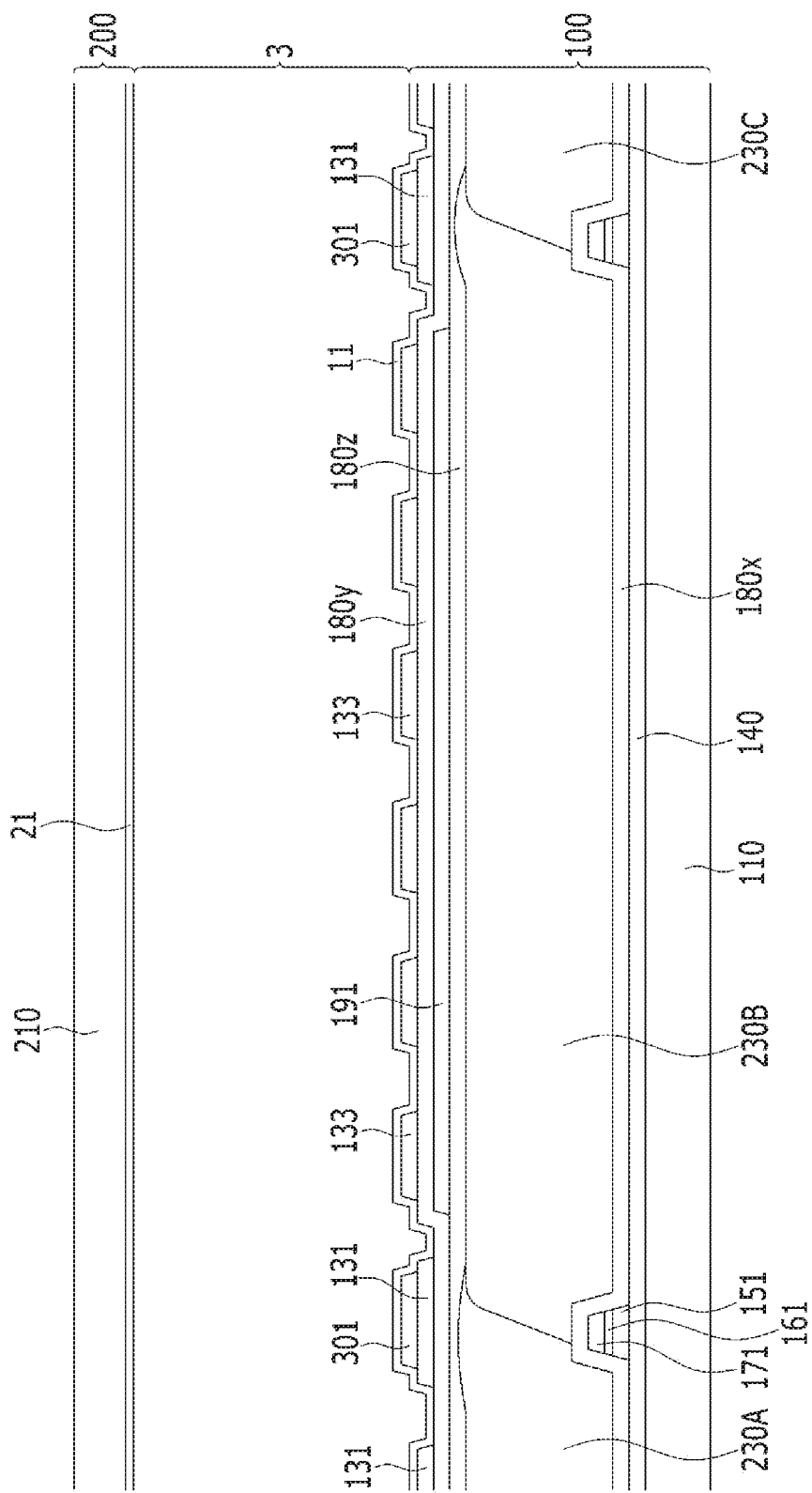

Next, a liquid crystal display according to another exemplary embodiment of the present invention will be described with reference to FIG. 28 and FIG. 29 as well as FIG. 25. FIG. 28 and FIG. 29 are cross-sectional views of the liquid crystal display according to another exemplary embodiment of the present invention taken along the lines XXI-XXI and XXII-XXII of FIG. 25.

The liquid crystal display according to the exemplary embodiment shown in FIG. 25, FIG. 28, and FIG. 29 is almost the same as the liquid crystal display according to the exemplary embodiment shown in FIG. 25, FIG. 26, and FIG. 27. Accordingly, the description of similar portions is omitted.

In contrast to the liquid crystal display according to the exemplary embodiment shown in FIG. 20, FIG. 21, and FIG. 22, the liquid crystal display according to the present exemplary embodiment further includes the third passivation layer 180z between the color filters 230A, 230B, and 230C and the pixel electrode 191. The third passivation layer 180z is disposed between the data line 171 and the common voltage line 301 such that the parasitic capacitance is decreased between the data line 171 and the common voltage line 301, thereby reducing the signal delay of the data line 171. The third passivation layer 180z may be made of the organic material and may have a flat surface. The third passivation layer 180z reduces a step formed by the overlapping of the color filters 230A, 230B, and 230C disposed in the neighboring pixels, and thereby the alignment layer 11 may be uniformly rubbed. However, the third passivation layer 180z may be an inorganic insulating layer and may prevent the component of the color filter from being exposed, and the third passivation layer 180z is formed at a lower temperature than the gate insulating layer 140 such that deformation and color change of the color filters 230A, 230B, and 230C may be prevented. Also, the third passivation layer 180z may reduce the transmittance loss according to the refractive index difference between the underlying color filter and the organic insulator.

All characteristics of the liquid crystal display according to the exemplary embodiment shown in FIG. 25, FIG. 26, and FIG. 27 may be applied to the liquid crystal display according to the present exemplary embodiment. Also, the characteristics and the effects of the several constituent elements according to the above-described exemplary embodiment may be applied to the present exemplary embodiment having the same constituent elements.

Figure 30:
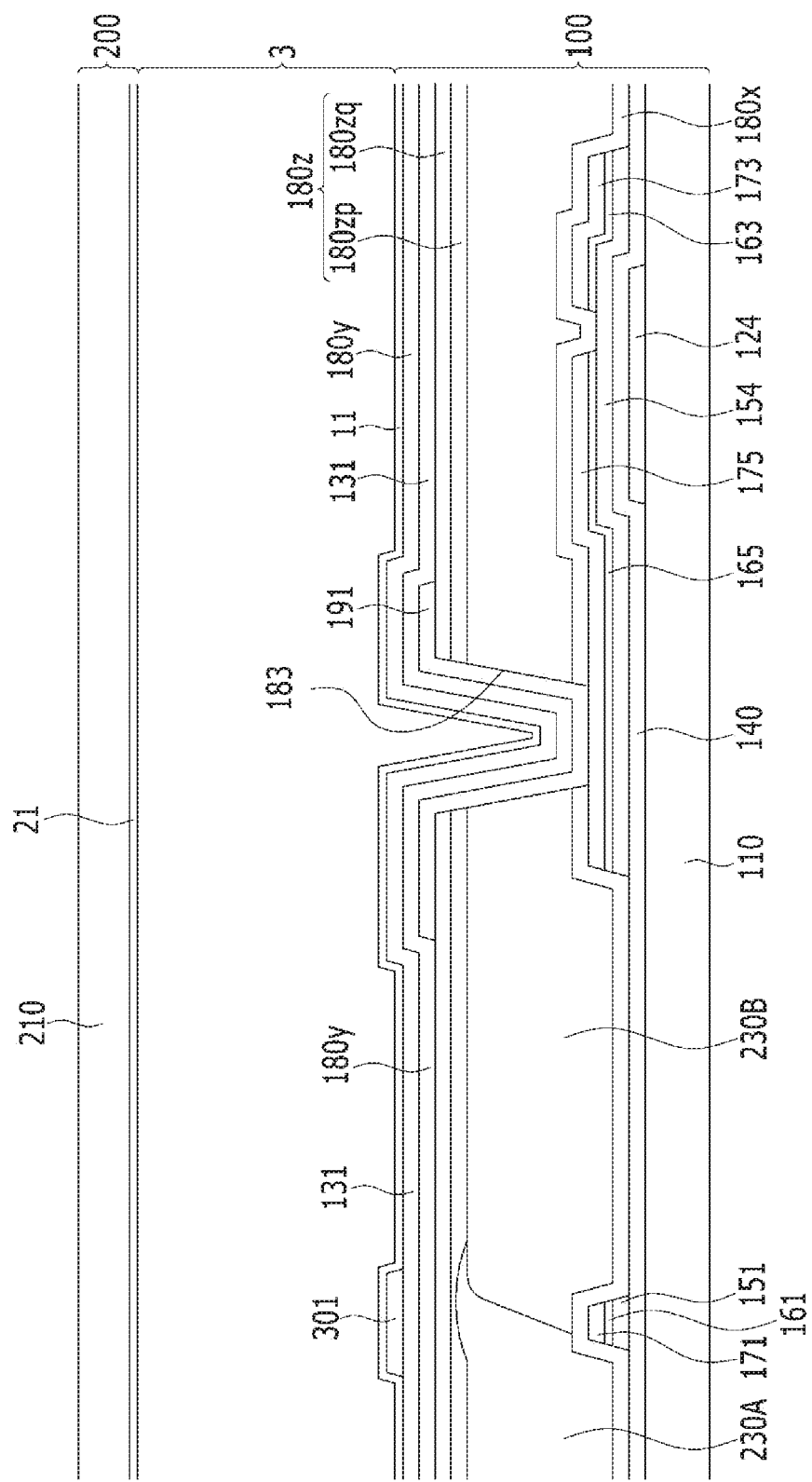
FIG. 30 and FIG. 31 are cross-sectional views of the liquid crystal display according to another exemplary embodiment of the present invention taken along the lines XXVI-XXVI and XXVII-XXVII of FIG. 25.
Figure 31:
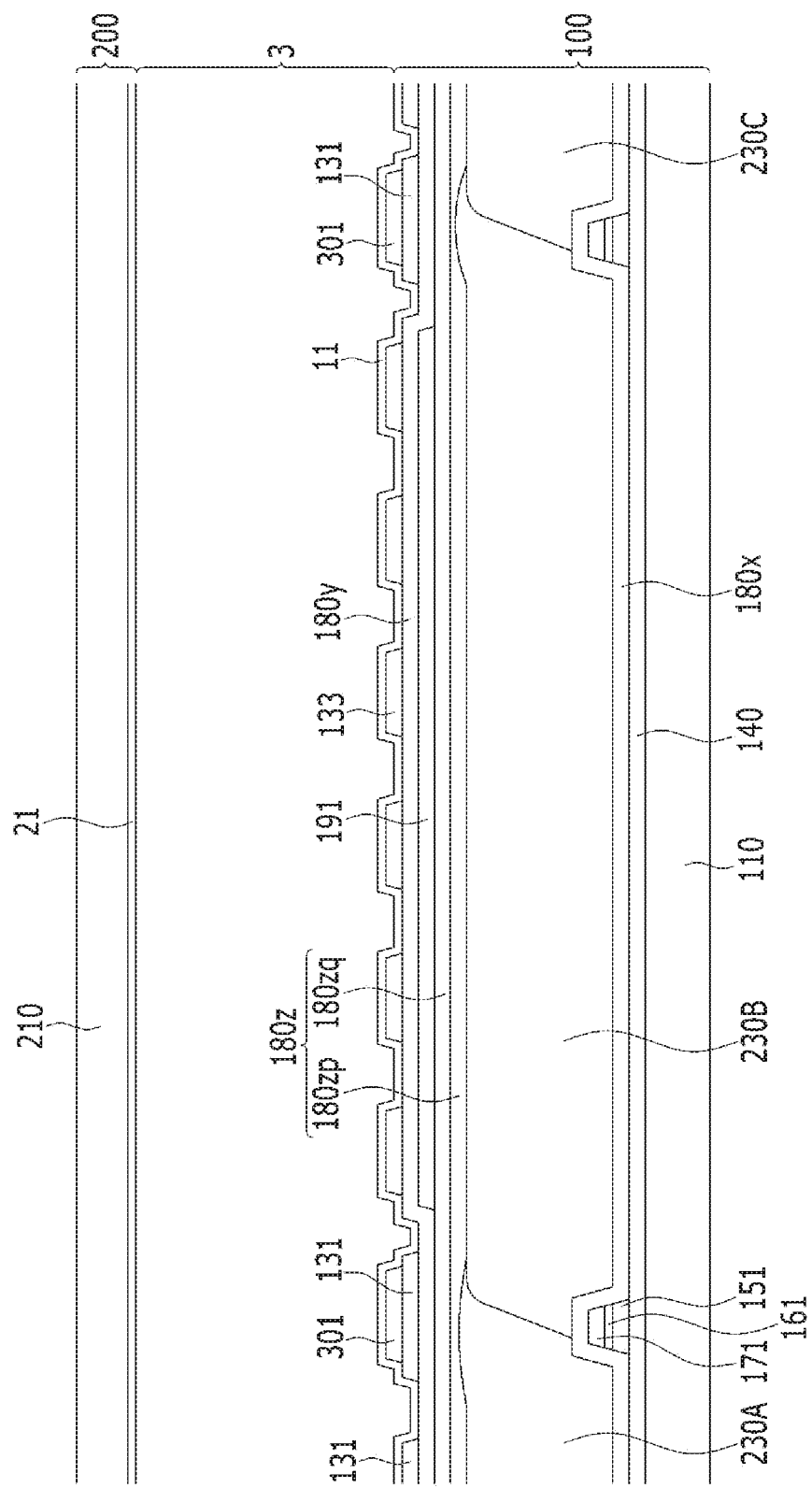

Next, a liquid crystal display according to another exemplary embodiment of the present invention will be described with reference to FIG. 30 and FIG. 31 as well as FIG. 25. FIG. 30 and FIG. 31 are cross-sectional views of the liquid crystal display according to another exemplary embodiment of the present invention taken along the lines XXVI-XXVI and XXVII-XXVII of FIG. 25.

The liquid crystal display according to the exemplary embodiment shown in FIG. 25, FIG. 30, and FIG. 31 is almost the same as the liquid crystal display according to the exemplary embodiment shown in FIG. 25, FIG. 26, and FIG. 27. Accordingly, the description of similar portions is omitted.

In contrast to the liquid crystal display according to the exemplary embodiment shown in FIG. 25, FIG. 26, and FIG. 27, the liquid crystal display according to the present exemplary embodiment further includes the third passivation layer 180z between the color filters 230A, 230B, and 230C and the common electrode 131, and the third passivation layer 180z includes a lower layer 180zp and an upper layer 180zq. The lower layer 180zp of the third passivation layer 180z may be an inorganic insulating layer, and prevents the component of the color filter from being exposed outside. The upper layer 180zq of the third passivation layer 180z may be made of organic material and may have a flat surface. The lower layer 180zp of the third passivation layer 180z is formed at a lower temperature than the gate insulating layer 140 such that the deformation and the color change of the color filters 230A, 230B, and 230C may be prevented, and may reduce the transmittance loss according to the refractive index difference between the underlying color filter and the organic insulator. The upper layer 180zq of the third passivation layer 180z may be an organic insulator and reduce the step caused by the overlapping of the color filters 230A, 230B, and 230C disposed in the neighboring pixels, and thereby the alignment layer 11 may be uniformly rubbed. The third passivation layer 180z is disposed between the data line 171 and the common voltage line 301 such that the parasitic capacitance is decreased between the data line 171 and the common voltage line 301, thereby reducing the signal delay of the data line 171.

In the liquid crystal display according to the present exemplary embodiment, the lower layer 180zp of the third passivation layer 180z is the inorganic insulating layer and the upper layer 180zq is the organic insulator, however in a liquid crystal display according to another exemplary embodiment of the present invention, the lower layer 180zp of the third passivation layer 180z may be the organic insulator and the upper layer 180zq may be the inorganic insulating layer.

All characteristics of the liquid crystal display according to the exemplary embodiment shown in FIG. 25, FIG. 26, and FIG. 27 may be applied to the liquid crystal display according to the present exemplary embodiment. Also, the characteristics and the effects of the several constituent elements according to the above-described exemplary embodiment may be applied to the present exemplary embodiment having the same constituent elements.

Figure 32:
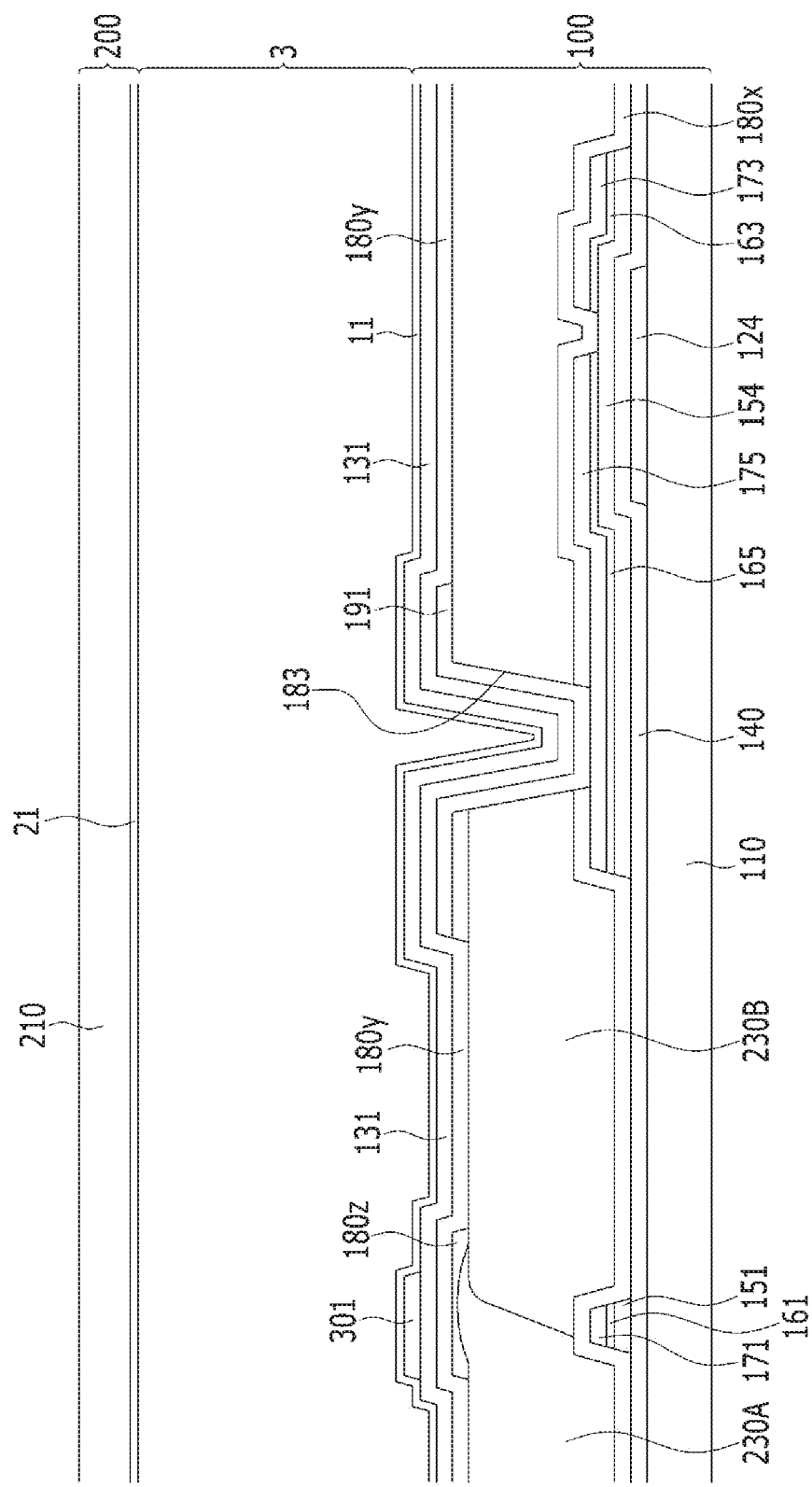
FIG. 32 and FIG. 33 are cross-sectional views of the liquid crystal display according to another exemplary embodiment of the present invention taken along the lines XXVI-XXVI and XXVII-XXVII of FIG. 25.
Figure 33:
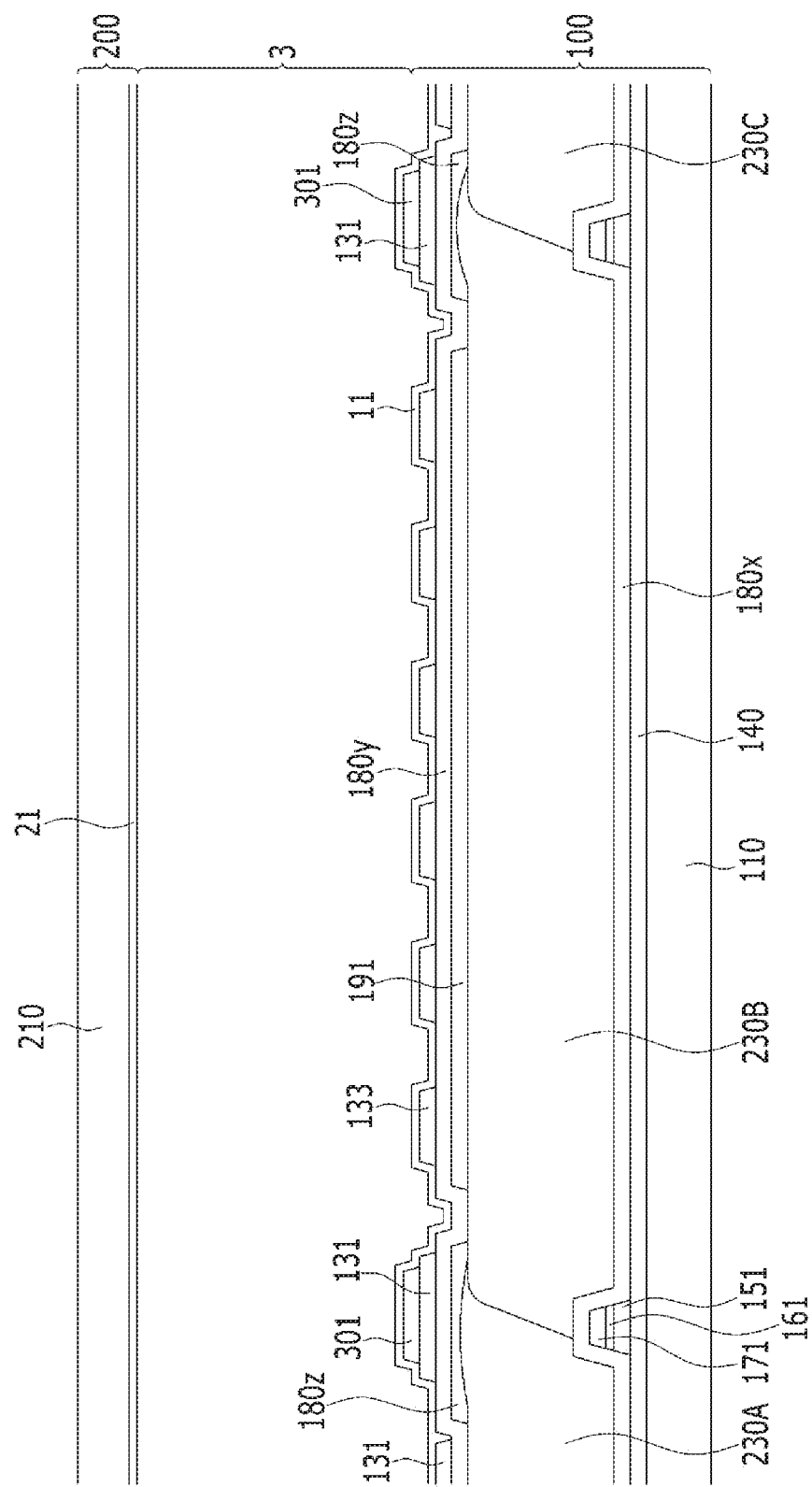

Next, the liquid crystal display according to another exemplary embodiment of the present invention will be described with reference to FIG. 32 and FIG. 33 as well as FIG. 25. FIG. 32 and FIG. 33 are cross-sectional views of the liquid crystal display according to another exemplary embodiment of the present invention taken along the lines XXVI-XXVI and XXVII-XXVII of FIG. 25.

The liquid crystal display according to the exemplary embodiment shown in FIG. 25, FIG. 32, and FIG. 33 is similar to the liquid crystal display according to the exemplary embodiment shown in FIG. 25, FIG. 26, and FIG. 27. Accordingly, the description of similar portions is omitted.

In contrast to the liquid crystal display according to the exemplary embodiment shown in FIG. 25, FIG. 26, and FIG. 27, the liquid crystal display according to the present exemplary embodiment further includes the third passivation layer 180z between the color filters 230A, 230B, and 230C and the common electrode 131, and the third passivation layer 180z is only disposed at a portion corresponding to a portion where the common voltage line 301 is disposed. The third passivation layer 180z may be made of organic material or inorganic material and may have a flat surface. In this way, the third passivation layer 180z is disposed in the portion corresponding to the portion where the common voltage line 301 is disposed such that the third passivation layer 180z is not formed in the display area (e.g., the area where the pixel electrode 191 is formed) displaying the image. Thereby, the absorption of light of the backlight by the third passivation layer 180z including the organic material may be reduced and the reduction of transmittance may be prevented. The third passivation layer 180z is disposed between the data line 171 and the common voltage line 301 such that the parasitic capacitance is decreased between the data line 171 and the common voltage line 301, thereby reducing the signal delay of the data line 171.

All characteristics of the liquid crystal display according to the exemplary embodiment shown in FIG. 25, FIG. 26, and FIG. 27 may be applied to the liquid crystal display according to the present exemplary embodiment. Also, the characteristics and the effects of the several constituent elements according to the above-described exemplary embodiment may be applied to the present exemplary embodiment having the same constituent elements.

Figure 34:
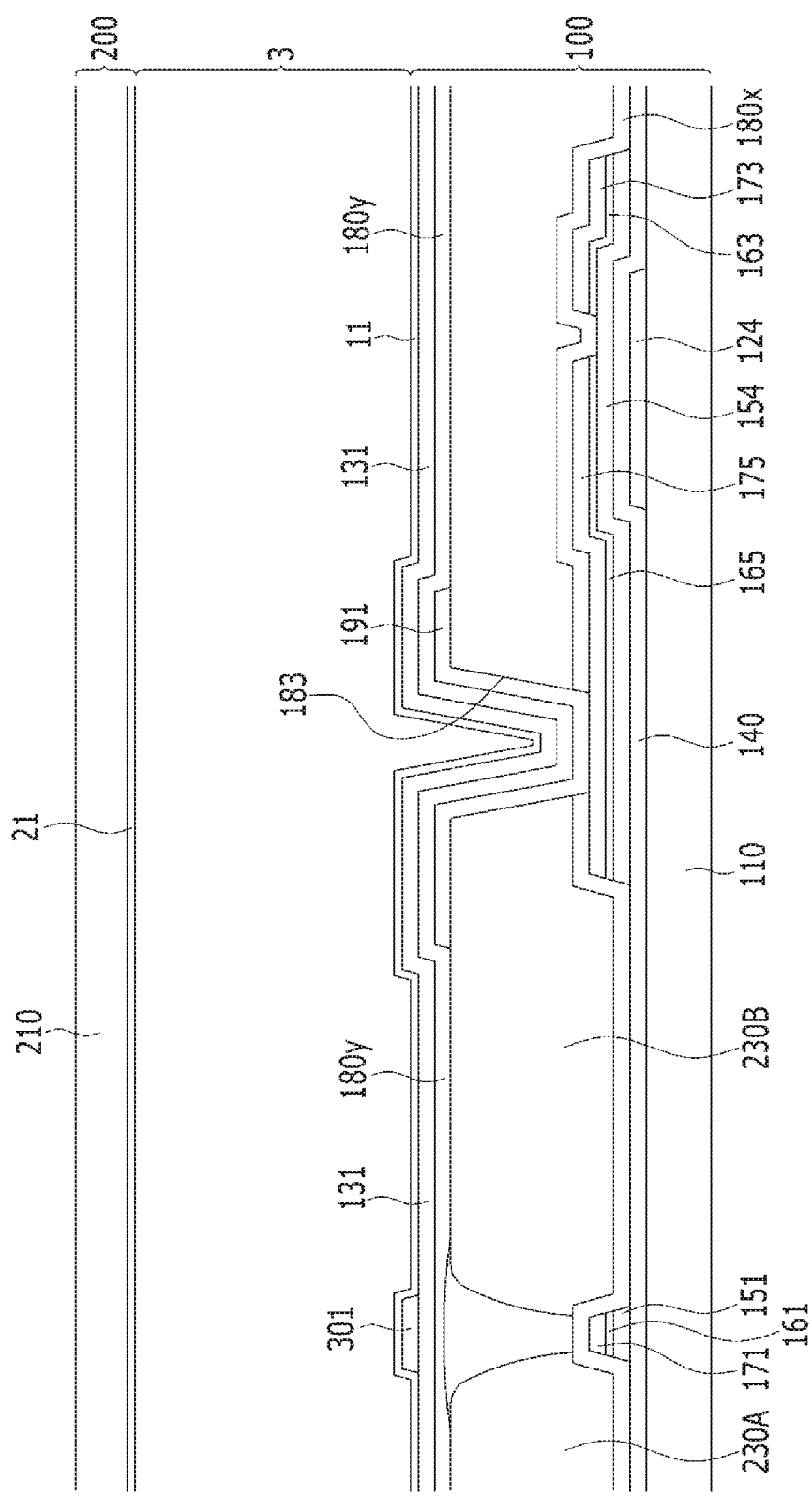
FIG. 34 and FIG. 35 are cross-sectional views of the liquid crystal display according to another exemplary embodiment of the present invention taken along the lines XXVI-XXVI and XXVII-XXVII of FIG. 25.
Figure 35:
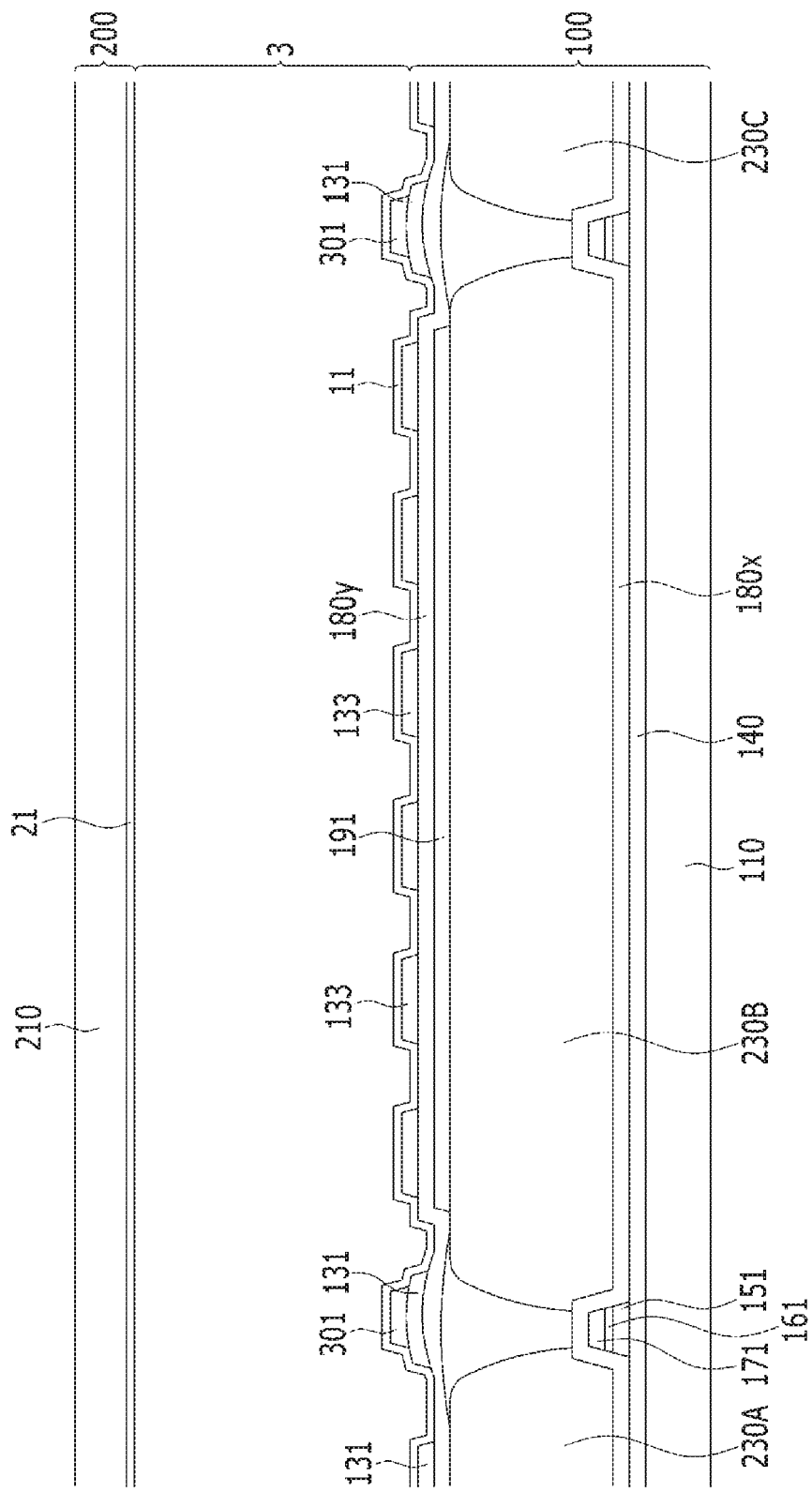

Next, a liquid crystal display according to another exemplary embodiment of the present invention will be described with reference to FIG. 34 and FIG. 35 as well as FIG. 25. FIG. 34 and FIG. 35 are cross-sectional views of the liquid crystal display according to another exemplary embodiment of the present invention taken along the lines XXVI-XXVI and XXVII-XXVII of FIG. 25.

The liquid crystal display according to the exemplary embodiment shown in FIG. 25, FIG. 34, and FIG. 35 is similar to the liquid crystal display according to the exemplary embodiment shown in FIG. 25, FIG. 26, and FIG. 27. Accordingly, the description of similar portions is omitted.

In contrast to the liquid crystal display according to the exemplary embodiment shown in FIG. 25, FIG. 26, and FIG. 27, in the liquid crystal display according to the present exemplary embodiment, the color filters 230A, 230B, and 203C of two neighboring pixels with respect to the data line 171 do not overlap and the light blocking member 220 is disposed between two neighboring color filters 230A, 230B, and 203C. Also, the width of the second portion of the common voltage line 301 disposed at the position corresponding to the data line 171 may be almost equal to that of the data line 171.

All characteristics of the liquid crystal display according to the exemplary embodiment shown in FIG. 25, FIG. 26, and FIG. 27 may be applied to the liquid crystal display according to the present exemplary embodiment. Also, the characteristics and the effects of the several constituent elements according to the above-described exemplary embodiment may be applied to the present exemplary embodiment having the same constituent elements.

Figure 36:
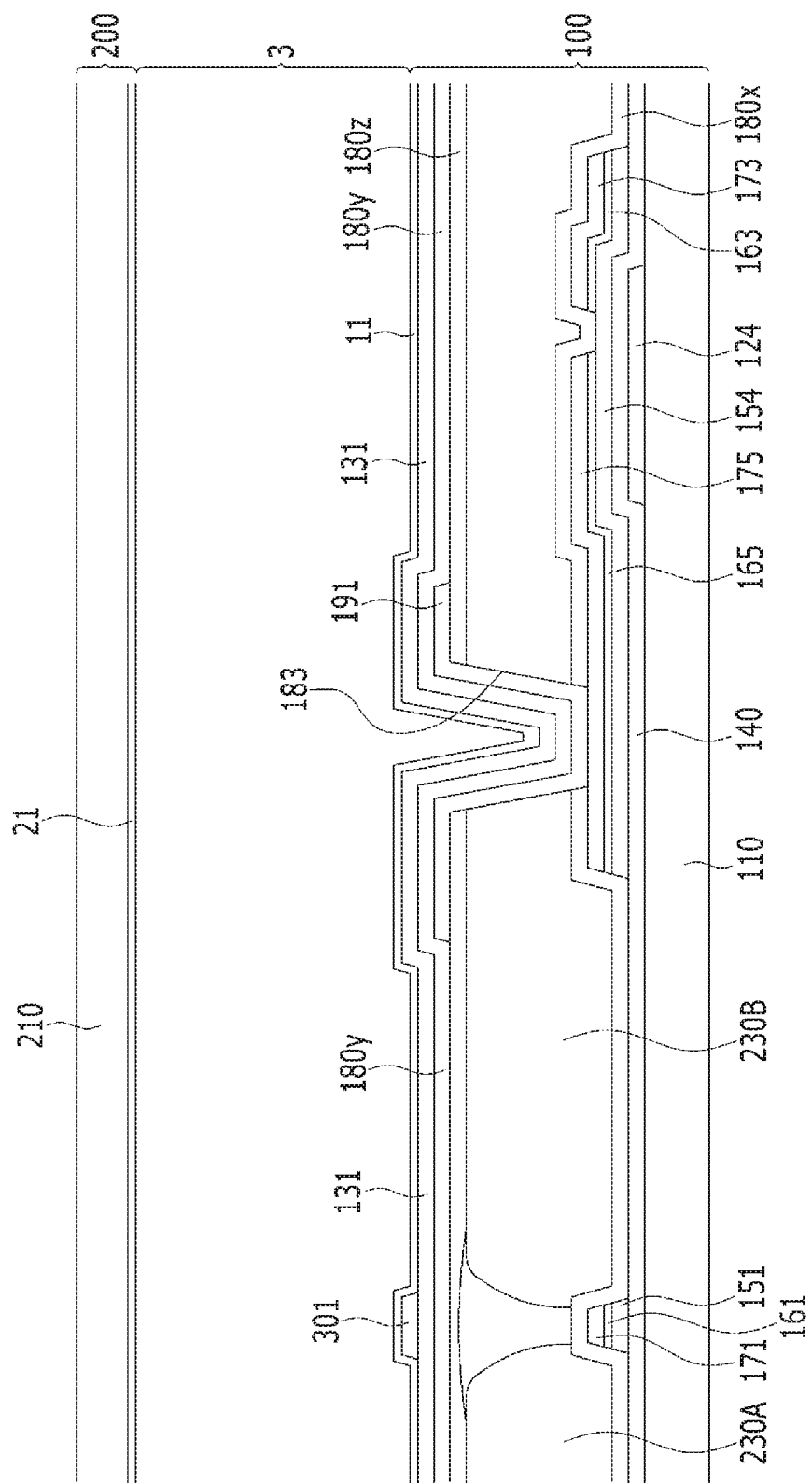
FIG. 36 and FIG. 37 are cross-sectional views of the liquid crystal display according to another exemplary embodiment of the present invention taken along the lines XXVI-XXVI and XXVII-XXVII of FIG. 25.
Figure 37:
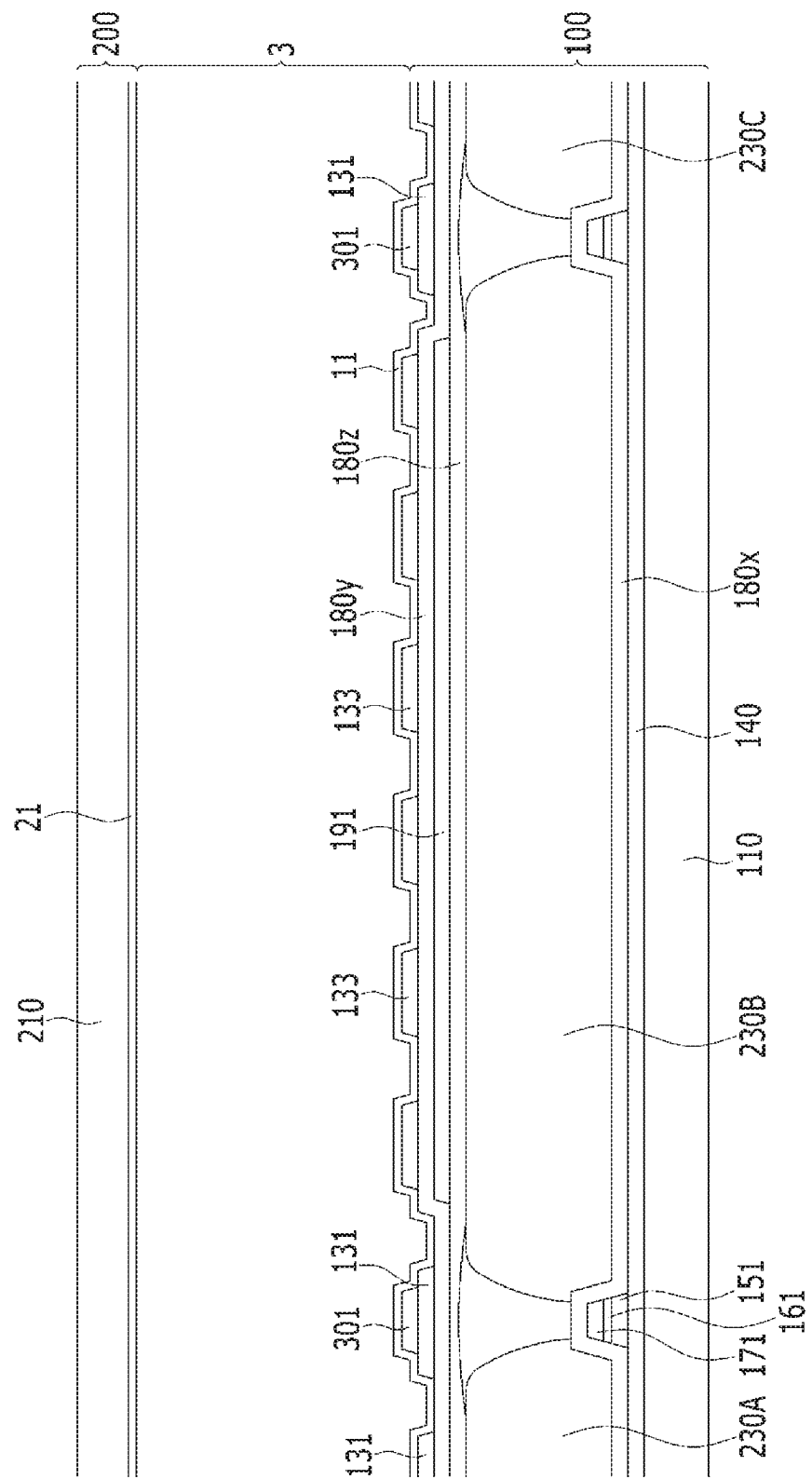

Next, a liquid crystal display according to another exemplary embodiment of the present invention will be described with reference to FIG. 36 and FIG. 37 as well as FIG. 25. FIG. 36 and FIG. 37 are cross-sectional views of the liquid crystal display according to another exemplary embodiment of the present invention taken along the lines XXVI-XXVI and XXVII-XXVII of FIG. 25.

The liquid crystal display according to the exemplary embodiment shown in FIG. 25, FIG. 36, and FIG. 37 is similar to the liquid crystal display according to the exemplary embodiment shown in FIG. 25, FIG. 26, and FIG. 27. Accordingly, the description of similar portions is omitted.

In contrast to the liquid crystal display according to the exemplary embodiment shown in FIG. 25, FIG. 26, and FIG. 27, in the liquid crystal display according to the present exemplary embodiment, the color filters 230A, 230B, and 203C of two neighboring pixels with respect to the data line 171 do not overlap and the light blocking member 220 is disposed between two neighboring color filters 230A, 230B, and 203C. Also, the width of the second portion of the common voltage line 301 disposed at a position corresponding to the data line 171 may be almost equal to that of the data line 171. Also, the liquid crystal display according to the present exemplary embodiment further includes the third passivation layer 180z arranged between the color filters 230A, 230B, and 203C and the light blocking member 220, and the common electrode 131. The third passivation layer 180z may be made of organic material and may have a flat surface. The third passivation layer 180z is disposed between the data line 171 and the common voltage line 301 such that the parasitic capacitance is decreased between the data line 171 and the common voltage line 301, thereby reducing the signal delay of the data line 171. The third passivation layer 180z reduces a step formed by the overlapping of the color filters 230A, 230B, and 230C disposed in the neighboring pixels, and thereby the alignment layer 11 may be uniformly rubbed. However, the third passivation layer 180z may be an inorganic insulating layer and may prevent the component of the color filter from being exposed, and the third passivation layer 180z is formed at a lower temperature than the gate insulating layer 140 such that deformation and color change of the color filters 230A, 230B, and 230C may be prevented. Also, the third passivation layer 180z may reduce the transmittance loss according to the refractive index difference between the underlying color filter and the organic insulator.

All characteristics of the liquid crystal display according to the exemplary embodiment shown in FIG. 25, FIG. 26, and FIG. 27 may be applied to the liquid crystal display according to the present exemplary embodiment. Also, the characteristics and the effects of the several constituent elements according to the above-described exemplary embodiment may be applied to the present exemplary embodiment having the same constituent elements.

Figure 38:
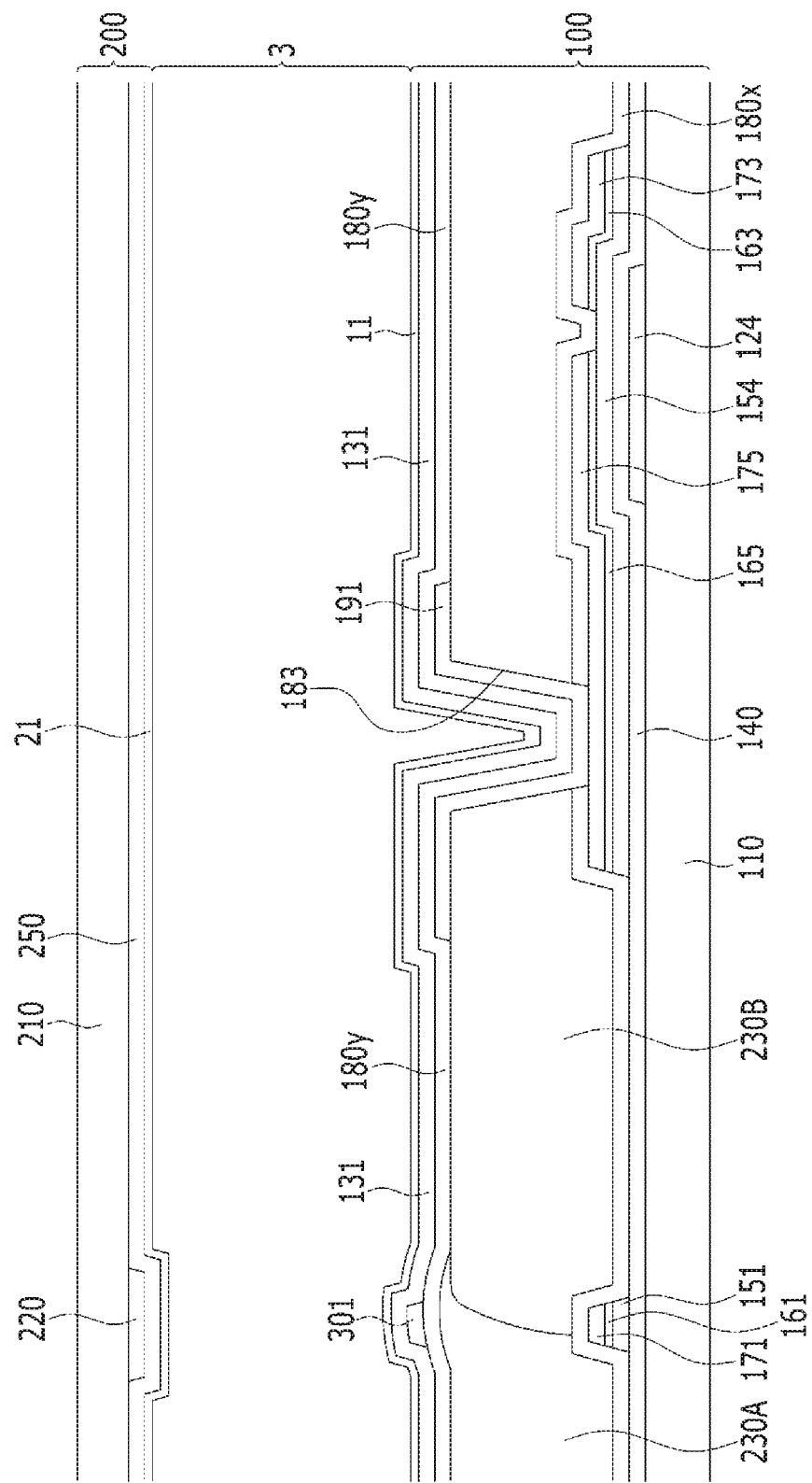
FIG. 38 and FIG. 39 are cross-sectional views of the liquid crystal display according to another exemplary embodiment of the present invention taken along the lines XXVI-XXVI and XXVII-XXVII of FIG. 25.
Figure 39:
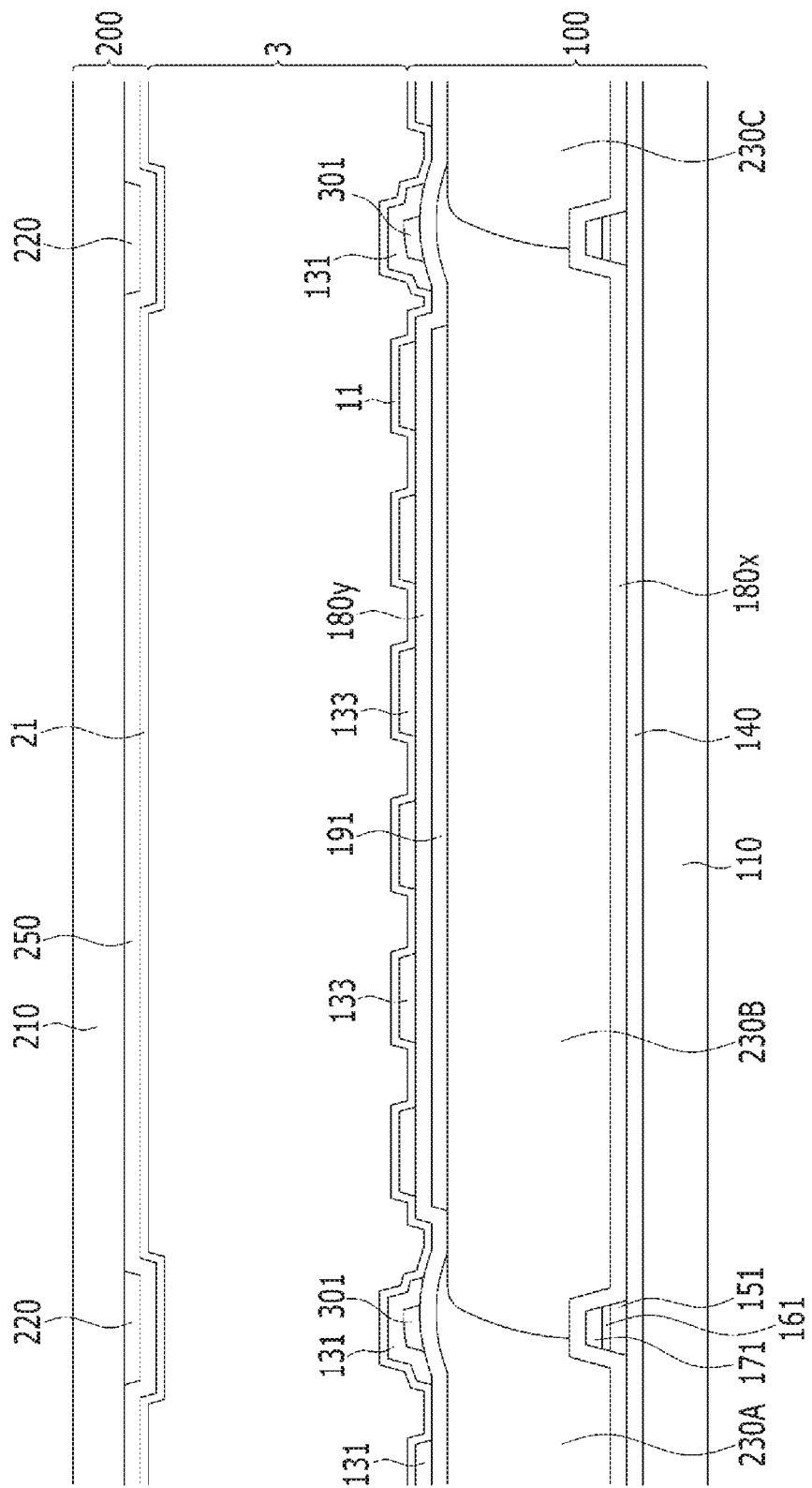

Next, a liquid crystal display according to another exemplary embodiment of the present invention will be described with reference to FIG. 38 and FIG. 39 as well as FIG. 25. FIG. 38 and FIG. 39 are cross-sectional views of the liquid crystal display according to another exemplary embodiment of the present invention taken along the lines XXVI-XXVI and XXVII-XXVII of FIG. 25.

The liquid crystal display according to the exemplary embodiment shown in FIG. 25, FIG. 38, and FIG. 39 is similar to the liquid crystal display according to the exemplary embodiment shown in FIG. 25, FIG. 26, and FIG. 27. Accordingly, the description of similar portions is omitted.

In contrast to the liquid crystal display according to the exemplary embodiment shown in FIG. 25, FIG. 26, and FIG. 27, the liquid crystal display according to the present exemplary embodiment further includes the light blocking member 220 disposed in the upper panel 200. The light blocking member 220 may prevent the light from passing through the side of the common voltage line 301.

When the light blocking member 220 does not exist, outer light may be reflected from the common voltage line 301, and to prevent reflected light, the width of the light blocking member 220 should be greater than the width of the common voltage line 301. At this time, when assembling the upper panel 200 and the lower panel 100, when considering a misalignment, the width should be greater than the width of the common voltage line 301. For example, when a range of the misalignment is about −2 μm to +2 μm, the width of the light blocking member 220 should be greater than the width of the common voltage line 301 by about 4 μm. However, when assembling the upper panel 200 and the lower panel 100, when the degree of misalignment is changed, the difference between the width of the light blocking member 220 and the width of the common voltage line 301 is also changed.

In the liquid crystal display according to the present exemplary embodiment, the width of the light blocking member 220 is greater than the width of the data line 171, and the width of the data line 171 may be equal to or greater than the width of the common voltage line 301.

In the case of a liquid crystal display according to an exemplary embodiment of the present invention, the color filter 230 is formed in the lower panel 100 such that the error range of the misalignment may be reduced as compared to the case where the color filter 230 is disposed in the upper panel 200. According to the present exemplary embodiment, the line width of the light blocking member 220 of the liquid crystal display may be narrow compared to the case where the color filter 230 is disposed in the upper panel 200. In the case of the liquid crystal display according to the present exemplary embodiment, the common voltage line 301 disposed in the lower panel 100 functions as a light blocking member such that the width of the light blocking member 220 may be reduced compared with the case where the common voltage line 301 does not exist.

In the case of a liquid crystal display according to another exemplary embodiment of the present invention, the common voltage line 301 may be formed of a conductive material. For example, the common voltage line 301 may be made of a conductive organic material having high electrical conductivity, and in this case, the reflection of light may be prevented such that the light reflected into the side of the common voltage line 301 may be prevented without the light blocking member 220 of the upper panel 200. Accordingly, the aperture ratio of the liquid crystal display may be further increased.

All characteristics of the liquid crystal display according to the exemplary embodiment shown in FIG. 25, FIG. 26, and FIG. 27 may be applied to the liquid crystal display according to the present exemplary embodiment. Also, the characteristics and the effects of the several constituent elements according to the above-described exemplary embodiment may be applied to the present exemplary embodiment having the same constituent elements.

Figure 40:
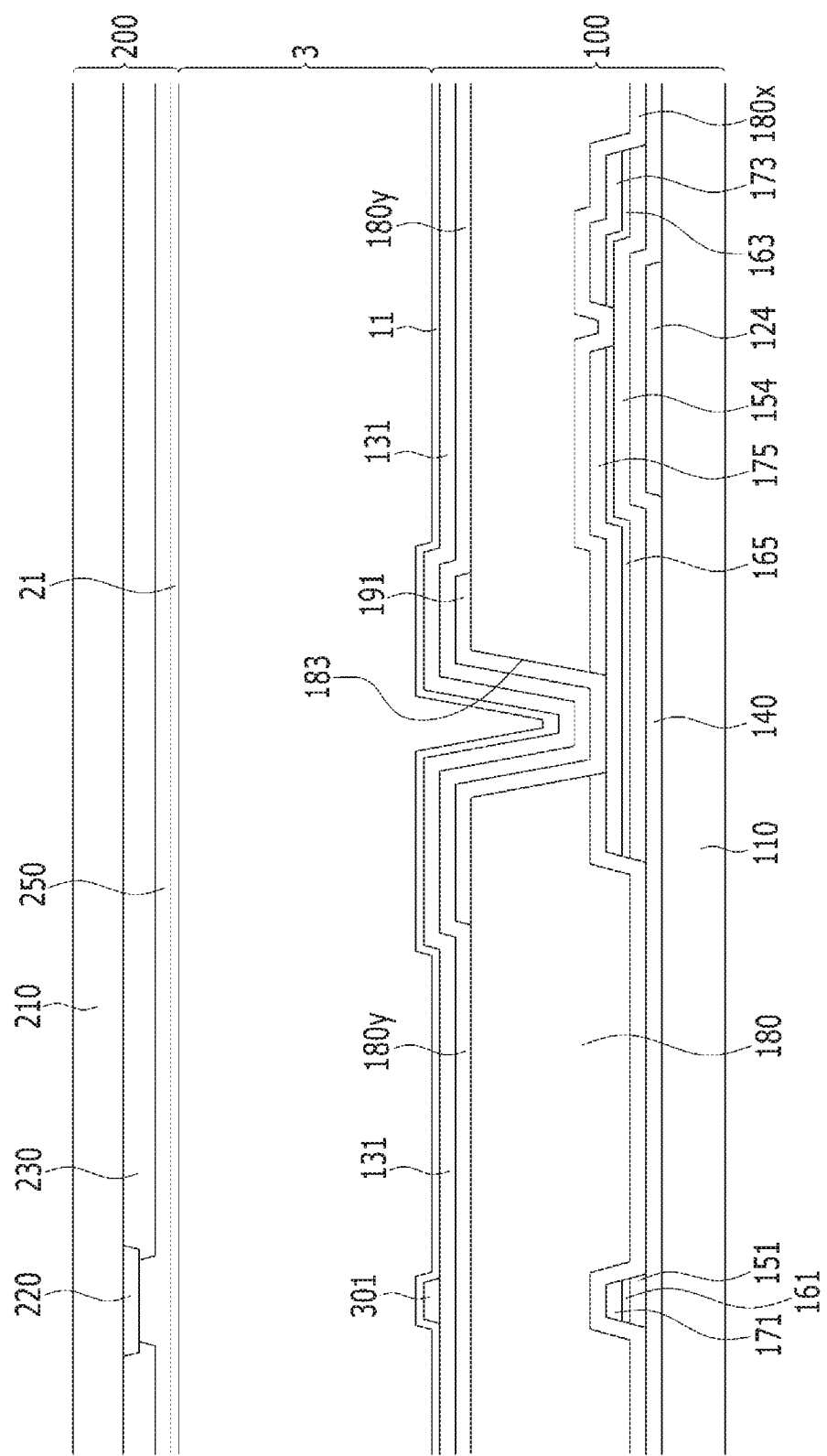
FIG. 40 and FIG. 41 are cross-sectional views of the liquid crystal display according to another exemplary embodiment of the present invention taken along the lines XXVI-XXVI and XXVII-XXVII of FIG. 25
Figure 41:
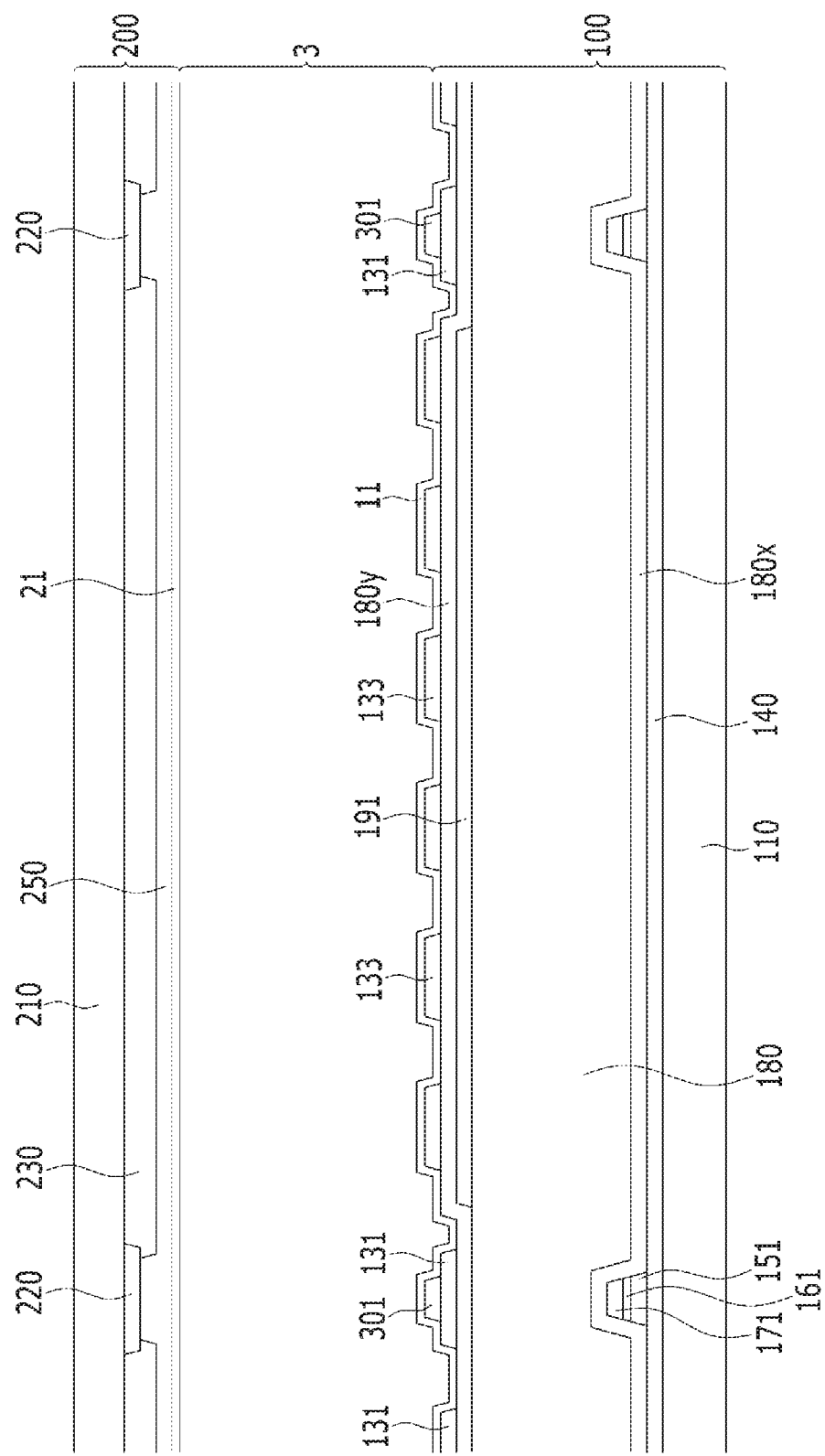

Next, a liquid crystal display according to another exemplary embodiment of the present invention will be described with reference to FIG. 40 and FIG. 41 as well as FIG. 25. FIG. 40 and FIG. 41 are cross-sectional views of the liquid crystal display according to another exemplary embodiment of the present invention taken along the lines XXVI-XXVI and XXVII-XXVII of FIG. 25.

The liquid crystal display according to the exemplary embodiment shown in FIG. 25, FIG. 40, and FIG. 41 is almost the same as the liquid crystal display according to the exemplary embodiment shown in FIG. 25, FIG. 26, and FIG. 27. Accordingly, the description of similar portions is omitted.

In contrast to the liquid crystal display according to the exemplary embodiment shown in FIG. 25, FIG. 26, and FIG. 27, the liquid crystal display according to the present exemplary embodiment includes the color filter 230 disposed in the upper panel 200. In detail, the upper panel 200 includes the insulation substrate 210, and the light blocking member 220 and the color filter 230 formed on the insulation substrate 210. An overcoat 250 may be further formed on the light blocking member 220 and the color filter 230.

In the case of the lower panel 100, an organic layer 180 is disposed between the first passivation layer 180x and the common electrode 131. The surface of the organic layer 180 flat. The first passivation layer 180x may be omitted.

The light blocking member 220 may prevent the light from passing through the side of the common voltage line 301.

When the light blocking member 220 does not exist, the outer light may be reflected from the common voltage line 301, and to prevent the reflected light, the width of the light blocking member 220 should be greater than the width of the common voltage line 301. At this time, when assembling the upper panel 200 and the lower panel 100, when considering a misalignment, the width should be greater than the width of the common voltage line 301. For example, when a range of the misalignment is about −2 μm to +2 μm, the width of the light blocking member 220 should be greater than the width of the common voltage line 301 by about 4 μm. However, when assembling the upper panel 200 and the lower panel 100, when the degree of misalignment is changed, the difference between the width of the light blocking member 220 and the width of the common voltage line 301 is also changed.

In the liquid crystal display according to the present exemplary embodiment, the width of the light blocking member 220 is greater than the width of the data line 171 and the width of the data line 171 may be equal to or greater than the width of the common voltage line 301.

All characteristics of the liquid crystal display according to the exemplary embodiment shown in FIG. 25, FIG. 26, and FIG. 27 may be applied to the liquid crystal display according to the present exemplary embodiment. Also, the characteristics and the effects of the several constituent elements according to the above-described exemplary embodiment may be applied to the present exemplary embodiment having the same constituent elements.

Figure 42:
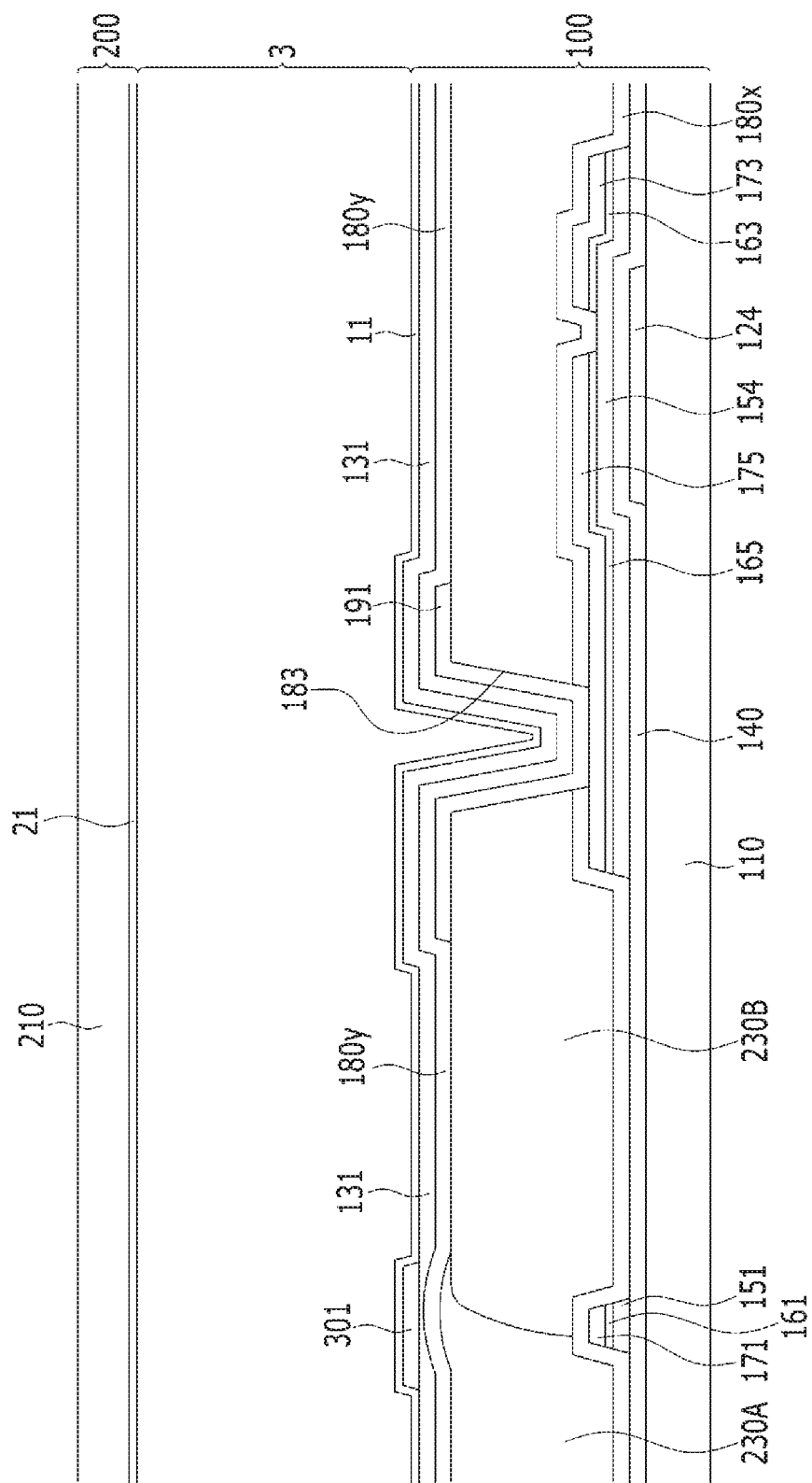
FIG. 42 and FIG. 43 are cross-sectional views of the liquid crystal display according to another exemplary embodiment of the present invention taken along the lines XXVI-XXVI and XXVII-XXVII of FIG. 25.
Figure 43:
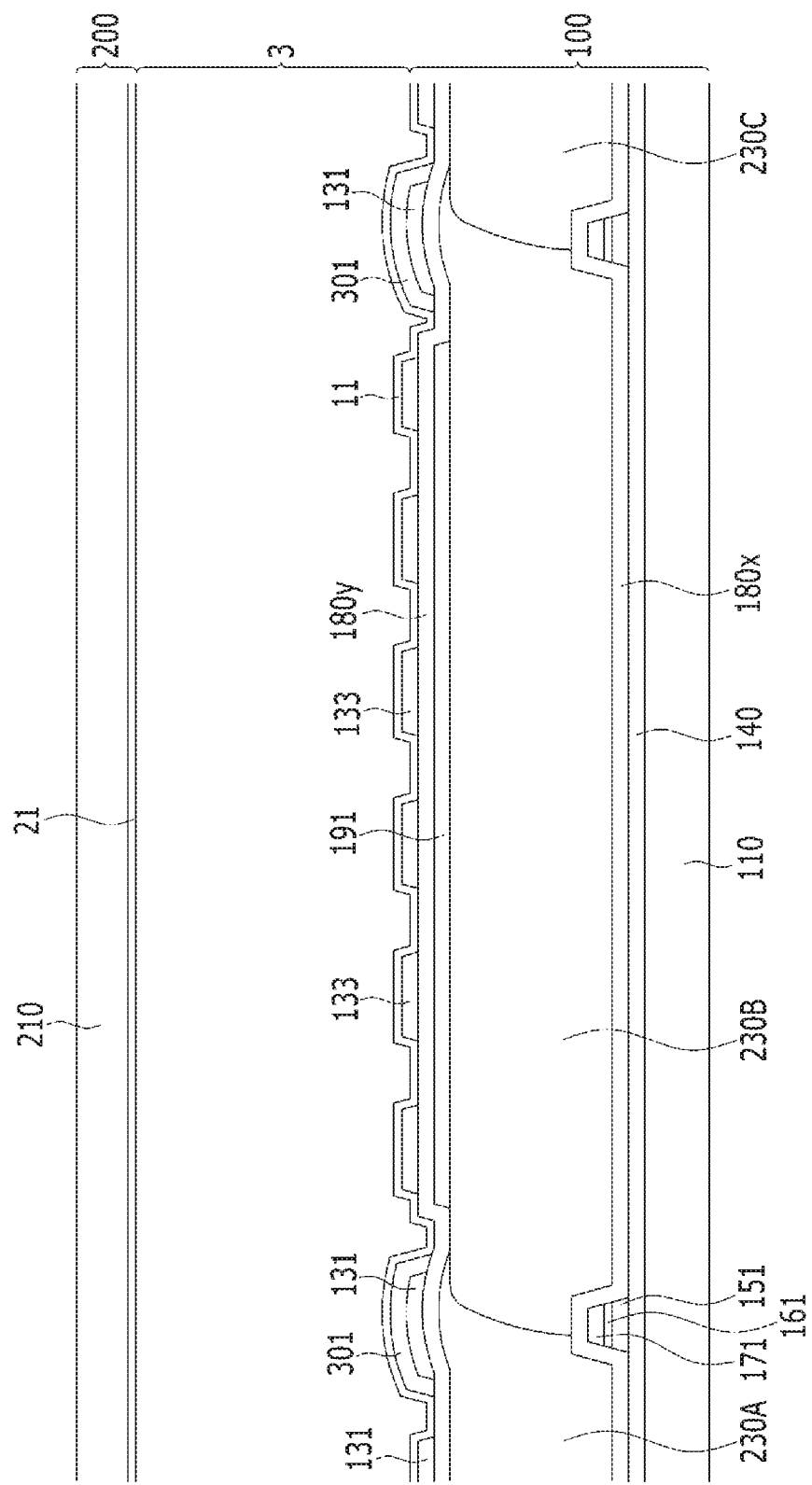

Next, a liquid crystal display according to another exemplary embodiment of the present invention will be described with reference to FIG. 42 and FIG. 43 as well as FIG. 25. FIG. 42 and FIG. 43 are cross-sectional views of the liquid crystal display according to another exemplary embodiment of the present invention taken along the lines XXVI-XXVI and XXVII-XXVII of FIG. 25.

The liquid crystal display according to the exemplary embodiment shown in FIG. 25, FIG. 42, and FIG. 43 is almost the same as the liquid crystal display according to the exemplary embodiment shown in FIG. 25, FIG. 26, and FIG. 27. Accordingly, the description of similar portions is omitted.

In contrast to the liquid crystal display according to the exemplary embodiment shown in FIG. 25, FIG. 26, and FIG. 27, the common voltage line 301 covers the side of the common electrode 131. In this way, the width of the common voltage line 301 is formed to be large enough such that the light leakage according to the irregular movement of the liquid crystal molecules that may be generated on the circumference of the common electrode 131 may be prevented.

All characteristics of the liquid crystal display according to the exemplary embodiment shown in FIG. 25, FIG. 26, and FIG. 27 may be applied to the liquid crystal display according to the present exemplary embodiment. Also, the characteristics and the effects of the several constituent elements according to the above-described exemplary embodiment may be applied to the present exemplary embodiment having the same constituent elements.

Figure 44:
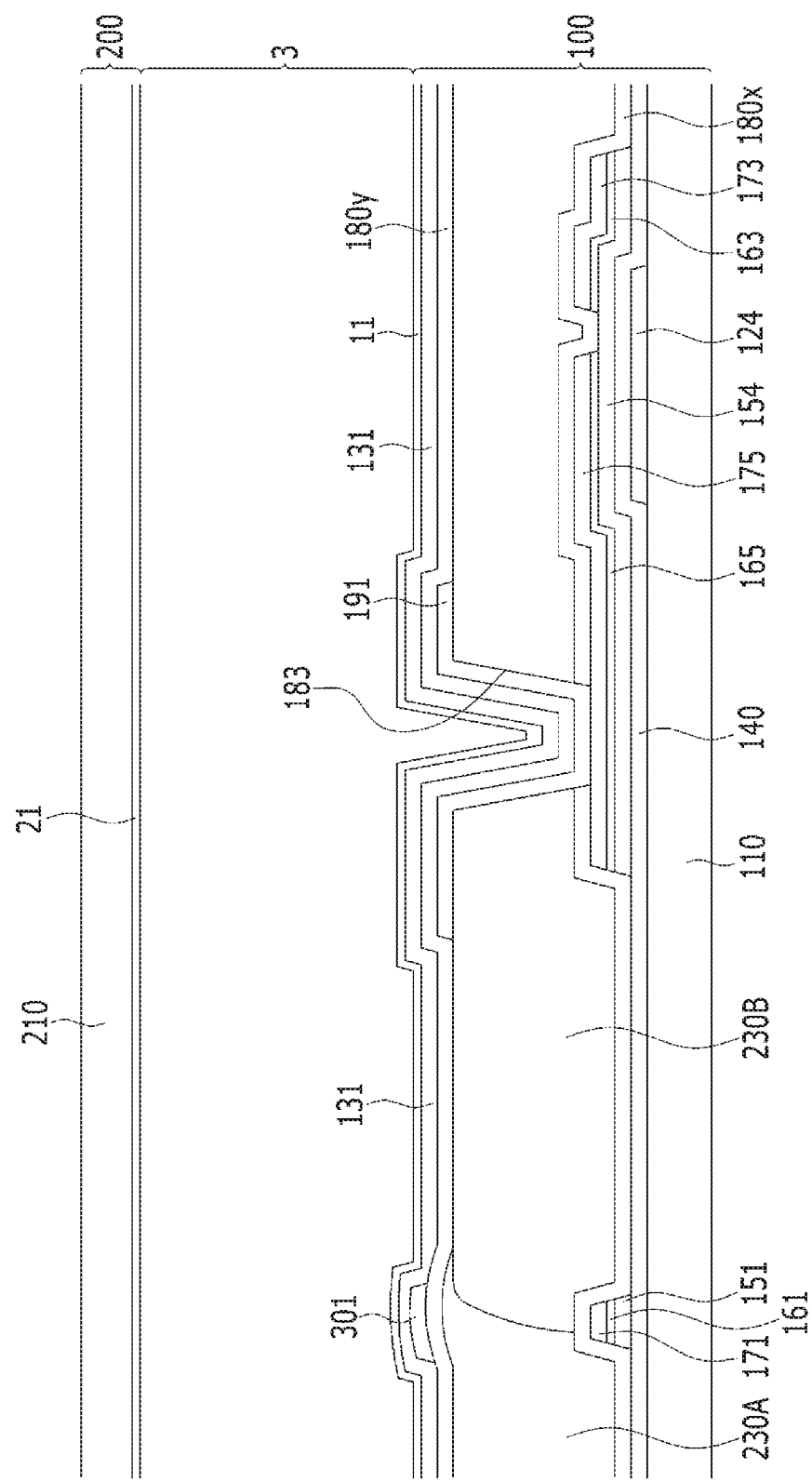
FIG. 44 and FIG. 45 are cross-sectional views of the liquid crystal display according to another exemplary embodiment of the present invention taken along the lines XXVI-XXVI and XXVII-XXVII of FIG. 25.
Figure 45:
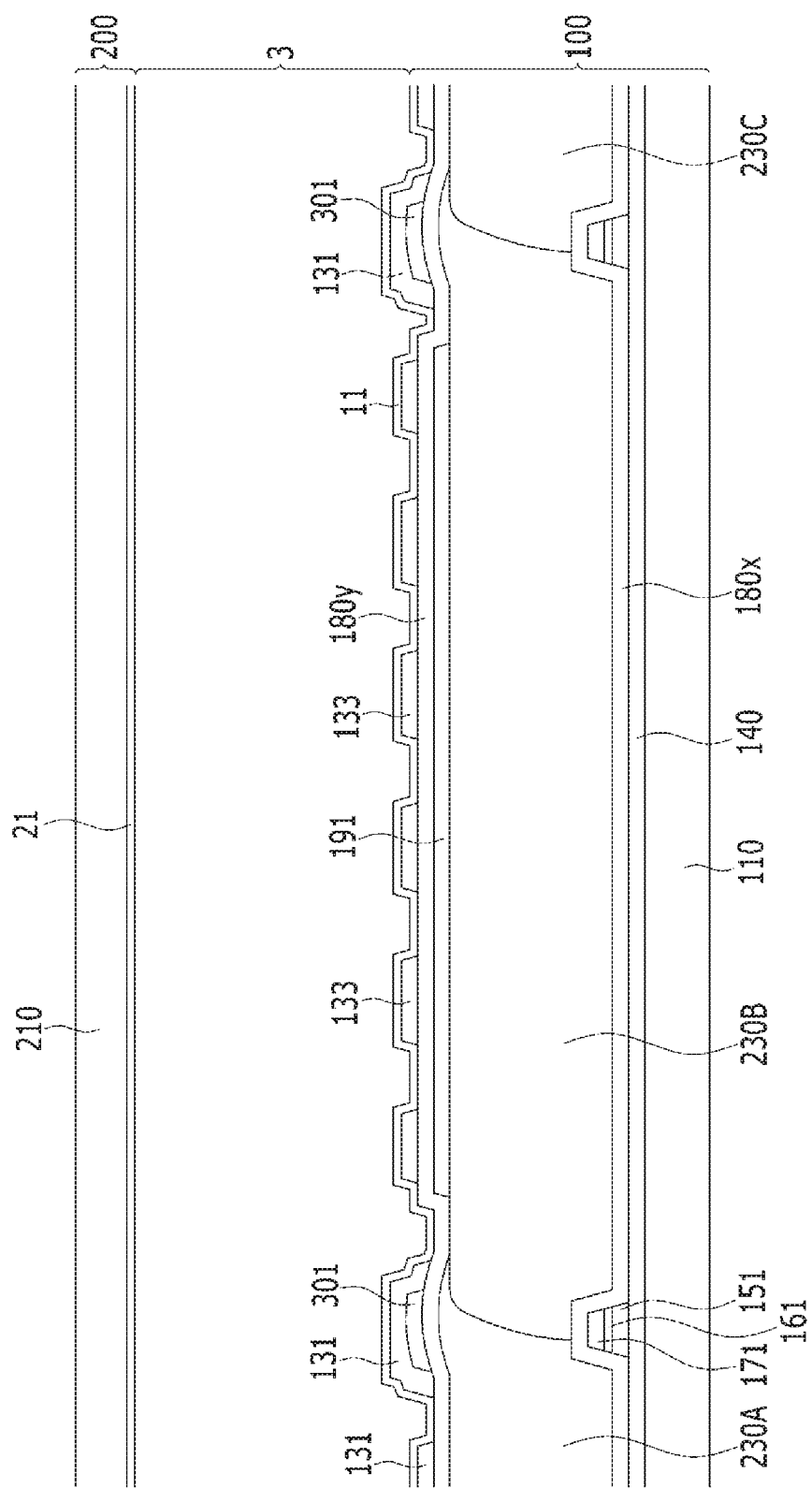

Next, a liquid crystal display according to another exemplary embodiment of the present invention will be described with reference to FIG. 44 and FIG. 45 as well as FIG. 25. FIG. 44 and FIG. 45 are cross-sectional views of the liquid crystal display according to another exemplary embodiment of the present invention taken along the lines XXVI-XXVI and XXVII-XXVII of FIG. 25.

The liquid crystal display according to the exemplary embodiment shown in FIG. 25, FIG. 44, and FIG. 45 is almost the same as the liquid crystal display according to the exemplary embodiment shown in FIG. 25, FIG. 26, and FIG. 27. Accordingly, the description of similar portions is omitted.

In contrast to the liquid crystal display according to the exemplary embodiment shown in FIG. 25, FIG. 26, and FIG. 27, in the liquid crystal display according to the present exemplary embodiment, the common voltage line 301 is disposed under the common electrode 131 and directly contacts the common electrode 131.

In the liquid crystal displays according to the exemplary embodiments described with reference to FIG. 25 to FIG. 43, the common voltage line 301 may be disposed under the common electrode 131.

All characteristics of the liquid crystal display according to the exemplary embodiment shown in FIG. 25, FIG. 26, and FIG. 27 may be applied to the liquid crystal display according to the present exemplary embodiment. Also, the characteristics and the effects of the several constituent elements according to the above-described exemplary embodiment may be applied to the present exemplary embodiment having the same constituent elements.

Next, a liquid crystal display according to another exemplary embodiment of the present invention will be described with reference to FIG. 46, FIG. 47, FIG. 48, FIG. 49, and FIG. 50. FIG. 46, FIG. 47, FIG. 48, FIG. 49, and FIG. 50 are layout views of signal lines of a liquid crystal display according to an exemplary embodiment of the present invention.

Figure 46:
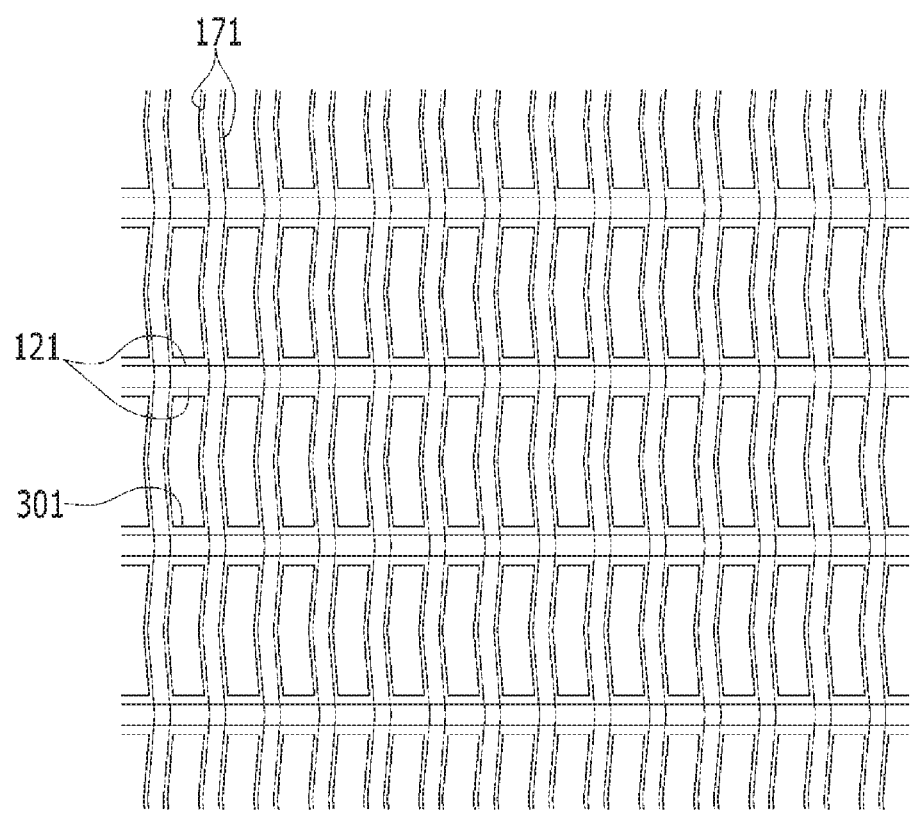
FIG. 46, FIG. 47, FIG. 48, FIG. 49, and FIG. 50 are layout views of a signal line of a liquid crystal display according to another exemplary embodiment of the present invention.

Firstly, referring to FIG. 46, a data line 171 of a liquid crystal display according to an exemplary embodiment of the present invention may be bent at least once between two neighboring gate lines 121, and a common voltage line 301 is disposed at a position overlapping the gate line 121 and the data line 171. The common voltage line 301 has substantially the same plane shape as the gate line 121 and the data line 171, and extends according to the gate line 121 and the data line 171.

Figure 47:
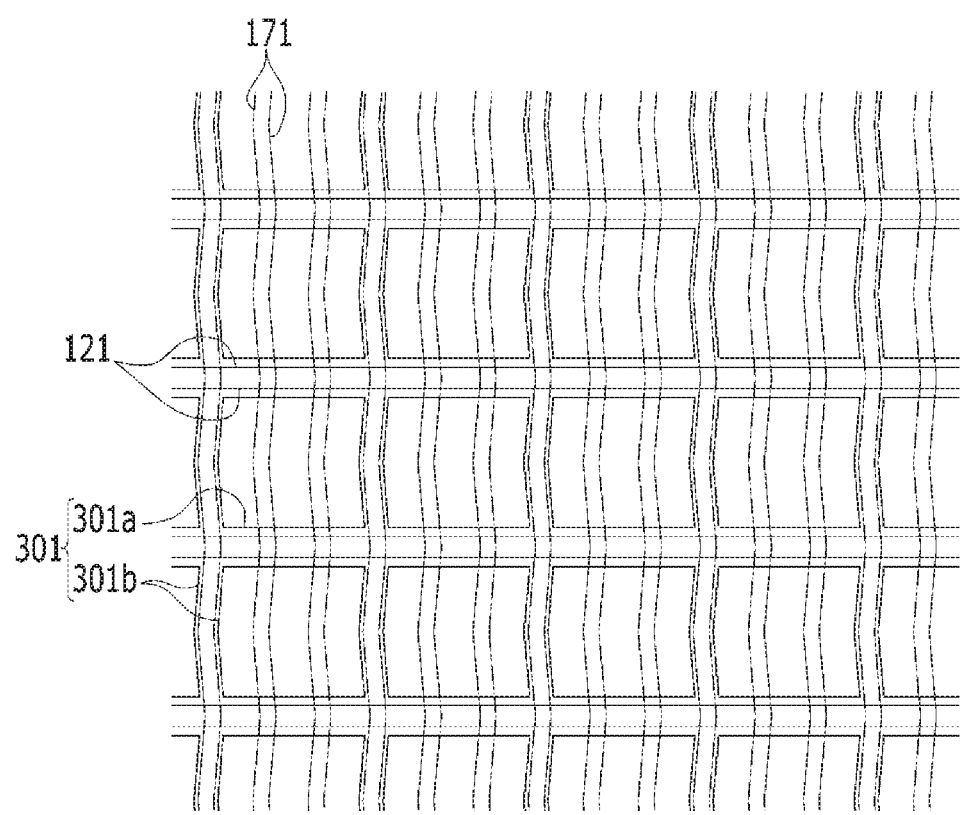

Referring to FIG. 47, a data line 171 of a liquid crystal display according to an exemplary embodiment of the present invention may be bent at least once between two neighboring gate lines 121, and a common voltage line 301 includes a first portion 301a overlapping the gate line 121 and a second portion 301b overlapping the data line 171. The first portion 301a of the common voltage line 301 overlaps all gate lines 121, and the second portion 301b is disposed on one of every three data lines 171 that are disposed neighboring each other. In this way, the connection of the common voltage line 301 may be disposed one by one per a plurality of pixels that are disposed neighboring each other.

Figure 48:
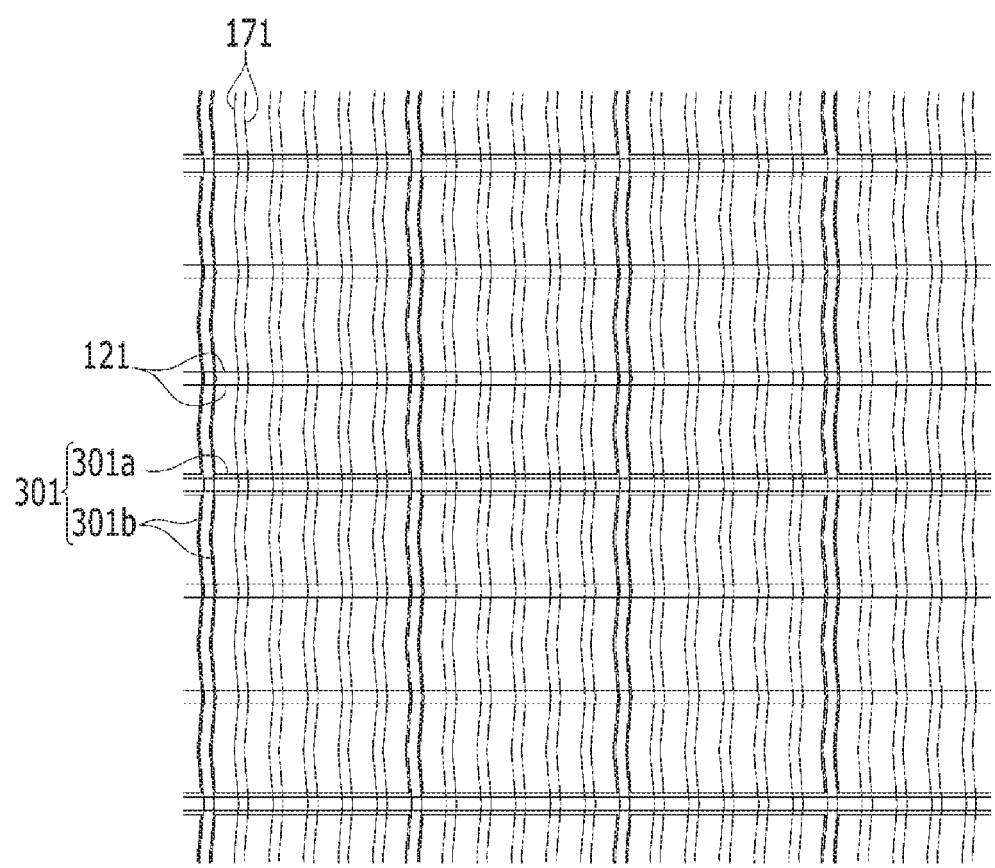

Referring to FIG. 48, a data line 171 of a liquid crystal display according to an exemplary embodiment of the present invention may be bent at least once between two neighboring gate lines 121, and a common voltage line 301 includes the first portion 301a overlapping the gate line 121 and the second portion 301b overlapping the data line 171. The first portion 301a of the common voltage line 301 is disposed on one of every three gate lines 121 that are disposed neighboring each other, and the second portion 301b is disposed on one of every six data lines 171 that are disposed neighboring each other. In this way, the connection of the common voltage line 301 may be disposed on one per a plurality of pixels that are disposed neighboring each other.

Figure 49:
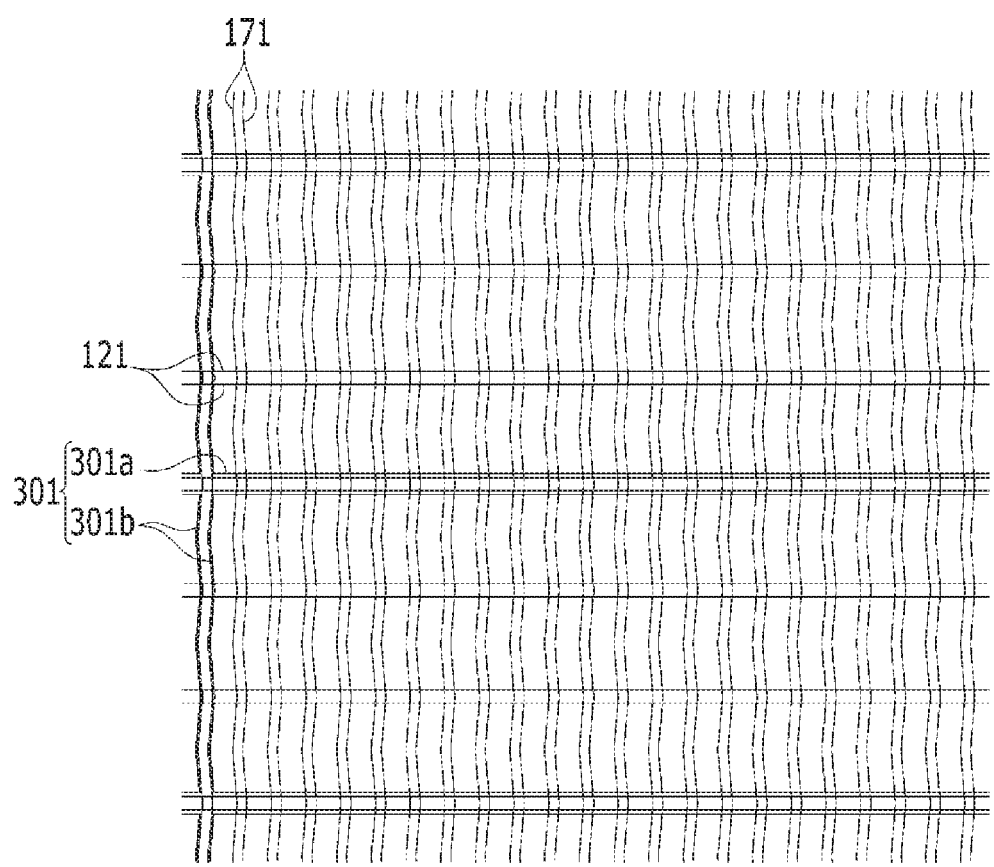

Referring to FIG. 49, a data line 171 of a liquid crystal display according to an exemplary embodiment of the present invention may be bent at least once between two neighboring gate lines 121, and a common voltage line 301 includes the first portion 301a overlapping the gate line 121 and the second portion 301b overlapping the data line 171. The first portion 301a of the common voltage line 301 is disposed on one of every three gate lines 121 that are disposed neighboring each other, and the second portion 301b is only disposed at the position overlapping the data line 171 of the pixel disposed at the edge. In this way, the connection of the common voltage line 301 may be disposed on one per a plurality of pixels that are disposed neighboring each other.

Figure 50:
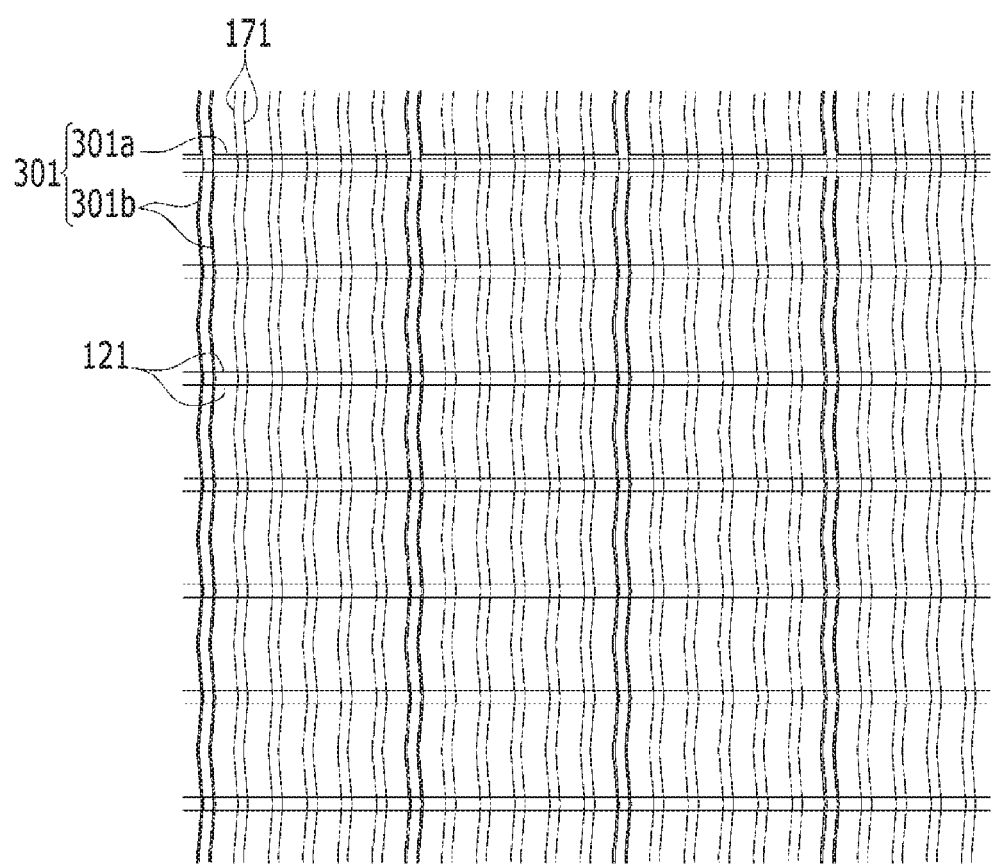

Referring to FIG. 50, a data line 171 of a liquid crystal display according to an exemplary embodiment of the present invention may be bent at least once between two neighboring gate lines 121, and a common voltage line 301 includes the first portion 301a overlapping the gate line 121 and the second portion 301b overlapping the data line 171. The first portion 301a of the common voltage line 301 is only disposed at the position overlapping the gate line 131 of the pixel disposed at the edge, and the second portion 301b is disposed on one of every six data lines 171 that are disposed neighboring each other. In this way, the connection of the common voltage line 301 may be disposed on one per a plurality of pixels that are disposed neighboring each other.

However, the arrangement of the common voltage line 301 is not limited thereto and may be variously changed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A display comprising:
   a first substrate;

a plurality of gate lines and a plurality of data lines disposed on the first substrate;

a plurality of thin film transistors respectively connected to the plurality of gate lines and the plurality of data lines;

a plurality of color filters disposed on the plurality of thin film transistors;

a plurality of pixel electrodes disposed on the plurality of color filters;

a first insulating layer disposed on the pixel electrodes;

a common electrode overlapping the pixel electrodes on the first insulating layer; and a common voltage line directly contacting the common electrode, wherein the common voltage line covers an upper surface and side surfaces of a portion of the common electrode overlapping one of the data lines, and at least one of the common electrode and the plurality of pixel electrodes comprises a branch electrode.

2. The display of claim 1, wherein two neighboring color filters among the plurality of color filters overlap each other at a position corresponding to the data line.

3. The display of claim 2, wherein the common voltage line is disposed directly on the common electrode.

4. The display of claim 3, wherein:

the common voltage line overlaps the data line; and the width of the common voltage line is equal to or greater than the width of the data line.

5. The display of claim 4, further comprising a second insulating layer disposed between the plurality of color filters and the pixel electrode.

6. The display of claim 5, wherein the common voltage line comprises a first portion overlapping at least one of the plurality of gate lines and a second portion overlapping at least one of the plurality of data lines.

7. The display of claim 6, wherein the first portion of the common voltage line is disposed on one of every three neighboring gate lines among the plurality of gate lines.

8. The display of claim 6, wherein the second portion of the common voltage line is disposed on one of every three neighboring data lines among the plurality of data lines.

9. The display of claim 6, wherein the second portion of the common voltage line is disposed on one of every six neighboring data lines among the plurality of data lines.

10. The display of claim 1, further comprising a light blocking member disposed between two neighboring color filters among the plurality of color filters and disposed at the position corresponding to the data line.

11. The display of claim 10, wherein the common voltage line is disposed directly on the common electrode.

12. The display of claim 1, further comprising:

a second substrate facing the first substrate; and a light blocking member disposed on the second substrate.

13. The display of claim 12, wherein:

the common voltage line overlaps the data line; and the width of the common voltage line is equal to or less than the width of the data line.

14. The display of claim 13, wherein the width of the light blocking member is equal to greater than the width of the data line.

15. The display of claim 1, further comprising a second insulating layer disposed between the plurality of color filters and the pixel electrode.

16. The display of claim 15, wherein the common voltage line is disposed directly on the common electrode.

17. The display of claim 16, wherein the common voltage line comprises a first portion overlapping at least one of the plurality of gate lines and a second portion overlapping at least one of the plurality of data lines.

18. The display of claim 1, wherein the common voltage line is disposed directly on the common electrode.

19. The display of claim 18, wherein the common voltage line comprises a first portion overlapping at least one of the plurality of gate lines and a second portion overlapping at least one of the plurality of data lines.

* * * * *

UNITED STATES PATENT AND TRADEMARK OFFICE
CERTIFICATE OF CORRECTION

PATENT NO.         : 10,365,524 B2
APPLICATION NO.    : 15/805033
DATED              : July 30, 2019
INVENTOR(S)        : Sung-Hoon Kim et al.

It is certified that error appears in the above-identified patent and that said Letters Patent is hereby corrected as shown below:

On the Title Page

At item (30) Foreign Application Priority Data, the Foreign Priority Application No. should be changed from "10-20111-0096523" to --10-2011-0096523--.

Signed and Sealed this
Seventeenth Day of September, 2019

Andrei Iancu
*Director of the United States Patent and Trademark Office*